US012758943B2

(12) United States Patent
Jun et al.

(10) Patent No.: US 12,758,943 B2
(45) Date of Patent: Oct. 13, 2026

(54) ENGINEERED CALCIUM ALGINATE AND USES THEREOF

(71) Applicant: Washington University, St. Louis, MO (US)

(72) Inventors: Young-Shin Jun, St. Louis, MO (US); Doyoon Kim, St. Louis, MO (US); Albern X. Tan, St. Louis, MO (US)

(73) Assignee: Washington University, St. Louis, MO (US)

( * ) Notice: Subject to any disclaimer, the term of this patent is extended or adjusted under 35 U.S.C. 154(b) by 952 days.

(21) Appl. No.: 17/944,820

(22) Filed: Sep. 14, 2022

(65) Prior Publication Data

US 2023/0110361 A1 Apr. 13, 2023

Related U.S. Application Data

(63) Continuation-in-part of application No. 16/397,898, filed on Apr. 29, 2019, now Pat. No. 12,145,128.

(Continued)

(51) Int. Cl.

*C05D 9/00* (2006.01)
*B01J 20/04* (2006.01)

(Continued)

(52) U.S. Cl.

CPC ............ *B01J 20/24* (2013.01); *B01J 20/048* (2013.01); *B01J 20/267* (2013.01); *B01J 20/28016* (2013.01); *B01J 20/28047* (2013.01); *B01J 20/3208* (2013.01); *C02F 1/288* (2013.01); *C05B 3/00* (2013.01); *C05B 17/00* (2013.01); *C05D 9/02* (2013.01); *C05G 5/18* (2020.02);

(Continued)

(58) Field of Classification Search

CPC ........ B01J 20/02; B01J 20/048; B01J 20/267; B01J 20/28016; B01J 20/28047; B01J 20/3208; B01J 2220/46; B01J 2305/04; C02F 1/288; C02F 1/281; C02F 1/286; C02F 2101/105; C02F 2103/007; C02F 2103/06; C02F 2101/16; C02F 2103/08; C02F 2103/10; C02F 2103/20; C05B 3/00; C05B 17/00; C05D 9/02; C05G 5/18; C05G 5/40

See application file for complete search history.

(56) References Cited

U.S. PATENT DOCUMENTS

| | | | |
|---|---|---|---|
| 6,716,357 | B1 | 4/2004 | Maekawa et al. |
| 2007/0205157 | A1 | 9/2007 | Jones |
| 2016/0031766 | A1 | 2/2016 | Bezbaruah et al. |

FOREIGN PATENT DOCUMENTS

| | | | |
|---|---|---|---|
| CN | 105921118 A | | 9/2016 |
| TW | 201500062 A | * | 1/2015 |

OTHER PUBLICATIONS

Kusuktham, Boonsri, Jutarat Prasertgul, and Pornchanok Srinun. "Morphology and property of calcium silicate encapsulated with alginate beads." Silicon 6.3 (2014): 191-197. (Year: 2014).*

(Continued)

*Primary Examiner* — Jennifer A Smith

(74) *Attorney, Agent, or Firm* — Polsinelli PC

(57) ABSTRACT

The present disclosure relates to biodegradable materials and methods of removing using the biodegradable materials to remove phosphorus from water. Additionally, the biodegradable materials may be used as a fertilizer.

2 Claims, 51 Drawing Sheets
(49 of 51 Drawing Sheet(s) Filed in Color)

Related U.S. Application Data

(60) Provisional application No. 62/663,700, filed on Apr. 27, 2018.

(51) Int. Cl.

| | |
|---|---|
| ***B01J 20/24*** | (2006.01) |
| ***B01J 20/26*** | (2006.01) |
| ***B01J 20/28*** | (2006.01) |
| ***B01J 20/32*** | (2006.01) |
| ***C02F 1/28*** | (2023.01) |
| ***C05B 3/00*** | (2006.01) |
| ***C05B 17/00*** | (2006.01) |
| ***C05D 9/02*** | (2006.01) |
| ***C05G 5/18*** | (2020.01) |
| ***C05G 5/40*** | (2020.01) |
| *C02F 101/10* | (2006.01) |
| *C02F 103/00* | (2006.01) |
| *C02F 103/06* | (2006.01) |

(52) U.S. Cl.

CPC ............ *C05G 5/40* (2020.02); *B01J 2220/46* (2013.01); *C02F 1/281* (2013.01); *C02F 1/286* (2013.01); *C02F 2101/105* (2013.01); *C02F 2103/007* (2013.01); *C02F 2103/06* (2013.01); *C08J 2305/04* (2013.01)

(56) References Cited

OTHER PUBLICATIONS

Qi, Danping, et al. "Immobilization of pectinase onto porous hydroxyapatite/calcium alginate composite beads for improved performance of recycle." ACS omega 5.32 (2020): 20062-20069. (Year: 2020).*

Murata, Yoshifumi, et al. "Drug Release Profile from Calcium-Induced Alginate-Phosphate Composite Gel Beads." International Journal of Polymer Science 2009.1 (2009): 729057. (Year: 2009).*

USGS "Wollastonite-A Versatile Industrial Mineral". Industrial Minerals of the United States. U.S. Department of the Interior U.S. Geological Survey. USGS Fact Sheet FS-002-01. Feb. 2001 (Year: 2001).*

Arellano-Jimenez M.J., et al., "Synthesis and Hydrolysis of Octacalcium Phosphate and its Characterization by Electron Microscopy and X-ray Diffraction," Journal of Physics and Chemistry of Solids, Feb. 2009, vol. 70, No. 2, pp. 390-395.

Bajpai S.K., et al., "Nano Zinc Oxide-Loaded Calcium Alginate Films with Potential Antibacterial Properties," Food Bioprocess Technology, 2012, vol. 5, No. 5, pp. 1871-1881.

Benicio L.P.F., et al., "Layered Double Hydroxides: New Technology in Phosphate Fertilizers Based on Nanostructured Materials," ACS Sustainable Chemistry and Engineering, 2017, Published on Dec. 1, 2016, vol. 5, No. 1, pp. 399-409, pp. A-K.

Bhushan B., "Biomimetics: Lessons From Nature—an overview," Philosophical Transactions of the Royal Society A, 2009, vol. 367, pp. 1445-1486.

Bjornoy S.H., et al., "A Correlative Spatiotemporal Microscale Study of Calcium Phosphate Formation and Transformation within an Alginate Hydrogel Matrix," Acta Biomaterialia, 2016, vol. 44, pp. 254-266.

Borkiewicz O., et al., "Time-Resolved in SITU Studies of Apatite Formation Pathways in Aqueous Solutions," American Mineralogist, 2010, vol. 95, Chapter. 2, pp. 1224-1236, 45 Pages.

Bradford-Hartke Z., et al., "Environmental Benefits and Burdens of Phosphorus Recovery from Municipal Wastewater," Environmental Science and Technology, Published on Jun. 29, 2015, vol. 49, No. 14, pp. 8611-8622.

Brooks A.S., et al., "Phosphorus Removal by Wollastonite: A Constructed Wetland Substrate," Ecological Engineering, Elsevier, 2000, vol. 15, pp. 121-132.

Buda A.R., et al., "Emerging Technologies for Removing Nonpoint Phosphorus from Surface Water and Groundwater: Introduction," Journal of Environmental Quality, Published On May 2012, vol. 41, pp. 621-627.

Cao X., et al., "Inhibition of Calcium Phosphate Precipitation Under Environmentally-Relevant Conditions," Science of the Total Environment, 2007, vol. 383, No. 1-3, pp. 205-215.

Chapman K.W., et al., "Applications of Principal Component Analysis to Pair Distribution Function Data," Journal of Applied Crystallography, 2015, vol. 48, No. 6, pp. 1619-1626.

Chen W., et al., "Microwave-Assisted Dried Volcanic Tephra/Calcium Alginate Composite for Phosphate Removal from Micro-Polluted Wastewater," Clean Soil, Air, Water, 2014, vol. 42, No. 5, pp. 561-570.

Clark J.H., "Green Chemistry: Challenges and Opportunities," Green Chemistry, Feb. 1999, vol. 1, pp. 1-8.

Combes C., et al., "Amorphous Calcium Phosphates: Synthesis, Properties and Uses in Biomaterials," Acta Biomaterialia, 2010, vol. 6, No. 9, pp. 3362-3378, 18 Pages, ISSN 1742-7061.

Cordell D., et al., "The Story of Phosphorus: Global Food Security and Food for Thought," Global Environmental Change, 2009, vol. 19, pp. 292-305.

De Yoreo J.J., et al., "In situ Investigations of Carbonate Nucleation on Mineral and Organic Surfaces," Reviews in Mineralogy and Geochemistry, 2013, vol. 77, pp. 229-257.

Delgado-Lopez J.M., et al., "Crystal Size, Morphology, and Growth Mechanism in Bio-Inspired Apatite Nanocrystals," Advanced Functional Materials, 2013, vol. 24, No. 8, 1090-1099, 10 Pages.

Desimone L.A., et al., "Quality of Water from Domestic Wells in Principal Aquifers of the United States, 1991-2004: Overview of Major Findings," US Department of the Interior, US Geological Survey, 2009, Circular 1332, 58 Pages.

Dey A., et al., "The Role of Prenucleation Clusters in Surface-Induced Calcium Phosphate Crystallization," Nature Materials, Dec. 2010, vol. 9, pp. 1010-1014.

Diaz R.J., et al., "Spreading Dead Zones and Consequences for Marine Ecosystems," Science, Aug. 15, 2008, vol. 321, No. 5891, pp. 926-929.

Dodson J.R., et al., "Bio-Derived Materials as a Green Route For Precious Critical Metal Recovery and Re-Use," Green Chemistry, 2015, vol. 17, pp. 1951-1965, 16 Pages.

Elser J., et al., "A Broken Biogeochemical Cycle," Nature, Oct. 6, 2011, vol. 478, pp. 29-31.

Filippelli G.M., "The Global Phosphorus Cycle," Reviews in Mineralogy and Geochemistry, 2002, vol. 48, Chapter 10, pp. 391-425.

Glimcher M.J., "Bone: Nature of the Calcium Phosphate Crystals and Cellular, Structural, and Physical Chemical Mechanisms in Their Formation," Reviews in Mineralogy Geochemistry, 2006, vol. 64, No. 1, pp. 223-282.

Gregory T.M., et al., "Solubility of CaHPO4.2H2O in the System Ca(OH)2—H3PO4—H2O at 5, 15, 25, and 37.5 degrees C," Journal of Research of the National Bureau Standards A, Jul.-Aug. 1970, vol. 74A, No. 4, pp. 461-475.

Gustafsson J.P., et al., "Phosphate Removal by Mineral-Based Sorbents Used in Filters for Small-Scale Wastewater Treatment," Water Research, Jan. 2008, vol. 42, No. 1-2, pp. 189-197, 25 Pages.

Habraken W.J.E.M., et al., "Ion-Association Complexes Unite Classical and Non-Classical Theories for the Biomimetic Nucleation Of Calcium Phosphate," Nature Communications, 2013, vol. 4, No. 1507, pp. 1-12.

Hagy J.D., et al., "Hypoxia in Chesapeake Bay, 1950-2001: Long-Term Change in Relation to Nutrient Loading and River Flow," Estuaries, Aug. 2004, vol. 27, No. 4, pp. 634-658.

Heistad A., et al., "A High-Performance Compact Filter System Treating Domestic Wastewater," Ecological Engineering, Dec. 22, 2006, vol. 28, No. 4, pp. 374-379.

Ilavsky J., et al., "Irena: Tool Suite for Modeling and Analysis of Small-Angle Scattering," Journal of Applied Crystallography, 2009, vol. 42, pp. 347-353.

Ilavsky J., et al., "Ultra-Small-Angle X-ray Scattering at the Advanced Photon Source," Journal of Applied Crystallography, 2009, vol. 42, pp. 469-479.

(56) References Cited

OTHER PUBLICATIONS

Ilavsky J., et al., "Ultra-Small-Angle X-Ray Scattering Instrument at the Advanced Photon Source: History, Recent Development, and Current Status," Metallurgical and Materials Transactions A, Jan. 2013, vol. 44A, pp. 68-76.
Johnston A.E., et al., "Chapter Five—Phosphorus: Its Efficient Use in Agriculture," Advances in Agronomy, 2014, vol. 123, pp. 177-228.
Joshi S.R., et al., "Organic Matter Remineralization Predominates Phosphorus Cycling in the Mid-Bay Sediments in the Chesapeake Bay," Environmental Science and Technology, 2015, vol. 49, pp. 5887-5896.
Jun Y-S., et al., "Heterogeneous Nucleation and Growth of Nanoparticles at Environmental Interfaces," Accounts of Chemical Research, Aug. 11, 2016, vol. 49, pp. 1681-1690.
Jun Y-S., et al., "In Situ Observations of Nanoparticle Early Development Kinetics at Mineral-Water Interfaces," Environmental Science & Technology, 2010, vol. 44, No. 21, pp. 8182-8189.
Karaca S., et al., "Kinetic Modeling of Liquid-Phase Adsorption of Phosphate on Dolomite," Journal of Colloid and Interface Science, 2004, vol. 277, No. 2, pp. 257-263.
Kim D., et al., "Designing the Crystalline Structure of Calcium Phosphate Seed Minerals in Organic Templates for Sustainable Phosphorus Management," Green Chemistry, 2018, vol. 20, pp. 534-543.
Kim D., et al., "In Situ Evaluation of Calcium Phosphate Nucleation Kinetics and Pathways During Intra- and Extrafibrillar Mineralization of Collagen Matrices," Published in final edited form as: Crystal Growth and Design, 2016, HHS Public Access Author Manuscript, Jul. 25, 2017, vol. 16, No. 9, pp. 5359-5366, 20 Pages.
Landis W.J., et al., "Mineral and Organic Matrix Interaction in Normally Calcifying Tendon Visualized in Three Dimensions by High-Voltage Electron Microscopic Tomography and Graphic Image Reconstruction," Journal of Structural Biology, 1993, vol. 110, No. 1, pp. 39-54.
Li Q., et al., "Interfacial Energies for Heterogeneous Nucleation of Calcium Carbonate on Mica and Quartz," Environmental Science and Technology, 2014, vol. 48, No. 10, pp. 5745-5753.
Li Y., et al., "Phosphate Removal from Aqueous Solutions Using Raw and Activated Red Mud and Fly Ash," Journal of Hazardous Materials, 2006, vol. B137, pp. 374-383.
Lougheed T., "Phosphorus Recovery: New Approaches to Extending the Life Cycle," Environmental Health Perspectives, Jul. 2011, vol. 119, No. 7, pp. A302-A305.
Lu X., et al., "Theoretical Analysis of Calcium Phosphate Precipitation in Simulated Body Fluid," Biomaterials, Apr. 2005, vol. 26, No. 10, pp. 1097-1108.
Mahmood Z., et al., "Adsorption Studies of Phosphate Ions on Alginate-Calcium Carbonate Composite Beads," African Journal of Environmental Science and Technology, Mar. 2015, vol. 9, No. 3, pp. 274-281.
Mccobb T.D., et al., "Phosphorus in a Ground-Water Contaminant Plume Discharging to Ashumet Pond, Cape Cod, Massachusetts, 1999," U.S. Department of the Interior, U.S. Geological Survey, 2003, pp. 1-69, 75 Pages, Water-Resources Investigations Report 02-4306.
Mcdowell H., et al., "Solubility of Ca5(PO4)3 OH in the System Ca(OH)2—H3PO4—H2O at 5, 15, 25, and 37 Degrees C," Journal of Research of the National Bureau of Standards-A, Mar.-Jun. 1977, vol. 81A, No. 2 and 3, pp. 273-281.
Nair L.S., et al., "Biodegradable Polymers as Biomaterials," Progress in Polymer Science, 2007, vol. 32, pp. 762-798.
Nilsson A., et al., "The Structural Origin of Anomalous Properties of Liquid Water," Nature Communications, 2015, vol. 6, Article 8998, pp. 1-11, Published: Dec. 8, 2015.
Olszta M.J., et al., "Bone Structure and Formation: A New Perspective," Materials Science and Engineering R, 2007, vol. 58, pp. 77-116.
Non Final Office Action for U.S. Appl. No. 16/397,898 mailed on Oct. 30, 2023, 9 Pages.
Pravinata L., et al., "Preparation of Alginate Microgels in a Simple One Step Process via the Leeds Jet Homogenizer," Food Hydrocolloids, 2016, vol. 61, 53 pages.
Da Silva T.L., et al., "Alginate and Sericin: Environmental and Pharmaceutical Applications," Biological Activities and Application of Marine Polysaccharides, 2017, pp. 57-86.
Final Office Action for U.S. Appl. No. 16/397,898 mailed on Apr. 5, 2023, 9 Pages.
Final Office Action for U.S. Appl. No. 16/397,898 mailed on Apr. 18, 2024, 11 Pages.
Final Office Action for U.S. Appl. No. 16/397,898 mailed on Mar. 22, 2022, 10 Pages.
Non Final Office Action for U.S. Appl. No. 16/397,898 mailed on Sep. 20, 2022, 9 Pages.
Notice of Allowance for U.S. Appl. No. 16/397,898, mailed on Jul. 17, 2024, 8 pages.
Ott E., "Discharge Limits For Domestic Wastewater Facilities," Department of Ecology State of Washington, Sep. 20, 2020, 1 Page, [Retrieved on Sep. 10, 2021] Retrieved from the URL: https://ecology.wa.gov/Water-Shorelines/Water-quality/Wastewater/Discharge-standards-limits.
Parsons S.A., et al., "Phosphorus Removal and Recovery from Municipal Wastewaters," Elements, Apr. 2008, vol. 4, No. 2, pp. 109-112.
Pasteris J.D., et al., "Bone and Tooth Mineralization: Why Apatite?," Elements, Apr. 2008, vol. 4, No. 2, pp. 97-104.
Plummer L.N., et al., "The Solubilities of Calcite, Aragonite and Vaterite in CO2—H2O Solutions Between 0 and 90 Degrees C, and an Evaluation of the Aqueous Model for the System CaCO3—CO2—H2O," Geochimica et Cosmochimica Acta, Jun. 1982, vol. 46, No. 6, pp. 1011-1040.
Powers S.M., et al., "Long-Term Accumulation and Transport of Anthropogenic Phosphorus in Three River Basins," Nature Geoscience, 2016, vol. 9, No. 5, pp. 353-356, 19 Pages.
Qiu X., et al., "PDFgetX2: a GUI-Driven Program to Obtain the Pair Distribution Function from X-ray Powder Diffraction Data," Journal of Applied Crystallography, 2004, vol. 37, p. 678.
Rabalais N.N., et al., "Sediments Tell the History of Eutrophication and Hypoxia in the Northern Gulf of Mexico," Ecological Applications, 2007, vol. 17, No. 5(Supplement), pp. S129-S143.
Rabalais N.N., et al., "Global Change and Eutrophication of Coastal Waters," International Council for Exploration of the Sea Journal of Marine Science, 2009, vol. 66, pp. 1528-1537.
Read E.K., et al., "Phosphorus Speciation in a Eutrophic Lake by 31p NMR Spectroscopy," Water Research, 2014, vol. 62, pp. 229-240.
Russo R., et al., "Effect of Cross-Linking with Calcium lons on the Physical Properties of Alginate Films," Biomacromolecules, 2007, vol. 8, No. 10, pp. 3193-3197.
Schelske C.L., et al., "Historic Low-Level Phosphorus Enrichment in the Great Lakes Inferred from Biogenic Silica Accumulation in Sediments," Limnology and Oceanography, 2006, vol. 51, No. 1, Part 2, pp. 728-748.
Sengupta S., et al., "Selective Removal of Phosphorus from Wastewater Combined with its Recovery as a Solid-Phase Fertilizer," Water Research, 2011, vol. 45, No. 11, pp. 3318-3330.
Shen X., et al., "Hydrogels Based on Cellulose and Chitin: Fabrication, Properties, and Applications," Green Chemistry, 2016, vol. 18, pp. 53-75.
Skinner H.C.W., "Biominerals," Mineralogical Magazine, Oct. 2005, vol. 69, No. 5, pp. 621-641.
Smolders E., et al., "Internal Loading and Redox Cycling of Sediment Iron Explain Reactive Phosphorus Concentrations in Lowland Rivers," Environmental Science and Technology, 2017, vol. 51, No. 5, pp. 2584-2592.
Stokke B.T., et al., "Small-Angle X-ray Scattering and Rheological Characterization of Alginate Gels. 1. Ca-Alginate Gels," Macromolecules, 2000, vol. 33, pp. 1853-1863.
Su Y., et al., "Strong Adsorption of Phosphate by Amorphous Zirconium Oxide Nanoparticles," Water Research, 2013, vol. 47, No. 14, pp. 5018-5026.
Thistleton J., et al., "Mechanisms of Chemical Phosphorus Removal II: Iron (III) Salts," Process Safety and Environmental Protection

(56) References Cited

OTHER PUBLICATIONS

Transactions of the Institution of Chemical Engineers, Sep. 2002, vol. 80, No. 5, Part B, pp. 265-269.
Tsang S., et al., "Determination of Phosphate/Arsenate by a Modified Molybdenum Blue Method and Reduction of Arsenate by S2O42-," Talanta, 2007, vol. 71, pp. 1560-1568.
Tung M.S., et al., "Octacalcium Phosphate Solubility Product from 4 to 37 Degrees C," Journal of Research of the National Bureau of Standards, Sep.-Oct. 1988, vol. 93, No. 5, pp. 613-624.
Vijaya Y., et al., "Synthesis and Characterization of Glutaraldehyde-Crosslinked Calcium Alginate for Fluoride Removal from Aqueous Solutions," Journal of Applied Polymer Science, 2011, vol. 120, No. 6, pp. 3443-3452.
Vohla C., et al., "Filter Materials for Phosphorus Removal from Wastewater in Treatment Wetlands—A Review," Ecological Engineering, Jan. 2011, vol. 37, No. 1, pp. 70-89.
Wang L., et al., "Kinetics of Calcium Phosphate Nucleation and Growth on Calcite: Implications for Predicting the Fate of Dissolved Phosphate Species in Alkaline Soils," Environmental Science and Technology, 2012, vol. 46, pp. 834-842.
Wang L., et al., "Visualizing Organophosphate Precipitation at the Calcite-Water Interface by in Situ Atomic-Force Microscopy," Environmental Science and Technology, 2016, vol. 50, pp. 259-268.
Wang Y., et al., "The Predominant Role of Collagen in the Nucleation, Growth, Structure and Orientation of Bone Apatite," Nature Materials, 2012, vol. 11, pp. 724-733.
Wang Y-Y., et al., "Synthesis of Phosphate-Embedded Calcium Alginate Beads for Pb (II) And Cd (II) Sorption and Immobilization in Aqueous Solutions," Transactions of Nonferrous Metals Society of China, 2016, vol. 26, No. 8, pp. 2230-2237.
Wilfert P., et al., "The Relevance of Phosphorus and Iron Chemistry to the Recovery of Phosphorus from Wastewater: A Review," Environmental Science and Technology, Aug. 18, 2015, vol. 49, No. 16, pp. 9400-9414.
Withers P.J.A., et al., "Greening the Global Phosphorus Cycle: How Green Chemistry Can Help Achieve Planetary P Sustainability," Green Chemistry, 2015, vol. 17, pp. 2087-2099.
Xie F., et al., "Removal of Phosphate from Eutrophic Lakes through Adsorption by in Situ Formation of Magnesium Hydroxide from Diatomite," Environmental Science Technology, 2014, vol. 48, pp. 582-590, 27 Pages.
Yang H., et al., "The Preparation of a Cross-Linked Cerium (III)-Loaded Alginate Bead Adsorbent for the Removal of Phosphate from Wastewater," Desalination and Water Treatment, 2015, vol. 57, pp. 18354-18365.
Yetilmezsoy K., et al., "Recovery of Ammonium Nitrogen from the Effluent of UASB Treating Poultry Manure Wastewater by MAP Precipitation as a Slow Release Fertilizer," Journal of Hazardous Materials, 2009, vol. 166, pp. 260-269.
Zhang F., et al., "Glassy Carbon as an Absolute Intensity Calibration Standard for Small-Angle Scattering," Metallurgical and Materials Transactions A, May 2010, vol. 41A, pp. 1151-1158.
Zhang Y., et al., "Enhanced Phosphate Removal by Nanosized Hydrated La(III) Oxide Confined in Cross-Linked Polystyrene Networks," Environmental Science and Technology, 2016, vol. 50, No. 3, pp. 1447-1454.
Zhao K., et al., "Preparation, Characterization and Photocatalytic Degradation Properties of a TiO2/Calcium Alginate Composite Film and the Recovery of TiO2 Nanoparticles," RSC Advances, 2014, vol. 4, pp. 51321-51329.

* cited by examiner

| SI | C. Bay | LA | IL |
|---|---|---|---|
| < 0 | 12 | 0 | 3 |
| 0-2 | 9 | 0 | 2 |
| 2-4 | 17 | 0 | 0 |
| 4-6 | 6 | 1 | 0 |
| > 6 | 4 | 1 | 0 |
| total | 48 | 2 | 5 |
| % saturated | 75 | 100 | 40 |

0.6% Alg + 35 mM P

After 4 hours in 100 mM NaCl

| Sample | Ca/P ratio (Fresh) | Ca/P ratio (Reacted) | log IAP (hydroxyapatite basis) (Fresh) | log IAP (hydroxyapatite basis) (Reacted) |
|---|---|---|---|---|
| 40 mM P | 2.45 ± .13 | 1.70 ± .08 | -54.2 ± 0.8 | -55.1 ± 0.2 |
| 40 mM P + 5.2 g/L Woll. | 2.22 ± .16 | 1.70 ± .24 | -53.63 ± 0.5 | -53.0 ± 0.1 |

FIG. 31E

ENGINEERED CALCIUM ALGINATE AND USES THEREOF

CROSS REFERENCE TO RELATED APPLICATIONS

This application is a continuation-in-part of U.S. application Ser. No. 16/397,898, filed Apr. 29, 2019, which claims the benefit of U.S. Provisional Application No. 62/663,700, filed Apr. 27, 2018 the disclosures of which are herein incorporated by reference in their entirety.

GOVERNMENTAL RIGHTS

This invention was made with government support under 84-00-84-01 awarded by the Environmental Protection Agency. The government has certain rights in the invention.

FIELD OF THE TECHNOLOGY

The present disclosure relates to biodegradable materials and methods of removing phosphorus from water. The present disclosure also relates to methods of making and using fertilizer compositions which release phosphorus into the surrounding soil.

BACKGROUND

Eutrophication of lakes and other natural bodies of water, caused by the presence of excess nutrients, is a growing problem. Phosphate is delivered to surface and ground water as a result of agricultural and feedlot run-offs, and municipal and industrial wastewaters. Treatment of domestic and agro-industrial wastewater often releases large amounts of phosphorus and nitrogen into water. Excess phosphorous concentration (>0.01 mg/L P) in water bodies causes eutrophication of aquatic ecosystems, which results in deterioration of water quality. Therefore, it is important to reduce phosphorous concentrations in water to improve water quality.

On the other hand, phosphorus is essential for plant growth and is an important constituent of agricultural fertilizers. Phosphorous is typically obtained by mining inorganic phosphate rocks, such as apatite, followed by chemical treatment to produce phosphoric acid, thereby generating phosphate. These natural supplies of inorganic phosphate are, however, diminishing. With increasing world population the demand for phosphorous for food production is estimated to peak sometime between 2030 and 2040. It is predicted that world phosphorous production will begin to decline around 2035. The possible shortfall of phosphorous fertilizers is a major concern for global food security.

Therefore, a method to remove and/or recover phosphorus from water is needed, coupled with a method to then reuse the phosphorus as a fertilizer.

SUMMARY

One aspect of the present disclosure is directed to a biodegradable material. The biodegradable material comprises alginate seeded with calcium phosphate (CaP), calcium carbonate ($CaCO_3$), and combinations thereof. In certain embodiment, the biodegradable material is a calcium alginate hydrogel with calcium phosphate seeds and calcium silicate hydrate seeds. In another certain embodiment, the biodegradable material is a calcium alginate hydrogel with calcium phosphate seeds and wollastonite.

Another aspect of the present disclosure is directed to a method for making calcium seeded calcium alginate beads. The method comprises (a) adding sodium alginate dropwise into a bath comprising $CaCl_2$ and NaOH and stirring to produce sodium alginate beads; and (b) combining the sodium alginate droplets with a phosphate salt to seed calcium phosphate (CaP) or a bicarbonate salt to seed calcium carbonate ($CaCO_3$) within the calcium alginate beads to form calcium seeded calcium alginate beads. In some embodiments, the methods include making calcium alginate hydrogel beads with calcium phosphate seeds and calcium silicate hydrate seeds or wollastonite, the method comprises preparing a precursor solution of sodium alginate, $Na_2HPO_4$ and wollastonite or sodium silicate, and combining the precursor solution into a gelation solution containing $CaCl_2$ and NaOH. The volume ratio (precursor to gelation bath) can be about 1:10.

An additional aspect of the present disclosure is directed to method of recovering or removing a nutrient from an aqueous medium. The method comprises contacting the aqueous medium with calcium mineral-seeded calcium alginate beads under conditions and for a time effective to adsorb the nutrient. In certain embodiments, method comprises contacting the aqueous medium with calcium phosphate and wollastonite or calcium silicate hydrate-seeded calcium alginate hydrogel beads under conditions and for a time effective to adsorb the nutrient.

Yet another aspect of the present disclosure is directed to a method of delivering a necessary nutrient to soil. The method comprises contacting the soil with a plurality of calcium mineral-seeded calcium alginate beads conjugated to the nutrient under conditions and for a time effective to release the nutrient.

BRIEF DESCRIPTION OF THE FIGURES

The application file contains at least one drawing executed in color. Copies of this patent application publication with color drawing(s) will be provided by the Office upon request and payment of the necessary fee.

(FIG. 2D, FIG. 2E, and FIG. 2F) Average and standard deviation values of P, Ca, and pH in these three areas are shown separately in the right column figures.

(FIG. 3E and FIG. 3F) Ca-Alg/CaP after three cycles of P removal experiments (24 hours for one cycle) under HA-supersaturated and HA-undersaturated conditions.

(FIG. 8A) WAXD patterns, (FIG. 8B) X-ray PDF analyses, and (FIG. 8C) USAXS patterns of Ca-Alg/CaP prepared with different $OH^-$ concentrations (0-20 mM).

(FIG. 9B) Equilibrium aqueous P concentrations in the presence of Ca-Alg/CaP during three cycles of P release experiments. (FIG. 9C) P release kinetics from Ca-Alg/CaP beads (0 mM $OH^-$) in sand columns.

(FIG. 12A) The influence of $NH_4^+$ at 0.1-10 mM Mg in the system. (FIG. 12B) The influence of pH at 0.1-10 mM $NH_4^+$. Thermodynamic equilibrium calculations were conducted by Visual MINTEQ (Ver. 3.1). Our simulation result shows that in most cases, even at high $Mg^{2+}$ and $NH_4^+$ concentrations up to 10 mM, the HA-supersaturated solution was undersaturated with respect to struvite at neutral pH. For comparison, typical levels of $NH_4^+$ in toilet water[22] and $Mg^{2+}$ in fresh urine[23] are around 5 and 4 mM, respectively.

(FIG. 15A) illustrates the kinetics of P removal using CaP beads vs. Phoslock. (FIG. 15B) illustrates the amount of initial product that was dissolved in the aqueous medium.

FIG. 31E shows a table showing the Ca/P ratio and ion activity product (IAP) of the mineral-hydrogel composites before and after 4 cycles of 24 hour reactions in supersaturated P-rich solution.

DETAILED DESCRIPTION

Figure 1A:
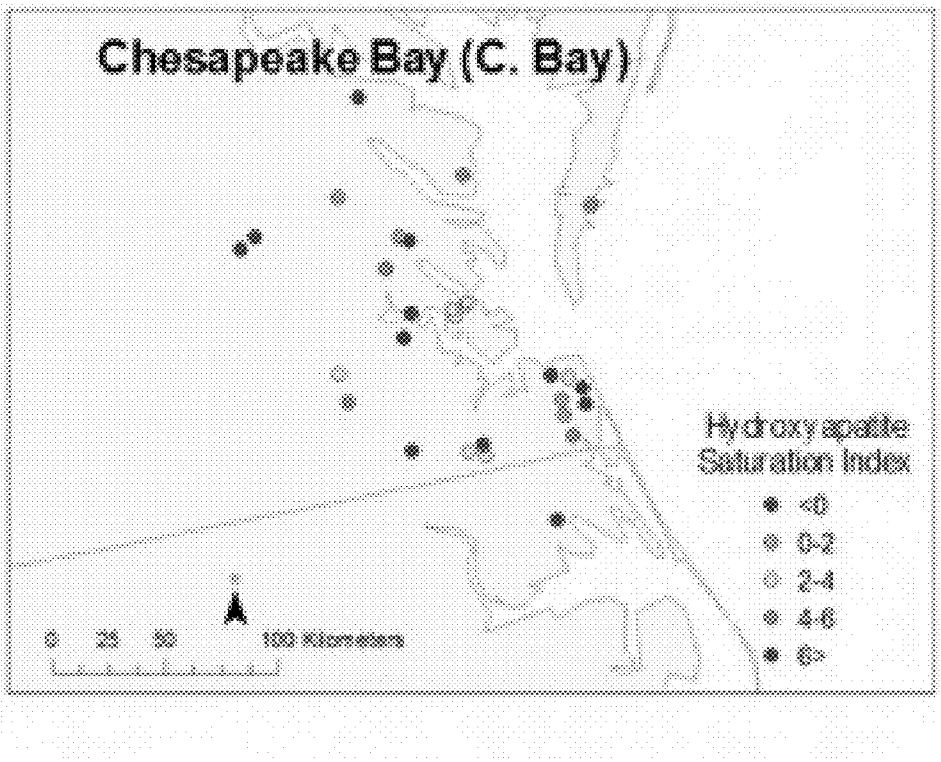
FIG. 1A, FIG. 1B, and FIG. 1C depict hydroxyapatite SI maps of the (FIG. 1A) Chesapeake Bay (C. Bay), (FIG. 1B) Louisiana (LA), and (FIG. 1C) northern Illinois (IL) areas. The SI values were calculated using Visual MINTEQ. The table at the bottom right corner summarizes the number of sampling sites categorized into different SI values.

Applicants have discovered that calcium alginate beads with embedded calcium-bearing seed minerals can be used to effectively remove or recover phosphorus from water. In particular, Applicants have discovered the combination of calcium phosphate with wollastonite (or calcium silicate hydrate) work synergistically to remove P when seeded into calcium alginate hydrogel beads. In certain embodiments, the phosphorus may then be reused as a fertilizer.

Additional aspects of the invention are described below.

I. Biodegradable Materials

One aspect to the present disclosure encompasses a biodegradable material comprising alginate complexed with calcium phosphate (CaP), calcium carbonate ($CaCO_3$), and combinations thereof. In another aspect, the present disclosure provides a biodegradable material comprising calcium alginate hydrogel beads with embedded calcium phosphate (CaP) and wollastonite or calcium silicate hydrate seeds.

Other aspects of the biodegradable material are described in further detail below.

(a) Source of Alginate

In general, the biodegradable material comprises a source of alginate.

Suitable sources of alginate may include any salt derivate of alginate. In some embodiments, the salt derivative of alginate may be sodium alginate or calcium alginate. In an exemplary embodiment, the salt derivative of alginate may be sodium alginate.

(b) Seed Mineral

In general, the biodegradable material is complexed with a seed mineral.

Suitable seed minerals include, without limit, calcium phosphate (CaP), calcium carbonate ($CaCO_3$), calcium oxide, calcium silicate hydrate, wollastonite, lanthanum carbonate, lanthanum oxide, ferric oxides, ferrous chloride, ferric chloride, modified and unmodified clay minerals. In an exemplary embodiment, the seed mineral may comprise calcium phosphate (CaP). In a different exemplary embodiment, the seed mineral may comprise calcium carbonate ($CaCO_3$). In another exemplary embodiment, the seed mineral may comprise calcium phosphate (CaP), calcium carbonate ($CaCO_3$), and combinations thereof. In still another exemplary embodiment, the seed mineral may comprise calcium phosphate (CaP) and calcium silicate hydrate. In still yet another exemplary embodiment, the seed mineral may comprise calcium phosphate (CaP) and wollastonite. Wollastonite is a calcium inosilicate mineral ($CaSiO_3$) that may contain small amounts of iron, magnesium, and manganese substituting for calcium. In a pure $CaSiO_3$, each component forms nearly half of the mineral by weight: 48.3% of CaO and 51.7% of $SiO_2$.

(c) Phosphorus Containing Compound

In an embodiment, the biodegradable material may further comprise at least one phosphorus containing compound.

Suitable phosphorus containing compounds include, without limit, orthophosphate ($PO_4^{3-}$), hydrogen phosphate ($HPO_4^{2-}$), dihydrogen phosphate, ($H_2PO_4^-$), magnesium ammonium phosphate ($MgNH_4PO_4 \cdot 6H_2O$, struvite), hydroxyapatite, a polyphosphate, an organic phosphate, bone meals or dried manures from biowaste, and scaling by products during wastewater treatments.

(d) Physical Properties

The biodegradable material may be described by one or more physical properties, including crystallinity, form or shape, size, etc.

(i) Crystallinity

The crystallinity of material may be described by amorphous prior to phosphate seed embedment. After complex with seed, the crystallinity of material may be described by hydroxyapatite structure. Depending on the condition of seed formation, the material may have intermediate crystallinity between amorphous and hydroxyapatite. By carbonate seed formation, the material's crystallinity may be described by calcite, vaterite, aragonite, and amorphous calcium carbonate.

(ii) Form

In an embodiment, the biodegradable material is in the form of a bead, a sol, a gel, a hydrogel, a capsule, a particle, a nanoparticle, a slurry, a matrix, or any other form that can be used in an aqueous environment to contact aqueous or dissolved ions. In an exemplary embodiment, the biodegradable material is in the form of a bead. In another exemplary embodiment, the biodegradable material is in the form of a calcium alginate hydrogel bead.

(iii) Size

In an embodiment, the beads may have a diameter of from about 2.0 mm to about 5.0 mm. In some embodiments, the beads may have a diameter of from about 2.0 mm, about 2.1 mm, about 2.2 mm, about 2.3 mm, about 2.4 mm, about 2.5 mm, about 2.6 mm, about 2.7 mm, about 2.8 mm, about 2.9 mm, about 3.0 mm, about 3.1 mm, about 3.2 mm, about 3.3 mm, about 3.4 mm, about 3.5 mm, about 3.6 mm, about 3.7 mm, about 3.8 mm, about 3.9 mm, about 4.0 mm, about 4.1 mm, about 4.2 mm, about 4.3 mm, about 4.4 mm, about 4.5 mm, about 4.6 mm, about 4.7 mm, about 4.8 mm, about 4.9 mm, or about 5.0 mm.

II. Synthesis

Another aspect of the present disclosure encompasses a method for making calcium mineral-seeded calcium alginate beads. The method comprises (a) adding sodium alginate dropwise into a bath of $CaCl_2$ and NaOH and stirring to produce sodium alginate beads; and (b) combining the sodium alginate beads with a phosphate salt to seed calcium phosphate (CaP) or a bicarbonate salt to seed calcium carbonate ($CaCO_3$) within the calcium alginate beads to form calcium seeded calcium alginate beads.

(a) Stirring Step

In general, a suitable salt derivative of alginate may be added to a bath containing a source of calcium and a base. The salt derivative of alginate may be added in a dropwise fashion to the bath containing calcium and a base. Without being bound by theory, once the alginate comes into contact with the bath, sodium alginate beads will form.

The salt derivatives of alginate are described in Section (I)(a).

(i) Bath Components

In general, the bath comprises a source of calcium and a base.

Sources of calcium include, without limit, $CaCl_2$, $CaCO_3$, $Ca(IO_3)_2$, $CaBr_2$, $Ca(NO_2)_2$, $CaC_2O_4$, and the like. In an exemplary embodiment, the source of calcium may be $CaCl_2$.

In general, the amount of calcium in the bath can and will vary depending upon the amount of calcium alginate beads to be formed. In an embodiment, the amount of calcium in the bath may be from about 22.5 mM to about 300 mM. In some embodiments, the amount of calcium in the bath may be about 50 mM, about 60 mM, about 70 mM, about 80 mM, about 90 mM, about 100 mM, about 110 mM, about 120 mM, about 130 mM, about 140 mM, about 150 mM, about 160 mM, about 170 mM about 180 mM, about 190 mM, about 200 mM, about 210 mM, about 220 mM, about 230 mM, about 240 mM, about 250 mM, about 260 mM, about 270 mM, about 280 mM about 290 mM, or about 300 mM. In an exemplary embodiment, the amount of calcium in the bath may be about 180 mM.

Sources of bases include, without limit, NaOH, KOH, and the like. In an exemplary embodiment, the base may be NaOH.

In general, the amount of base in the bath can and will vary depending upon the amount of calcium alginate beads to be formed. In an embodiment, the amount of base in the bath may be from about 0 mM to about 50 mM. In some embodiments, the amount of base in the bath may be about 0 mM, about 5 mM, about 10 mM, about 15 mM, about 20 mM, about 25 mM, about 30 mM, about 35 mM, about 40 mM, about 45 mM, or about 50 mM. In an exemplary embodiment, the amount of base in the bath may be about 20 mM.

Without being bound by theory, it is believed that higher Ca concentrations will make smaller sized beads and higher amounts of base will increase the amount of crystallinity in the beads (more hydroxyapatite-like structure, rather than amorphous).

The pH of the bath increases with base concentrations. In an exemplary embodiment with 180 mM Ca, pH is about 6.9 with 0 mM base, but it increases up to 11.9 with 20 mM base.

Without being bound by theory, it is thought that the pH of the bath alters the crystallinity of the calcium-mineral seeded calcium alginate beads. Additionally, without being bound by theory, it is thought that as the pH increases so does the crystallinity, and as the pH decreases so does the crystallinity.

(ii) Time

In general, after the sodium alginate is added to the bath, the mixture is stirred for a time ranging from about 1 minute to about greater than 1 minute. In some embodiments, the mixture is stirred for a time ranging from about 2 minutes to about 5 minutes.

(iii) Temperature

In general, after the sodium alginate is added to the bath, the mixture is stirred at an elevated temperature, room temperature, or cooled temperature.

(b) Seeding Step

In general, the calcium alginate beads may be seeded by combining them with a seed mineral precursor to form calcium-mineral seeded calcium alginate beads. Following seeding, the calcium seeded calcium alginate beads will settle at the bottom of the bath.

(i) Seed Mineral Precursor

In general, the seed mineral precursor may be a phosphate derivative or a bicarbonate derivative.

Suitable phosphate salts include, without limit, disodium phosphate ($Na_2HPO_4$), monosodium phosphate ($NaH_2PO_4$), dibasic potassium phosphate ($K_2HPO_4$) and monopotassium phosphate ($KH_2PO_4$). In an exemplary embodiment, the phosphate derivative may be disodium phosphate ($Na_2HPO_4$).

Suitable bicarbonate salts include, without limit, sodium bicarbonate ($NaHCO_3$), sodium carbonate ($Na_2CO_3$), potassium bicarbonate ($KHCO_3$), and potassium carbonate ($K_2CO_3$). In an exemplary embodiment, the bicarbonate derivative may be sodium bicarbonate ($NaHCO_3$).

In some embodiments, the methods include making calcium alginate hydrogel beads with calcium phosphate seeds and calcium silicate hydrate seeds or wollastonite, the method comprises preparing a precursor solution of sodium alginate $Na_2HPO_4$ and wollastonite or sodium silicate; combining the precursor solution into a gelation solution containing $CaCl_2$ and NaOH. The volume ratio (precursor to gelation bath) can be about 1:10.

III. Methods of Use

An additional aspect of the present disclosure encompasses a method of recovering or removing a nutrient from an aqueous medium, the method comprising contacting the aqueous medium with a plurality of calcium seeded calcium alginate beads under conditions and for a time effective to adsorb a nutrient.

The calcium seeded calcium alginate beads, for example calcium alginate hydrogel beads seeded with calcium phosphate and wollastonite or calcium silicate hydrate, are described in Section (I) and Section (II) hereinabove. The phosphorus is described in Section (I)(c) hereinabove.

(a) Nutrient

In general, the method comprises recovering or removing a nutrient from an aqueous medium.

Suitable nutrients include, without limit, phosphorus, magnesium, nitrogen, iron, manganese, and combinations thereof.

In some embodiments, magnesium and nitrogen can be recovered by forming struvite ($NH_4MgPO_4$) or dolomite ($CaMg(CO_3)_2$) in the beads. In other embodiments, iron and manganese can be recovered by forming (hyr)oxide minerals.

(b) Aqueous Medium

In general, the method comprises contacting calcium mineral-seeded calcium alginate beads with an aqueous medium.

Suitable aqueous mediums include, without limit, surface water, ground water, an aquifer, well water, a eutrophic lake, municipal and industrial wastewater, agricultural runoff, effluent from water or sewer treatment plants, acid mine drainage, sludge, groundwater, a eutrophic lake, a phosphorus-rich reservoir, a livestock farm waste, or a toilet wastewater, a reservoir, well water, a marsh, swamp, a bay, an estuary, a river, a stream, an aquifer, a tidal or intertidal area, or a sea or an ocean. In a preferred embodiment, the aqueous medium may be a eutrophic lake, a phosphorus-rich reservoir, a livestock farm waste, or a toilet wastewater.

In different embodiment, the aqueous medium may be disposed within a stationary treatment medium. Suitable stationary treatment mediums include, without limit, permeable reactive barrier, a slurry wall, a filtration bed, or a filter.

In an embodiment, the aqueous medium may have a neutral pH. In some embodiments, the aqueous medium may have a pH of about 7.

(c) Reaction Conductions

In an embodiment, the calcium mineral-seeded calcium alginate beads are contacted with the aqueous medium for about 1 hour to about 72 hours. In some embodiments, the calcium mineral-seeded calcium alginate beads are contacted with the aqueous medium for about 1 hour, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, or about 24 hours.

In other embodiments, the calcium mineral-seeded calcium alginate beads are contacted with the aqueous medium for less than about 24 hours.

In general, the amount of calcium mineral-seeded calcium alginate beads needed to recover or remove phosphorus from an aqueous medium may vary depending on the aqueous medium and the amount of phosphorus in the aqueous medium. In some embodiments, the amount of calcium mineral-seeded calcium alginate beads may range from about 1 mL to about 10 mL per 100 mL of aqueous medium.

Still an additional aspect of the present disclosure encompasses a method of delivering phosphorus to soil, the method comprising contacting the soil with calcium mineral-seeded calcium alginate beads conjugated to phosphorus under conditions and for a time effective to release the phosphorus.

The calcium mineral-seeded calcium alginate beads are described in Section (I) and Section (II) hereinabove.

In an embodiment, the method may further comprise transporting the calcium mineral-seeded calcium alginate beads conjugated to phosphorus to the soil application site. At the application site, a plant disposed in the soil can take up the phosphorus nutrient from the calcium-mineral seeded calcium alginate beads. The phosphorus can be released slowly over time and its concentrations will be sufficiently high to grow plants.

In general, the release of the nutrient may and will be determined by the crystallinity of the seed materials in the beads, pH of soil or aqueous water, types of soils, types of plants, etc.

In an embodiment, the phosphorus may be released over a period of time from about 30 minutes to about 72 hours. In other embodiments, the phosphorus may be released over a period of less than 1 hour, about 1 hour, about 2 hours, about 3 hours, about 4 hours, about 5 hours, or greater than 5 hours. In some embodiments, the phosphorus may be released over a period of greater than 24 hours, greater than 48 hours, or greater than about 72 hours.

Definitions

When introducing elements of the present disclosure or the preferred aspects(s) thereof, the articles "a," "an," "the," and "said" are intended to mean that there are one or more of the elements. The terms "comprising," "including," and "having" are intended to be inclusive and mean that there may be additional elements other than the listed elements.

As used herein, the following definitions shall apply unless otherwise indicated. For purposes of this invention, the chemical elements are identified in accordance with the Periodic Table of the Elements, CAS version, and the Handbook of Chemistry and Physics, $75^{th}$ Ed. 1994. Additionally, general principles of organic chemistry are described in "Organic Chemistry," Thomas Sorrell, University Science Books, Sausalito: 1999, and "March's Advanced Organic Chemistry," $5^{th}$ Ed., Smith, M. B. and March, J., eds. John Wiley & Sons, New York: 2001, the entire contents of which are hereby incorporated by reference.

EXAMPLES

The following examples are included to demonstrate various embodiments of the present disclosure. It should be appreciated by those of skill in the art that the techniques disclosed in the examples that follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

As used herein, the following definitions shall apply unless otherwise indicated. For purposes of this invention, the chemical elements are identified in accordance with the Periodic Table of the Elements, CAS version, and the Handbook of Chemistry and Physics, 75th Ed. 1994. Additionally, general principles of organic chemistry are described in "Organic Chemistry," Thomas Sorrell, University Science Books, Sausalito: 1999, and "March's Advanced Organic Chemistry," 5th Ed., Smith, M. B. and March, J., eds. John Wiley & Sons, New York: 2001, the entire contents of which are hereby incorporated by reference.

The following abbreviations are used throughout the Examples: Alg: alginate; Ar: argon; Au: gold; HA: hydroxyapatite; Pd: palladium; PDF: X-ray pair distribution function; SEM: scanning electron microscope; SI: saturation index; SAXS: small-angle X-ray scattering; USAXS: ultra-small-angle X-ray scattering; WAXD: wide-angle X-ray diffraction; and XRD: X-ray diffraction.

Example 1: Designing the Crystalline Structure of Calcium Phosphate Seed Minerals in Organic Templates for Sustainable Phosphorus Management Introduction Recent anthropogenic activities, such as deforestation and fertilization, have doubled natural dissolved P fluxes.[1,2] This increased release is turning P into a pollutant that poses significant threats, such as mass die-offs of aqueous organisms owing to significant eutrophication in local aquatic systems.[3,4] On the other hand, the sustainability of the global P cycle will also be significantly endangered by an increase in P mining from limited natural sources to supply fertilizers for agricultural production. Unfortunately, these mines are located in only a few countries, such as Western Sahara, which is the largest P rock exporter to Europe.[4,5]

Recycling P from wastewater streams or eutrophic water bodies can be an environmentally sustainable approach to mitigate the imbalance of the global P cycle, securing food and water for a growing population.[6-8] P recovery as struvite ($MgNH_4PO_4 \cdot 6H_2O$) is a promising strategy in enhanced biological P removal facilities with anaerobic digesters.[7,9,10] Where this centralized treatment option is not feasible, such as in the remediation of eutrophic reservoirs, then other approaches, including chemical precipitation,[7] constructed wetlands,[11] and column filtration,[12,13] can be used to prevent P pollution of aqueous environments. These strategies rely highly on chemical reactions, such as sorption and ion exchange, between phosphate and cationic Ca, Fe, or Al species in solutions or on the surfaces of natural or engineered materials.[9,13] In particular, P removal efficiency has shown good correlations with the CaO and Ca contents in filter materials ($R^2$=0.51 and 0.43, respectively).[13] While many of these materials have shown effective P removal, challenges still handicap practical operations: For example, filtration materials can become clogged, thus reducing the interval between replacements.[10,13] The pH of effluents is another important concern, because many CaO or Ca-bearing materials often result in treated effluent pH higher than[10,13-17] thus requiring secondary pH adjustment or buffering chemicals. Chemical precipitation using ferric or aluminum salts also needs to be operated at pH below 5 to prevent undesired hydroxide mineral formation.[7,18] Additionally, these approaches have some limitations for on-site restoration, such as of eutrophic lakes, because many sorption and precipitation reactions are easily reversible.[12,19] In other words, if the immobilized P is not totally separated from the environment, P can be released again when the water chemistry changes for natural or anthropogenic reasons.[20]

While evaluating the water quality of eutrophic environments in the USA,[21,22] it was found that many groundwater samples in the Chesapeake Bay and the available data set from Louisiana area were indeed supersaturated with respect to hydroxyapatite (HA, $Ca_5(PO_4)_3OH$), which is the most thermodynamically stable calcium phosphate mineral (CaP) at neutral pH.[23] P concentrations in these areas remain higher than those at equilibrium condition, thus increasing the risk of eutrophication. Further, this risk can be significantly enhanced during summers in certain areas, where P-binding iron oxides are abundant because these minerals are reductively dissolved by the decreasing dissolved oxygen level with increasing temperature.[24] Interestingly, a similar situation involving maintaining an HA-supersaturated condition without precipitation can be found in physiological body fluid systems (pH 7.4).[25-27] Recent studies demonstrated that a combined structure of CaP nuclei and fibrillar collagen protein is a key to the bone mineralization, driving the deposition of aqueous Ca and P species in specific locations within the fibrillar structure.[28,29] This process can provide useful insights for regulating P levels in environmental aqueous systems with high nucleation energy barriers.

Here, a new strategy to manage P in aqueous systems by recovering it from nutrient-rich aqueous solutions and reusing it as a slow-releasing fertilizer is proposed. A composite material of biological substrates and embedded mineral seed nuclei can help overcome the nucleation energy barrier for CaP in aqueous environments supersaturated with HA. As a biological organic substrate, alginate $((C_{12}H_{14}CaO_{12})_n)$ bead was chosen due to its abundance in nature and its benign properties.[30] Furthermore, its biodegradation in soil, which produces the most basic units of carbohydrates, such as uronic acids, makes it environmentally sustainable as a fertilizer.[31,32] Replacement of $Na^+$ by $Ca^{2+}$ in the alginate structure naturally forms a spherical bead.[30] This form has been effectively used to encapsulate synthetic nanoparticles or minerals utilized for their catalytic[33-35] and adsorptive properties[36-38] in environmental applications. Unlike previous applications that simply embed pre-synthesized or stable natural minerals, the present disclosure uses the nucleation of reactive CaP seed mineral particulates directly initiated from ionic precursors during the beads' formation. This straightforward preparation allowed a better control of the crystalline structures of seed minerals without using any hazardous substance or additional energy input.[39] Utilizing the properties of calcium phosphate minerals with different crystallinities in alginate beads is a novel approach for P management in aqueous systems. For comparison with the CaP seed minerals, carbonate ($CaCO_3$) was used,[40-42] which is another representative biomineral, to simulate potential substrates for CaP nucleation in natural systems.[43]

The present example establishes the feasibility of mineral/organic composites prepared from naturally abundant resources for P management in aqueous systems at neutral pH. The degree of CaP seed crystallization in the beads was evaluated as a critical factor governing the equilibrium P concentration during the removal and release processes. The findings suggest that engineering the thermodynamic driving force of CaP nucleation is a promising way to regulate P levels in both P-abundant and P-deficient environments as a green chemistry solution.

Experimental

Hydroxyapatite Saturation Index (SI) Mapping of Groundwater: The actual SI values (the log of the ion activity product, IAP, divided by the solubility product, $K_{sp}$) of groundwater samples from three areas in the USA. The Chesapeake Bay area (C. Bay) was chosen because of the frequent occurrence of eutrophication in this region due to inflows from natural and anthropogenic sources.[71,72] Similarly, the coastal Louisiana area (LA) has also faced issues associated with eutrophication and high P levels in the water.[73] Contrarily, an area in northern Illinois area (IL) near Lake Michigan was chosen because of this region's reputation for low P levels,[74] but this area may show relatively high Ca levels due to its calcareous soils.[75]

Groundwater monitoring data (1970-2007) were collected from the USGS National Groundwater Monitoring Network (NGWMN),[21] then processed to determine whether environments were actually supersaturated with respect to HA (HA-supersaturated). The latest data from groundwater samples, including pH, total P (assumed to be equal to total phosphate) concentration, hardness, and total dissolved solid values, were selected as input parameters for Visual MINTEQ (Ver. 3.1), which calculates the SI using its built-in database. Hardness data (as $CaCO_3$) were used as input parameters of $Ca^{2+}$, unless $Ca^{2+}$ concentration was given specifically. The concentrations of $Ca^{2+}$, aqueous carbonate species, $Na^+$, and $Cl^-$ were considered to calculate the ionic strength. By assuming that the amount of total dissolved solids is the sum of the hardness and NaCl, the concentrations of NaCl was estimated. Organic molecules, such as natural organic matter and extracellular matrix proteins from microorganisms, may influence the saturation condition or nucleation energy barrier by complexation with $Ca^{2+}$ or other aqueous species.[76,77] However, in this proof of concept calculation, the input parameters to the inorganic compounds listed above were limited. The SI values for HA, as the output parameters of the software, were placed on SI maps (FIG. 1A, FIG. 1B, and FIG. 1C) created by ArcGIS (Esri, USA), using longitude and latitude information from the NGWMN database.[21]

Figure 1B:
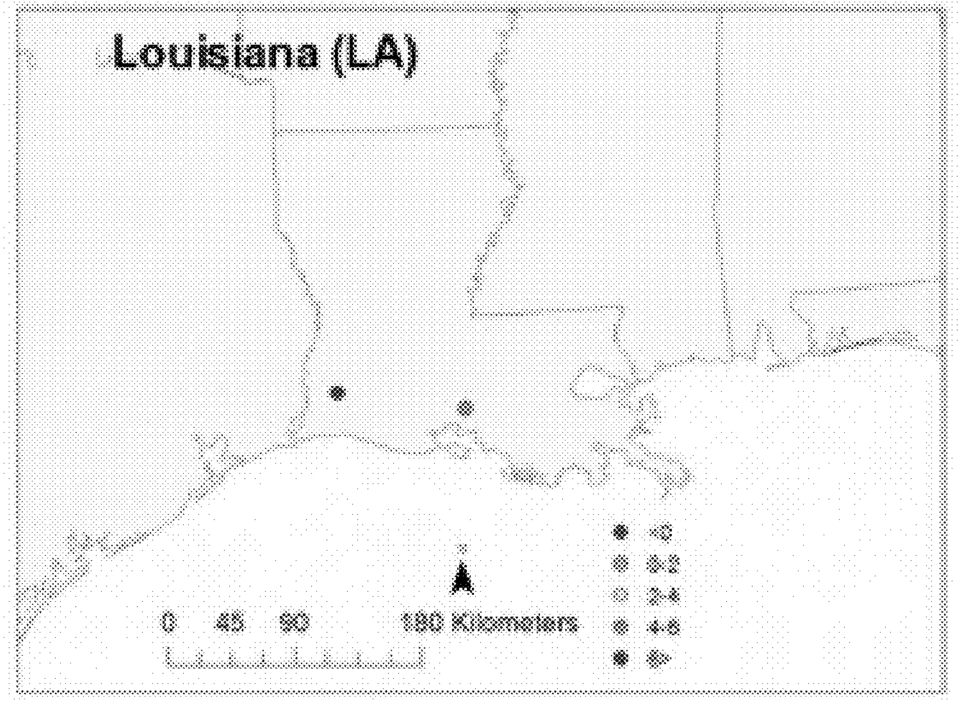

Analysis of SI: Based on our thermodynamic calculations of the SI values for HA, interestingly, 36 out of 48 groundwater samples (75%) in the C. Bay area were HA-supersaturated (FIG. 1A). Most of the HA-supersaturated sampling points were close to the Bay, indicating that significant Ca and P concentrations have been introduced into the ocean through the groundwater. Two sampling sites were studied from LA, and the SI values of both sites were higher than 4 (FIG. 1B). Because of the limited data available, the result may not represent the entire LA area. However, this result also shows that multiple aqueous environments are HA-supersaturated. In contrast, only two out of five sites were slightly HA-supersaturated ($0<SI<2$) in northern IL, and other three sites were undersaturated with respect to HA ($SI<0$, FIG. 1C).

Figure 2A:
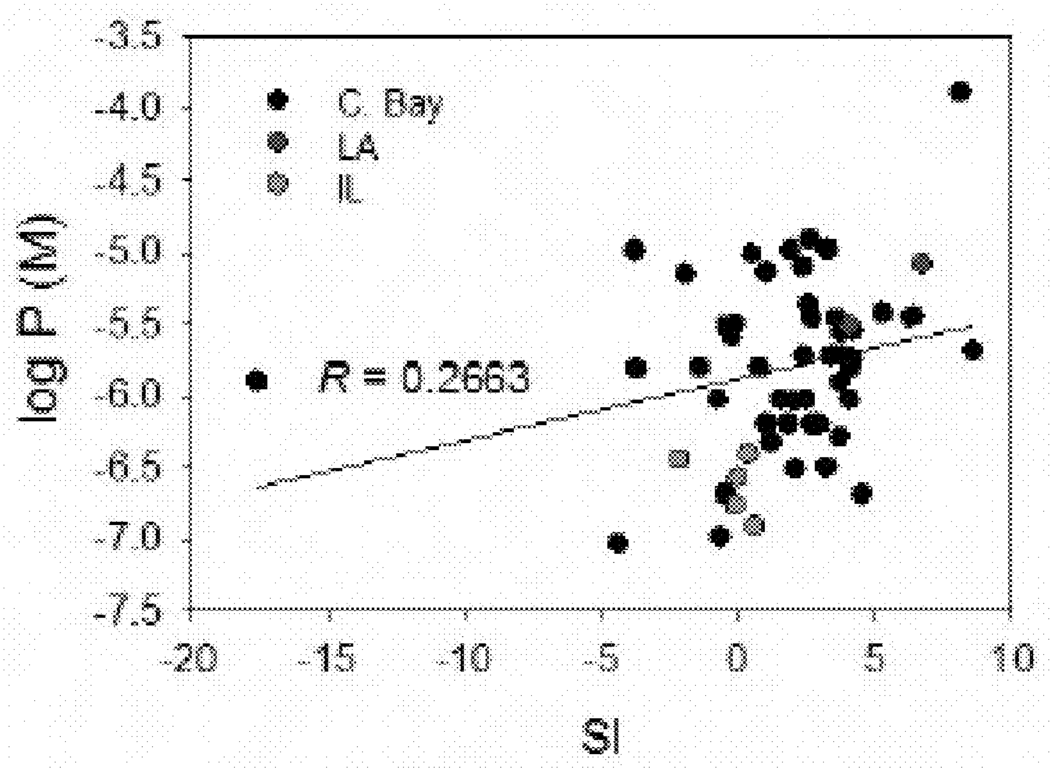
FIG. 2A, FIG. 2B, FIG. 2C, FIG. 2D, FIG. 2E, and FIG. 2F (FIG. 2A, FIG. 2B, and FIG. 2C) Relationships between the SI for HA and concentrations of P, Ca, and pH in three areas studied (C. Bay, Chesapeake Bay; LA, Louisiana; IL, northern Illinois). R is the correlation coefficient from the linear relationship.
Figure 2B:
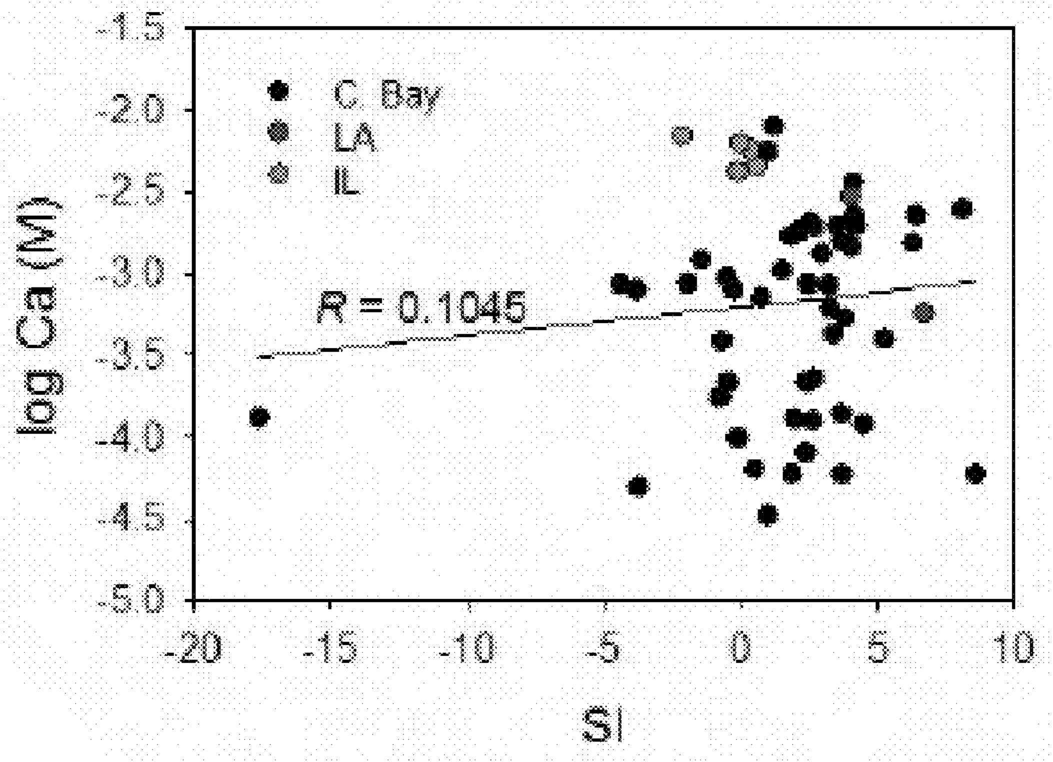
Figure 2C:
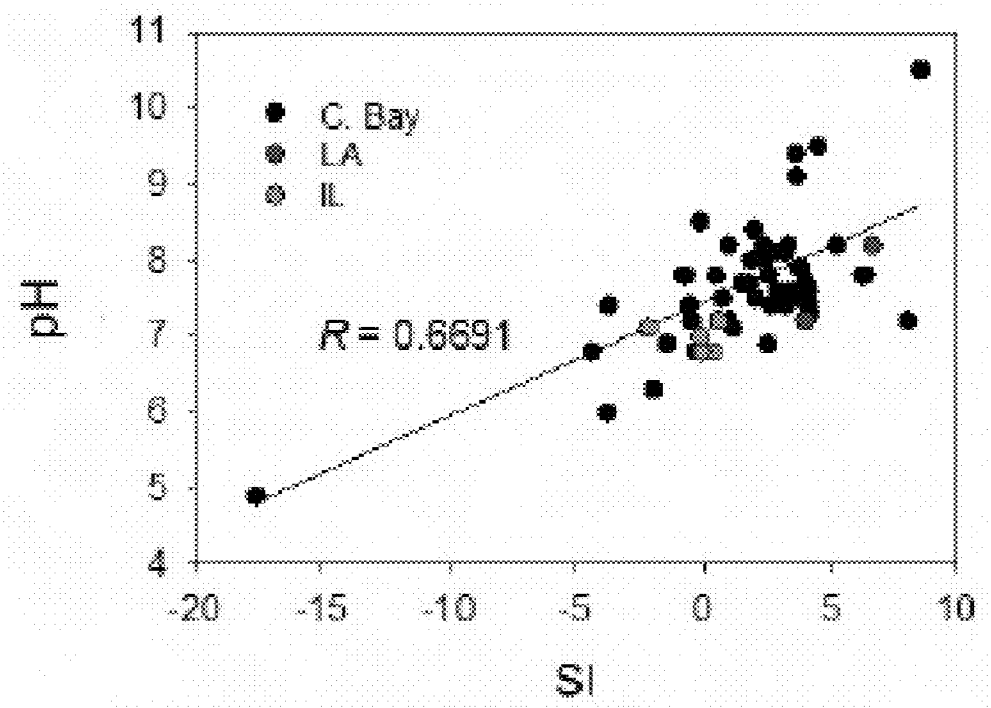
Figure 2D:
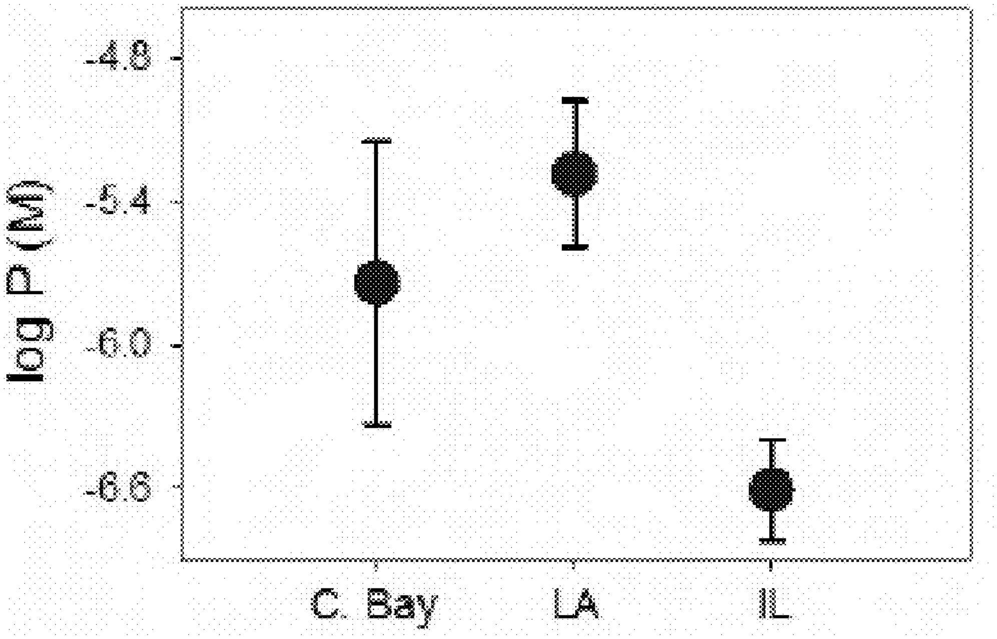
Figure 2E:
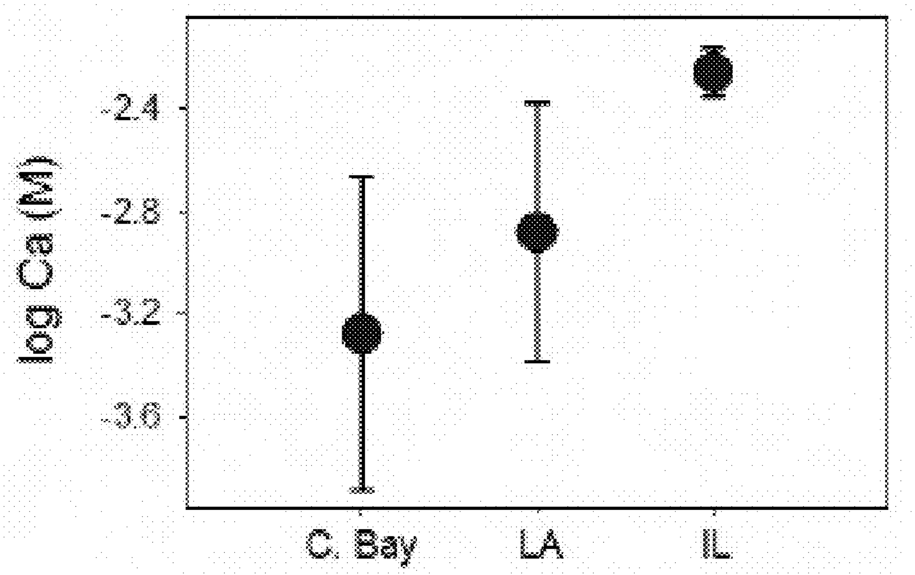
Figure 2F:
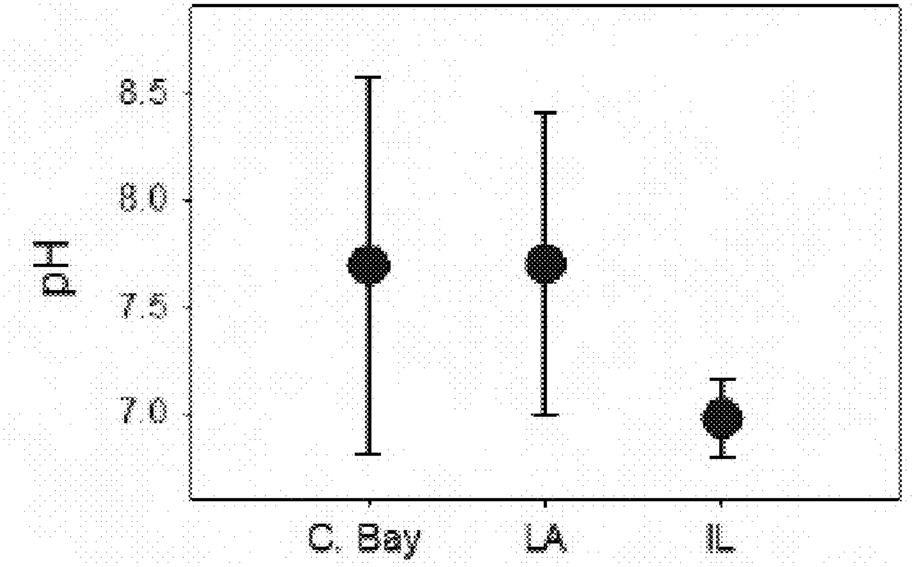
Figure 10:
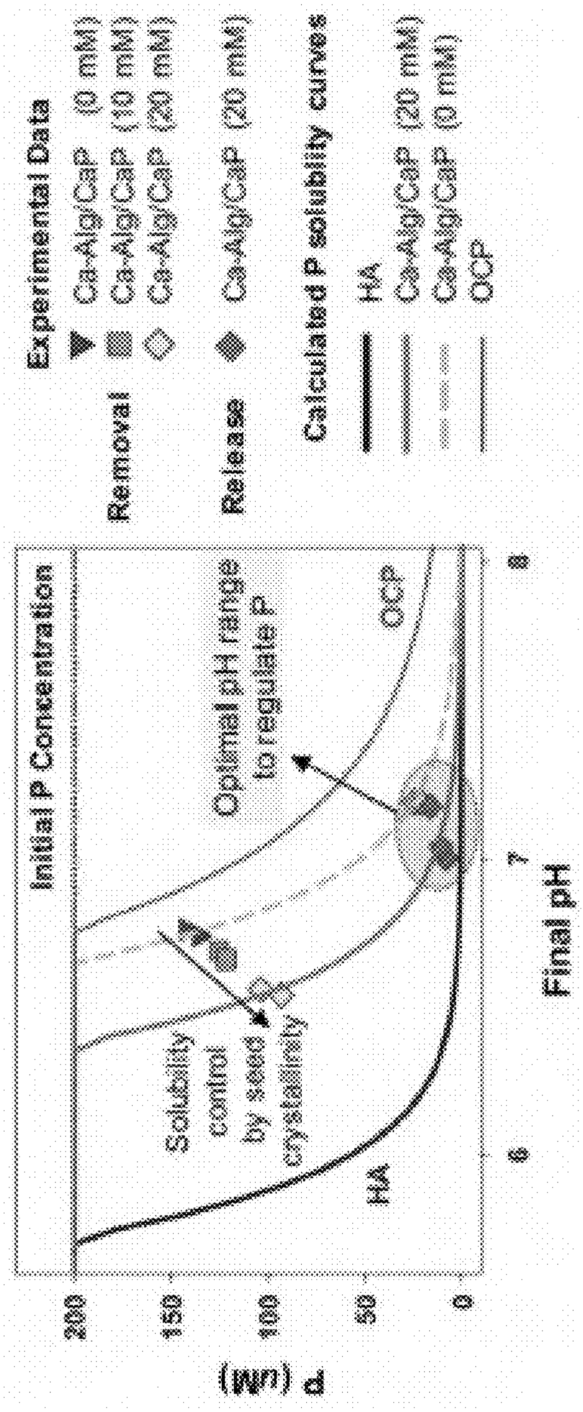
FIG. 10 depicts P concentrations at final pH values obtained from the P removal and release experiments (data from FIG. 7A, FIG. 9A, and FIG. 9B). Blue and red solid lines are drawn based on thermodynamic calculations using the solubility products of hydroxyapatite (HA, $pK_{sp}$=58.5) and octacalcium phosphate (OCP, $pK_{sp}$=48.4). Grey solid and dotted lines apparent P solubility curves for HA calculated based on the experimental data of Ca-Alg/CaP prepared with 20 mM $OH^-$ ($pK'_{sp}$=54.2) and 0 mM $OH^-$ ($pK'_{sp}$=52.5).

The SI values in the three studied areas show correlations in the order pH>P>Ca (FIG. 2A, FIG. 2B, and FIG. 2C). P concentrations in C. Bay and LA are obviously higher than in northern IL (FIG. 2D), suggesting the influence of increasing P levels on eutrophication. Due to the calcareous soils, Ca concentrations in the northern IL are relatively higher than in the other two areas (FIG. 2E). However, due to the region's low P concentrations and pH, SI values are relatively low (FIG. 2C). The pH values for the HA-supersaturated sites are typically higher than 7 (FIG. 2F), and HA is the most stable of calcium phosphate minerals in this pH range.[23] Our study shows that Ca-Alg/CaP can effectively decrease P concentrations close to the equilibrium level with HA at pH around 7 (FIG. 10). Therefore, this strategy can contribute to maintaining the P level in the stable range (e.g., equilibrium with seed mineral in beads), preventing a sudden increase of P in the aqueous systems.

Figure 4:
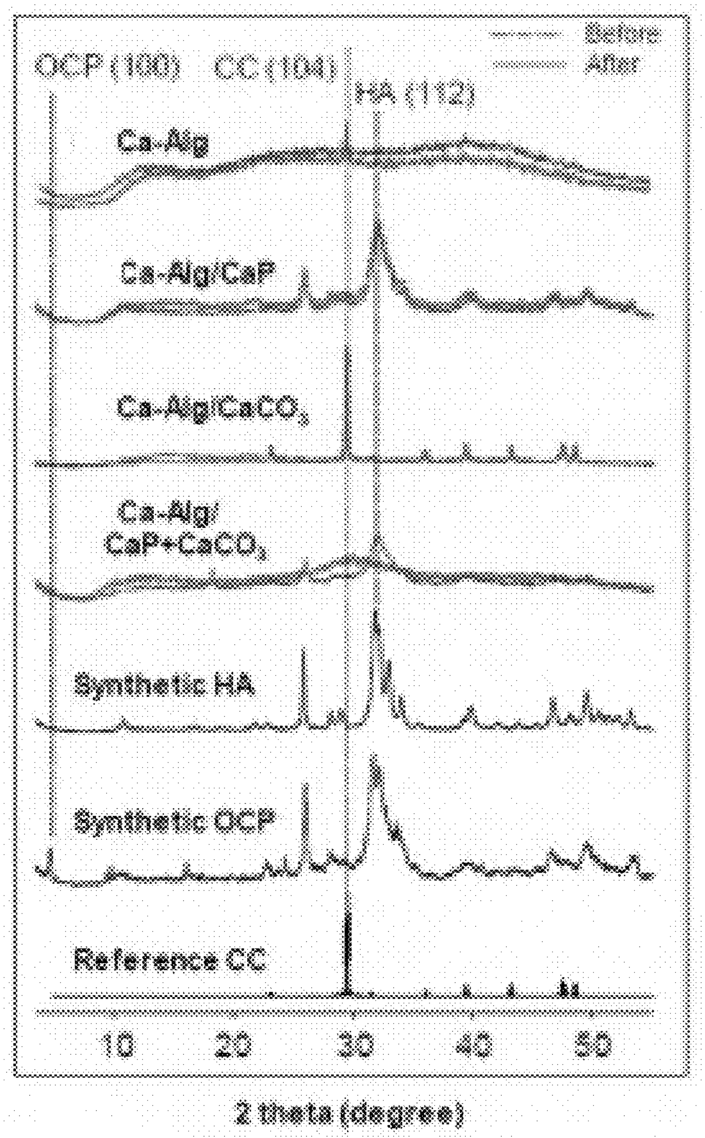
FIG. 4 depicts X-ray diffraction patterns of calcium alginate beads with different seed minerals (a-d) before and after the P removal reaction under the hydroxyapatite (HA)-supersaturated condition. Synthetic HA and octacalcium phosphate samples (OCP) were analyzed for comparison. Reference calcite (CC) was prepared from Iceland spar crystal Chihuahua, Mexico (Ward's Science, USA).

Preparation of Ca-alginate beads: All chemicals used in this study were at least ACS grade, and solutions for the experiments were prepared using deionized water (≥18.2 MΩ-cm, Barnstead ultrapure water systems). Four different types beads were synthesized: calcium alginate beads without any seed mineral (Ca-Alg), and beads with CaP, $CaCO_3$, and both CaP and $CaCO_3$ (called Ca-Alg/CaP, Ca-Alg/$CaCO_3$, and Ca-Alg/CaP+$CaCO_3$, respectively). Ca-Alg beads were prepared by slowly adding 2 mL of sodium alginate solution (6 mg $mL^{-1}$, Spectrum Chemical SO106) dropwise into a 50 mL Ca bath (180 mM $CaCl_2$ and 20 mM NaOH) with mild stirring at room temperature. Each droplet of the solution immediately formed one spherical Ca-Alg bead (2.8±0.2 mm in diameter, Table 1). To seed CaP or $CaCO_3$ nuclei inside Ca-Alg beads, 35.2 mM $Na_2HPO_4$ or 119.0 mM $NaHCO_3$ were mixed into the sodium alginate solutions, respectively. CaP or $CaCO_3$ nuclei formed simultaneously with the formation of beads. The SI values of the reaction solutions, defined as the ion activity product (IAP) over the solubility product ($K_{sp}$) in log scale, were calculated using Visual MINTEQ (ver. 3.1). The SI values of solutions forming CaP and $CaCO_3$ nuclei were 27.6 for HA and 4.3 for calcite, respectively. Photographs of the four bead types are shown in FIG. 4, with particle size analyses and dry weight measurements in Table 1.

TABLE 1

Bead sizes and dry weights of beads and seed minerals.

| | Ca-Alg | Ca-Alg/CaP | Ca-Alg/ $CaCO_3$ | Ca-Alg/CaP + $CaCO_3$ |
|---|---|---|---|---|
| Bead size (mm) | 2.8 ± 0.2 | 3.3 ± 0.4 | 3.8 ± 0.2 | 3.2 ± 0.4 |
| Dry weight (mg)* | 14.0 ± 3.9 | 19.7 ± 1.7 | 19.4 ± 1.3 | 24.7 ± 2.0 |
| Seed weight (mg) | — | 5.7 | 5.5 | 10.7 |

Three different crystalline degrees of seeds in Ca-Alg/CaP beads were obtained by varying the $OH^-$ concentrations (0, 10, and 20 mM NaOH) in Ca baths. Because most CaP minerals, including HA, show lower solubility at higher pH,[23] it was hypothesized that the addition of $OH^-$ made seed nuclei form in a solution with higher SI with respect to HA, and that the higher SI provided a higher HA nucleation driving force, leading to formation of seed minerals with higher crystallinity. All beads, after dropwise addition, were stored in the Ca bath for four hours, during which time they settled at the bottom of the bath. Then beads were rinsed with deionized water five times to remove unreacted phosphate or carbonate precursors before being used for batch experiments. For the reference samples used to compare the mineral crystallographies in systems, synthetic HA (purchased from ACROS Organics) and octacalcium phosphate (OCP, synthesized as described by Arellano-Jimenez et al.[44]), and Iceland spar calcite crystals obtained from Chihuahua, Mexico, (purchased from Ward's Science, USA) were used.

Analysis of bead size: To analyze the particle sizes, ImageJ 1.47v (National Institutes of Health, USA) was used. The average and standard deviation values for each bead type were obtained by measuring 15 samples. For the batch experiments for P removal, 2 mL of sodium alginate solution (6 mg $L^{-1}$) was added dropwise to form beads. The average and standard deviation of the dry weight were obtained from triplicate bead preparation procedures. Beads were fully dried in a 105° C. oven for 24 hours before the measurements. The dry weights of Ca-Alg beads were slightly higher than the amount of initially added sodium alginate (12 mg) because of calcium replacement and structural water inside the composites. The dry weights of seed minerals were calculated by subtracting that of Ca-Alg beads.

Procedures for other characterizations of beads and seed minerals: Before and after the P removal experiments, to characterize the crystalline structure of seed minerals and to image the surfaces of beads, X-ray diffraction (XRD, Bruker D8 Advance) data and scanning electron microscope (SEM, FEI Nova NanoSEM 2300) images of beads were used, respectively. To prepare samples for XRD and SEM analyses, beads were air-dried and gently ground with ethanol in an agate mortar. For XRD analysis, ground samples were placed on a zero diffraction Si plate (MTI Corporation), then the XRD patterns were collected using Cu Kα radiation (40 kV and 40 mA). For SEM analysis, ground samples were placed on adhesive carbon tapes attached on SEM stubs, sputter-coated with Au—Pd under Ar gas at 0.2 mbar (Cressington 108) to increase conductivity, then imaged with a 10 kV electron accelerating voltage at 5-6 mm working distances.

To characterize the particle size and crystallinity of CaP seed nuclei prepared with different $OH^-$ concentrations, X-ray scattering data were collected at the Advanced Photon Source (APS) at Argonne National Laboratory (Argonne, Ill., USA). Beads were packed in Kapton polyimide capillaries (Cole-Parmer, inner diameter 1.46 mm) without any dehydration procedures. Analyses of samples under hydrated conditions maintained the particle sizes and phases of CaP nuclei. Wide-angle X-ray diffraction (WAXD) and X-ray pair distribution function (PDF) data were collected at sector 11-ID-B using a 58.66 keV X-ray beam.[78] For the WAXD data collection, samples were exposed to the beam for 25 sec at a sample-to-detector distance (SDD) of 95 cm. For the X-ray PDF, data was collected during 3 min of beam exposure using a 20 cm SDD. Then one-dimensional data were produced by using FIT2D software provided by European Synchrotron Radiation. The PDF function, G(r), was obtained by PDFgetX2 software to provide the atomic number density as a function of atomic separation distances, r.[79] The particle size (d) was evaluated over a wide range of the scattering vector, q=0.0001-0.1 $Å^{-1}$, using ultra-small-angle X-ray scattering (USAXS). Because $d=2\pi/q$, the corresponding particle size range was 6.3 nm-6.3 μm. USAXS data was collected at sector 9-ID-C using a 21.0 keV X-ray beam.[79] Data analyses, including one-dimensional data reduction and fitting scattering patterns, were conducted using a series of macro programs in the IRENA package written in IGOR Pro (WaveMetrics Inc.), which was provided by sector 9-ID-C.[57-59] In addition, SAXS measurements of samples were conducted at sector 12-ID-B (14.0 keV) to better evaluate the features of small particles appearing at q=0.009-0.3 $Å^{-1}$ (d=2-70 nm). The WAXD, USAXS, and SAXS patterns of an empty Kapton capillary were also collected for background subtraction.

Thermodynamic calculations of Ca and P concentrations in equilibrium with different calcium phosphate minerals: The concentrations of Ca and P species equilibrated with different calcium phosphate minerals at pH 5-10 were calculated based on the equilibrium constants among calcium, phosphate, and carbonate species. To simulate the calcium phosphate saturated condition used in this study, 10 mM NaCl, 2 mM $CaCl_2$, and 0.2 mM $Na_2HPO_4$ were added as initial aqueous components, and an open carbonate system ($p_{CO_2}=10^{-3.5}$, $p_{CO_2}/[H_2CO_3(aq)]=31.6$ atm/M) was assumed. The association/dissociation reactions listed in eq. 1-11 were considered for the calculation of the activities of carbonate, phosphate, and calcium species in the system.[81, 82]

$$K_{A1,CO3} = \frac{(H^+)(HCO_3^-)}{(H_2CO_3(aq))} = 10^{-6.35} \quad \text{eq. 1}$$

$$K_{A2,CO3} = \frac{(H^+)(CO_3^{2-})}{(HCO_3^-)} = 10^{-10.33} \quad \text{eq. 2}$$

$$K_{A1,PO4} = \frac{(H^+)(H_2PO_4^-)}{(H_3PO_4(aq))} = 10^{-2.12} \quad \text{eq. 3}$$

$$K_{A2,PO4} = \frac{(H^+)(HPO_4^{2-})}{(H_2PO_4^-)} = 10^{-7.21} \quad \text{eq. 4}$$

$$K_{A3,PO4} = \frac{(H^+)(PO_4^{3-})}{(HPO_4^{2-})} = 10^{-12.32} \quad \text{eq. 5}$$

$$K_{CaHCO_3^+} = \frac{(CaHCO_3^+)}{(Ca^{2+})(HCO_3^-)} = 10^{1.16} \quad \text{eq. 6}$$

$$K_{CaCO_3(aq)} = \frac{(CaCO_3(aq))}{(Ca^{2+})(CO_3^{2-})} = 10^{3.38} \quad \text{eq. 7}$$

-continued $$K_{CaOH^+} = \frac{(CaOH^+)}{(Ca^{2+})(OH^-)} = 25.12 \quad \text{eq. 8}$$

$$K_{CaH_2PO_4^+} = \frac{(CaH_2PO_4^+)}{(Ca^{2+})(H_2PO_4^-)} = 31.9 \quad \text{eq. 9}$$

$$K_{CaHPO_4(aq.)} = \frac{(CaHPO_4(aq))}{(Ca^{2+})(HPO_4^{2-})} = 6.81 \times 10^2 \quad \text{eq. 10}$$

$$K_{CaPO_4^-} = \frac{(CaPO_4^-)}{(Ca^{2+})(PO_4^{3-})} = 3.46 \times 10^6 \quad \text{eq. 11}$$

The activity of each ionic component, i, in parentheses was the product of its concentration, $C_i$, and the activity coefficient of the component, $\gamma_i$ by the Davies equation (eq. 12). I is the ionic strength of the solution (eq. 13) and Z is the charge of the component.[82]

$$\log\gamma_i = -0.5z_i^2\left[\frac{I^{\frac{1}{2}}}{1+I^{\frac{1}{2}}} - 0.2I\right] \quad \text{eq. 12}$$

$$I = \frac{1}{2}\sum_i c_i z_i^2 \quad \text{eq. 13}$$

By applying eqs. 1-13 to mass balance equations with respect to Ca, $PO_4^{3-}$, and $CO_3^{2-}$, we calculated the activities of all components and the IAP of three different calcium phosphate minerals: HA (eq. 14), octacalcium phosphate (OCP, eq. 15), and dicalcium phosphate (DCP, eq. 16). In addition to these calcium phosphate minerals, the most stable calcium carbonate mineral, calcite (CC, eq. 17), was considered as well, due to the higher possibility of its formation in an aqueous system with a sufficient amount of Ca in a high pH range.

$$IAP_{HA} = (Ca^{2+})^5(PO_4^{3-})^3(OH^-) \quad \text{(eq. 14)}$$

$$IAP_{OCP} = (Ca^{2+})^4(H^+)(PO_4^{3-})^3 \quad \text{(eq. 15)}$$

$$IAP_{DCP} = (Ca^{2+})(HPO_4^{2-}) \quad \text{(eq. 16)}$$

$$IAP_{CC} = (Ca^{2+})(CO_3^{2-}) \quad \text{(eq. 17)}$$

The SI for each mineral can be calculated by IAP over $K_{sp}$ in log scale $$\left(SI = \log\frac{IAP}{K_{sp}}\right).$$

The experimentally determined $K_{sp}$ values were obtained from different literature sources: $K_{sp,HA}=10^{-58.5}$ at 25° C.,[18] $K_{sp,OCP}=10^{-48.4}$ at 23.5° C.,[87] $K_{sp,DCP}=10^{-6.62}$ at 25° C.,[20] and $K_{sp,CC}=10^{-8.48}$ at 25° C.[21] SI values were evaluated for each mineral at each pH, from 5 to 10 with 0.05 steps. When SI>0, we assumed that phosphate (or carbonate for CC) species were governed by $K_{sp}$ reaching an equilibrium. Thus concentrations of all the species were recalculated until the sum of Ca precipitated as a mineral and all the aqueous Ca species equaled the initial Ca amount in the system. The computational work was done using a script written in MATLAB R2013 (Mathworks, USA).

Figure 6A:
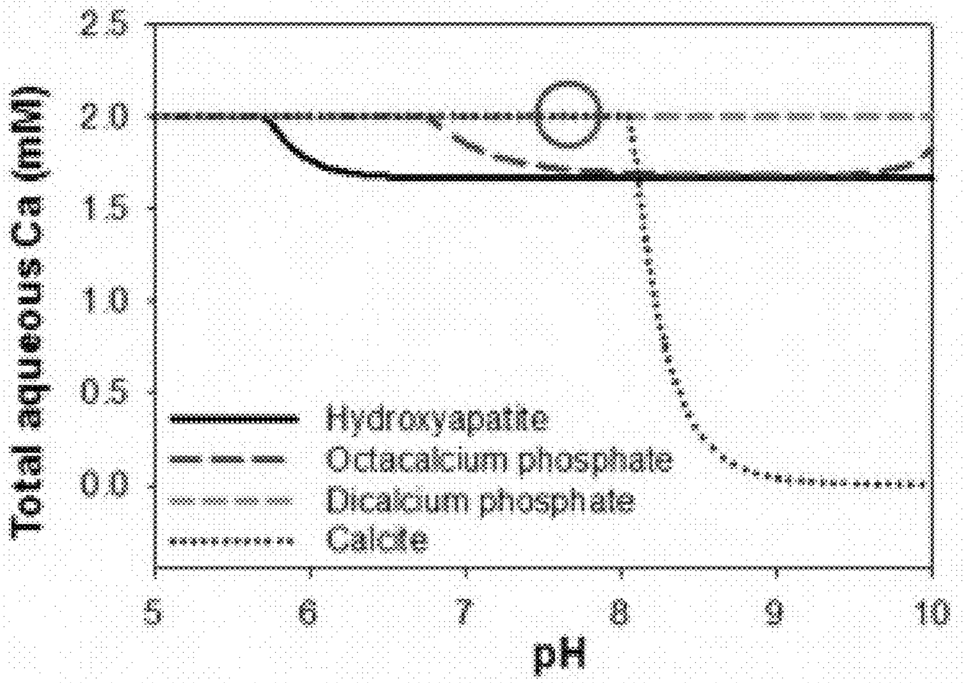
FIG. 6A, FIG. 6B, and FIG. 6C depict Ca and P concentrations in equilibrium with different calcium phosphate and carbonate minerals at pH 5-10 (FIG. 6A and FIG. 6B). Initial conditions of the system: 10 mM NaCl, 2 mM $CaCl_2$, and 0.2 mM $Na_2HPO_4$. Open carbonate system. Plotted saturation indices for calcium phosphate minerals under the initial condition in the pH range (FIG. 6C). The blue box in (FIG. 6C) highlights the experimental regime used in this study. Red circles in (FIG. 6A, FIG. 6B, and FIG. 6C) indicate the initial experimental condition for P removal experiments in the saturated system.
Figure 6B:
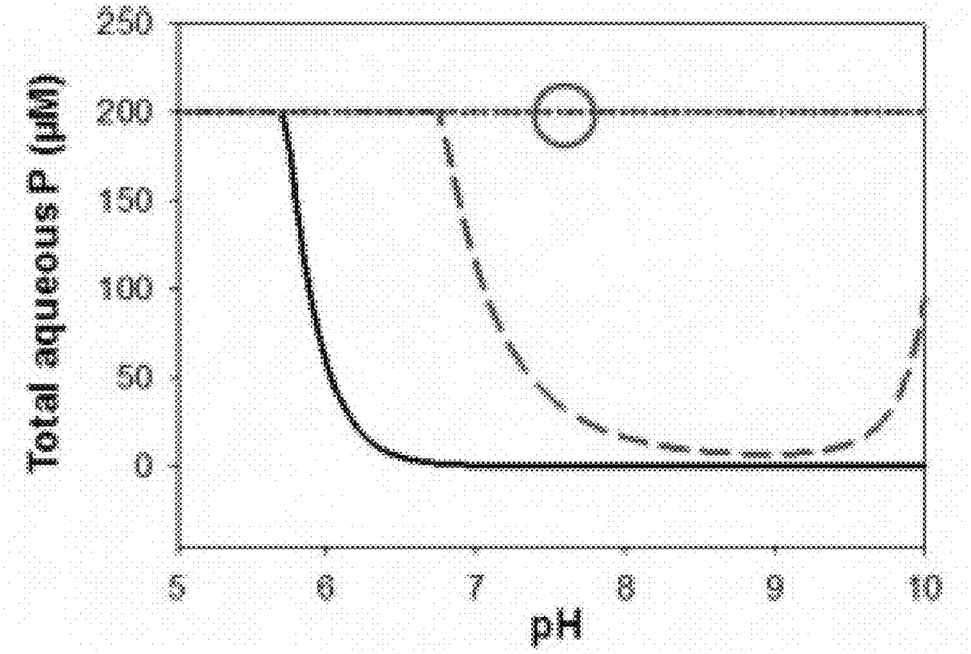
Figure 6C:
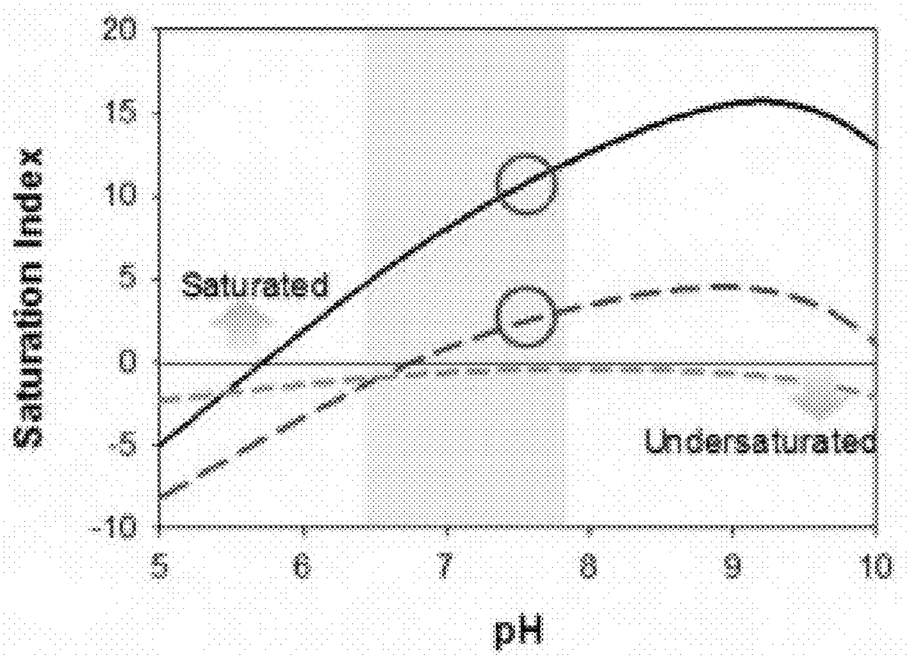

FIG. 6A and FIG. 6B show the total aqueous Ca and P concentrations, equilibrated with different calcium phosphate and carbonate minerals at pH 5-10. FIG. 6C shows the SI with respect to different calcium phosphate minerals. Among the minerals studied, HA shows the lowest solubility above pH 6. Aqueous P concentration starts to decrease at pH 7, when equilibrium with OCP is reached. However, the system is undersaturated with respect to dicalcium phosphate within the pH range evaluated. Calcite formation becomes significant above pH 8, and therefore, carbonate may compete with phosphate for Ca above that pH. However, the equilibrium pH values of the solution after the experiments in this study were all below pH 8, thus the possibility of CC formation was considered insignificant.

P removal and release experiments: To evaluate the P removal efficiencies of beads with different seed nuclei, batch experiments were conducted in both HA-supersaturated (2 mM $CaCl_2$, 10 mM NaCl, and 0.2 mM $Na_2HPO_4$) and HA-undersaturated (0 mM $CaCl_2$, 10 mM NaCl, and 0.2 mM $Na_2HPO_4$) solutions. The SI value for the HA-supersaturated condition was 11.8 at an initial pH of 7.8±0.1. However, with respect to calcite, the system was undersaturated at pH<8. Beads prepared from a 2 mL volume of the sodium alginate solution were added to 100 mL of HA-supersaturated and undersaturated solutions with mild stirring. At 2, 5, and 22 hours of reaction time, 2 mL of solution from each batch was filtered (0.45 μm) and diluted with 1% trace metal $HNO_3$ for analyses of Ca and P concentrations, using inductively coupled plasma-optical emission spectrometry (ICP-OES, PerkinElmer Optima 7300DV). To evaluate the P removal efficiencies of different crystallinities of CaP seed nuclei prepared with varying OH-concentrations in the Ca bath, similar batch experiments were conducted under the HA-supersaturated condition (SI=11.0 at initial pH 7.6±0.1).

To test the potential reuse of beads as a fertilizer, the release of P from beads was also evaluated. The beads were transferred to a fresh batch containing no phosphate ions (2 mM $CaCl_2$ and 10 mM NaCl, initial pH 6.8±0.1) after P removal experiments. Changes in P concentrations were measured until equilibrium (up to 24 hours, called one cycle), then the beads were transferred to another P-free solution batch to repeat the experiments. In total, three cycles of batch experiments were conducted using same beads to evaluate how seed minerals control the equilibrium P concentrations over multiple cycles with a decreasing amount of available P from the beads. In addition, to evaluate P release kinetics in a soil-relevant condition, sand column experiments (cross-sectional dimension 2.5×2.5 cm) were conducted. The columns were packed with a 5 cm thickness of acid-rinsed sand on top of a 3 cm thick gravel layer, then beads prepared from 5 mL of sodium alginate solutions were applied on top of the column. Then, 10 mM NaCl solution was injected at a flow rate of 80 mL $h^{-1}$ for 4 hours. Effluent was collected for every 30 minutes for P quantification. To quantify P during the releasing experiments, the colorimetric molybdenum blue method was used by measuring the maximum absorbance at 880 nm with a UV-visible spectrophotometer (Thermo Scientific Evolution 60S).[45] Duplicate batch experiments were conducted for both P removal and release experiments.

Because HA mineralization releases protons (e.g., $5Ca^{2+}+3HPO_4^{2-}+OH^- \rightarrow Ca_5(PO_4)_3OH+3H^+$),[46] the pH of the solutions slightly decreased during P removal and increased during P release. To fairly compare the final P concentrations from different experiments at similar final pH ~7, the initial pH values for different experiments were adjusted to 6.8-7.8.

Characterization of beads and seed minerals: Scanning electron microscope (SEM) and X-ray diffraction (XRD)

were used to identify the seed minerals in the beads. Ca-Alg/CaP beads prepared at different OH_ concentrations were further characterized by multiple synchrotron-based X-ray analyses: wide-angle X-ray diffraction (WAXD), X-ray pair distribution function (PDF), and ultra-small- and small-angle X-ray scattering (USAXS and SAXS). The characterization data was obtained at the Advanced Photon Source (APS, at sectors 9-ID-C, 11-ID-B, and 12-ID-B) at Argonne National Laboratory (Argonne, Ill., USA).

Thermodynamic calculations: For the HA-supersaturated system, concentrations of Ca and P species in equilibrium with different minerals at pH 5-10 were calculated using a script written in MATLAB (Mathworks, USA) with the following input solubility products: $K_{sp}=10^{-58.5}$, $10^{-48.4}$, $10^{-6.62}$, and $10^{-8.48}$, respectively for HA ($Ca_5(PO_4)_3OH$),[47] OCP ($Ca_8H_2(PO_4)_6.5H_2O$),[48] dicalcium phosphate dehydrate (DCP, $CaHPO_4.2H_2O$),[49] and calcite (CC, $CaCO_3$).[50] SI values for these phosphate minerals were also calculated, and the procedures and results are detailed below. A potential formation of struvite is also evaluated below.

Results and Discussion

Figure 5A:
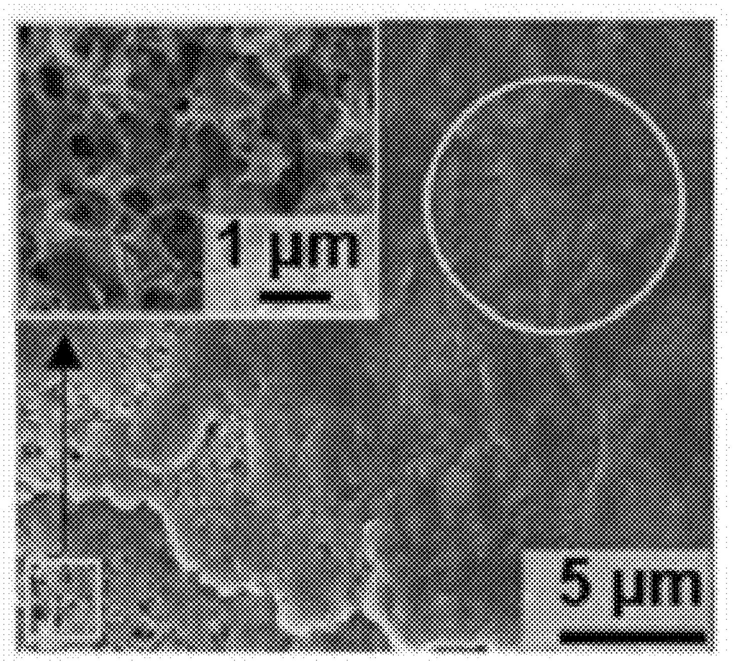
FIG. 5A, FIG. 5B, FIG. 5C, and FIG. 5D depict Scanning Electron Microscopy (SEM) images of (FIG. 5A) Ca-Alg, (FIG. 5B) Ca-Alg/CaP, (FIG. 5C) Ca-Alg/$CaCO_3$ with a zoomed in image showing faceted calcite crystals, and (FIG. 5D) Ca-Alg/CaP+$CaCO_3$ before and after P removal reaction.
Figure 5B:
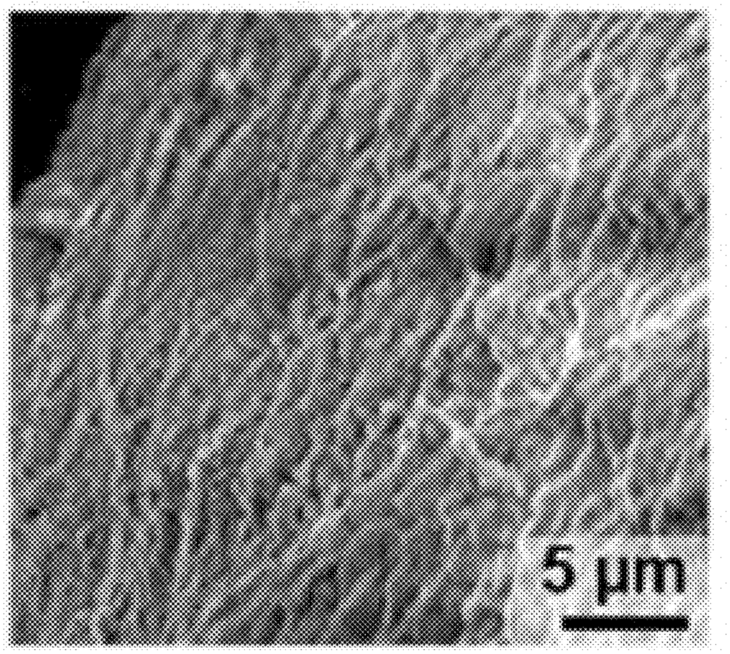
Figure 5C:
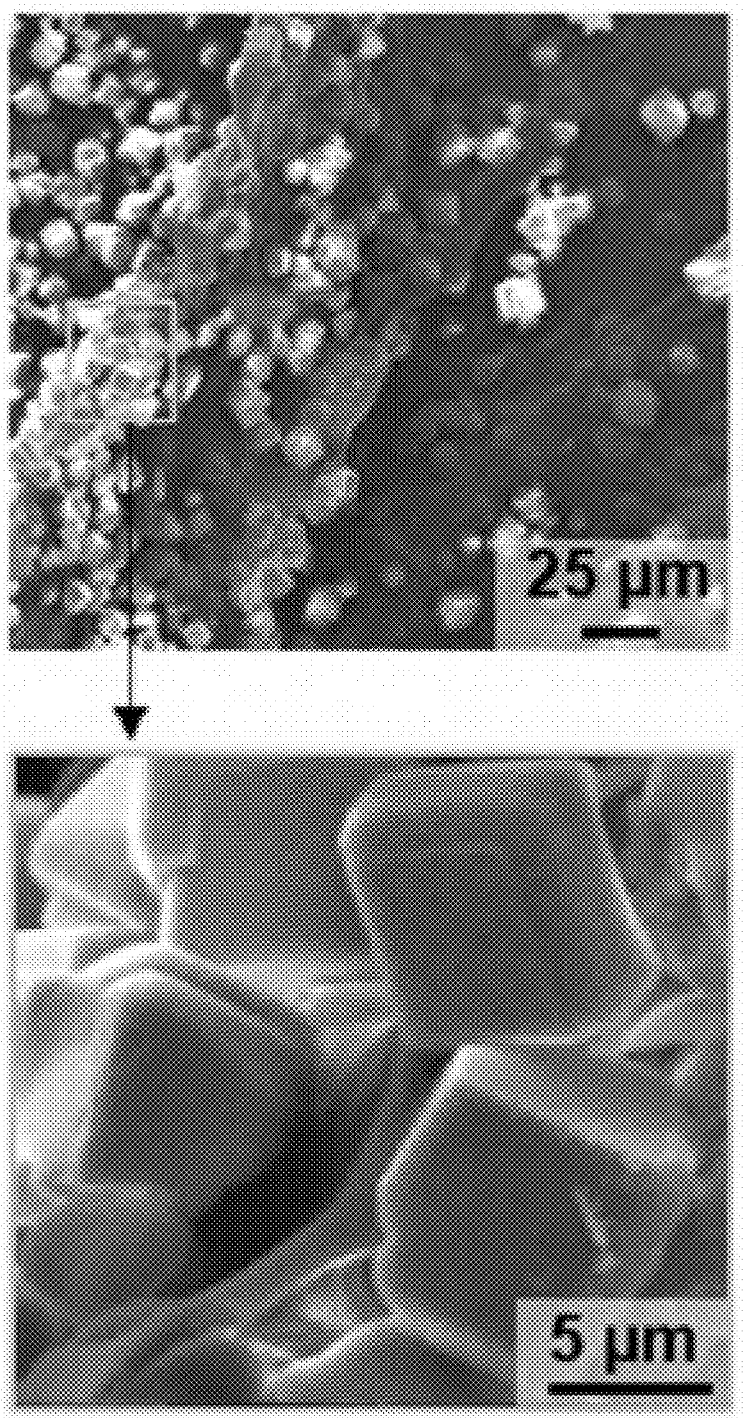

Characterization of beads with different seed minerals: Ca-Alg beads with no seed mineral did not show specific crystalline phases (FIG. 5A, FIG. 5B, FIG. 5C, and FIG. 5D), showing both relatively flatter alginate surfaces (circle in FIG. 5A) compared to other systems and porous structures (inset of FIG. 5A) in SEM images. A small sharp peak was observed in their XRD pattern at 2 theta=29.5°, which corresponds to the strongest peak of calcite (FIG. 4). It was postulated that a small fraction of calcite formed inside the Ca-Alg during the formation of beads in the Ca bath. In the Ca bath containing 20 mM of NaOH (pH above 12), calcite could form in the open carbonate system without any additional source of carbonate (FIG. 6A). Additions of phosphate precursors nucleated poorly crystalline HA-like CaP seed minerals. The XRD pattern of Ca-Alg/CaP was similar to that of the synthetic HA reference sample, but peaks from individual crystalline faces were not as fully developed (FIG. 4) as those from the synthetic HA. No individual crystal particles were apparent in the SEM images of the surface of Ca-Alg/CaP, but increased surface rippling was observed after seeding CaP nuclei in Ca-Alg (FIG. 7B). CaP seed nuclei might be tightly bound or fully embedded in the alginate structure, presumably filling the porous structures. This structure can be achieved through our approach of forming seed nuclei simultaneously with the gelation of beads. In the Ca-Alg/$CaCO_3$ system, a clear calcite structure was observed in the XRD pattern (FIG. 4). Correspondingly, in FIG. 5C, rhombohedral calcite crystals are visible on the surface of the beads.

The XRD patterns of Ca-Alg, Ca-Alg/CaP, and Ca-Alg/$CaCO_3$ did not change after 22 hours of reaction under the HA-supersaturated condition, indicating that no existing crystalline phase disappeared and no noticeable crystalline phase was newly formed. A change in the XRD pattern was observed only for Ca-Alg/CaP+$CaCO_3$, which transformed the phase of nuclei from amorphous to poorly crystalline HA (FIG. 4). Because the broad XRD peak of amorphous nuclei corresponds to the strongest peak of calcite, the dominant phase of nuclei is expected to be amorphous calcium carbonate (ACC) containing a relatively large amount of phosphate. In the SEM images of Ca-Alg/CaP+$CaCO_3$, only scattered submicron spherical particles (arrows in the top image of FIG. 5D) initially formed on the surface of beads, while more planar crystals a few microns in diameter formed after the P removal reaction (circles in the bottom image of FIG. 5D).

P removal by calcium alginate beads with different seed minerals: The removal of P by beads with different seed minerals through batch experiments, monitoring P and Ca concentrations under both HA-supersaturated and HA-undersaturated conditions was evaluated. In the control experiment (no beads) under the HA-supersaturated solution, both P and Ca (FIG. 7A and FIG. 7C) concentrations remained constant during 22 hour of reaction. This observation confirms that there was no significant nucleation (i.e., there was a high energy barrier for HA nucleation). With Ca-Alg beads (no seed mineral), about 15% of P was removed from solutions during 22 hours. The role of a biological template in stimulating CaP nucleation has been previously reported.[29,46] However, no crystalline structural change was observed in the XRD data of the beads after the experiments (FIG. 4), indicating that the CaP nucleation and crystallization were not sufficiently enhanced by Ca-Alg within 22 hours. Instead, P species at prenucleation stages might be loosely bound to the alginate surface.[29]

Figure 7A:
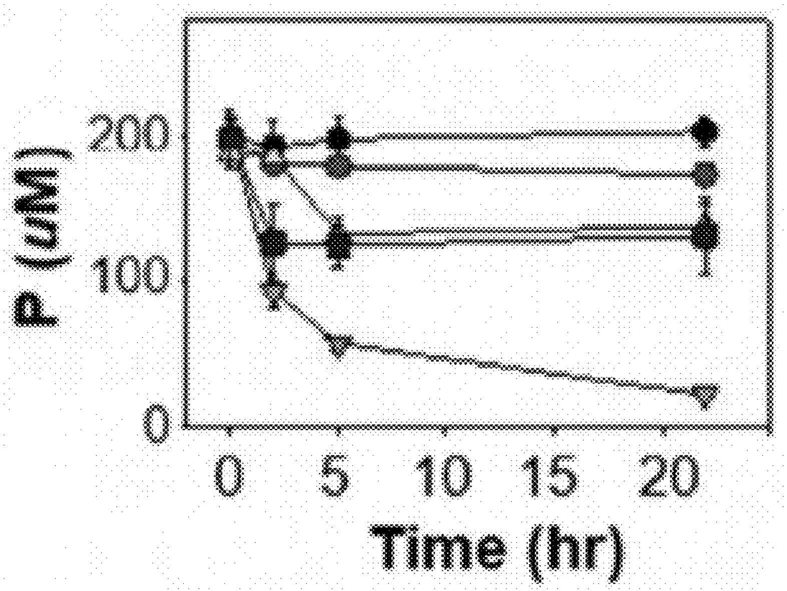
FIG. 7A, FIG. 7B, and FIG. 7C depict P and Ca concentrations during P removal reactions using Ca-Alg with different seed minerals in solutions initially supersaturated (FIG. 7A and FIG. 7C) and undersaturated (FIG. 7B and FIG. 7D) with hydroxyapatite. Initial conditions: 10 mM NaCl, 0.2 mM $Na_2HPO_4$, pH=7.8; For the HA-supersaturated condition, 2 mM $CaCl_2$ was added.
Figure 7B:
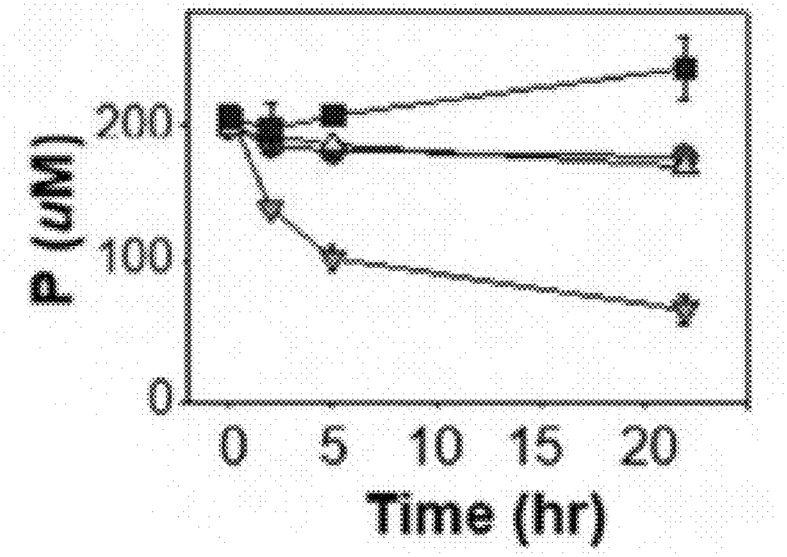
Figure 7C:
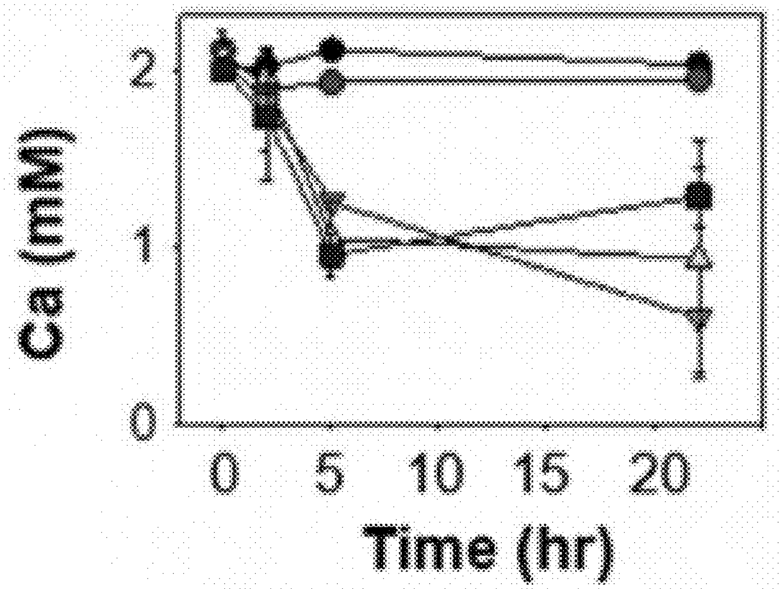

P removal efficiencies increased with seed minerals in the beads under the HA-supersaturated condition (FIG. 7A). The highest P removal efficiency was achieved by Ca-Alg/CaP, reducing P concentrations from an initial 200 μM to 22.7 μM in 22 hours (at final pH 7.2), which was close to or even below the typical P-levels in biologically or chemically treated effluents from wastewater treatment plants (~30-60 μM).[7] Because the XRD data showed no difference in patterns before and after the P removal process, it was concluded that P was sequestered in the beads as a form of calcium phosphate mineral with a crystalline structure similar to the seed mineral (FIG. 4). Therefore, as expected, the SI of the system also significantly decreased with Ca-Alg/CaP, from an initial value of 11.8 to 4.0 within 22 hours. The pH change of the solution did not contribute to the P removal, because the pH actually decreased slightly, from 7.8 to 7.2, during the experiments. With other types of beads, the final pH values were slightly higher (7.4-7.7) than with CaP seed, but their removal efficiencies were even lower.

Figure 3A:
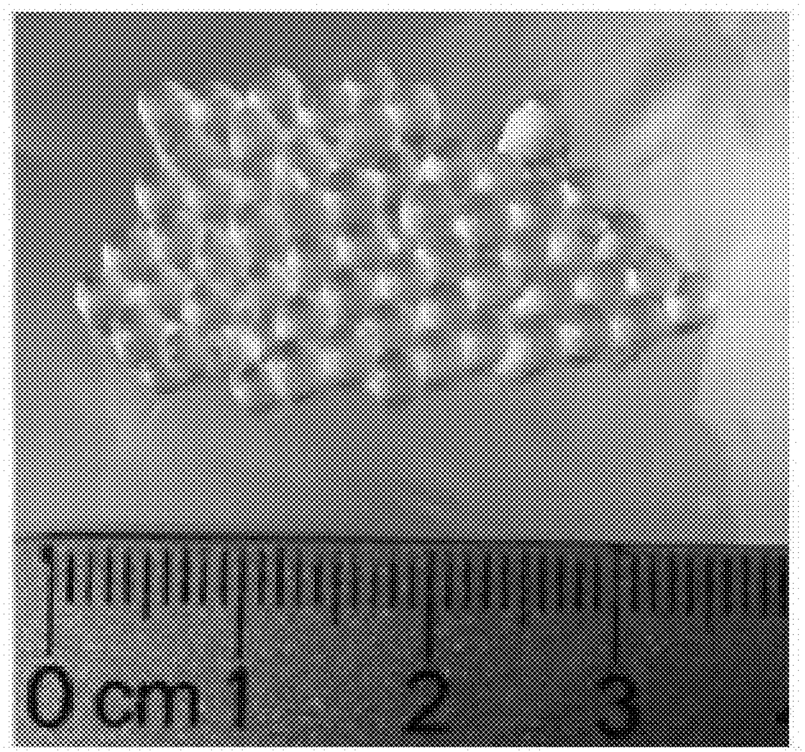
FIG. 3A, FIG. 3B, FIG. 3C, FIG. 3D, FIG. 3E, and FIG. 3F depict Photographs of the four different types of beads used in this study (FIG. 3A) Ca-Alg, (FIG. 3B) Ca-Alg/CaP, (FIG. 3C) Ca-Alg/$CaCO_3$, and (FIG. 3D) CA-Alg/CaP+$CaCO_3$.
Figure 3B:
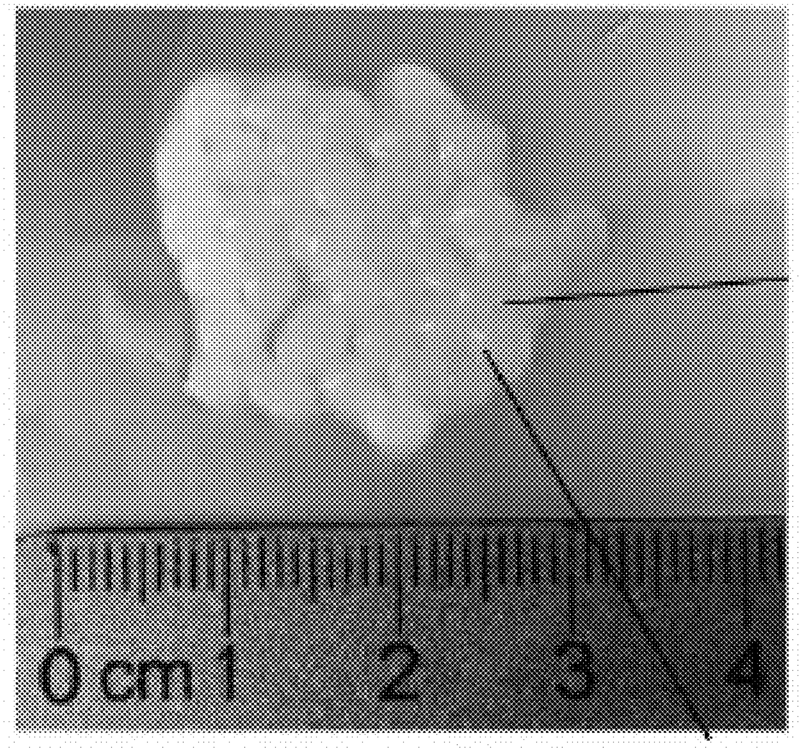
Figure 3C:
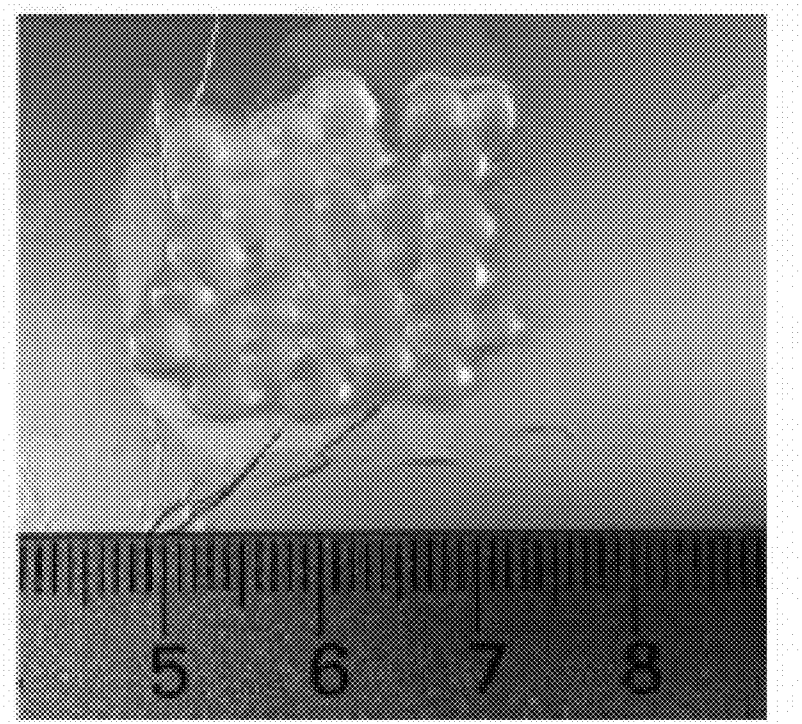
Figure 3D:
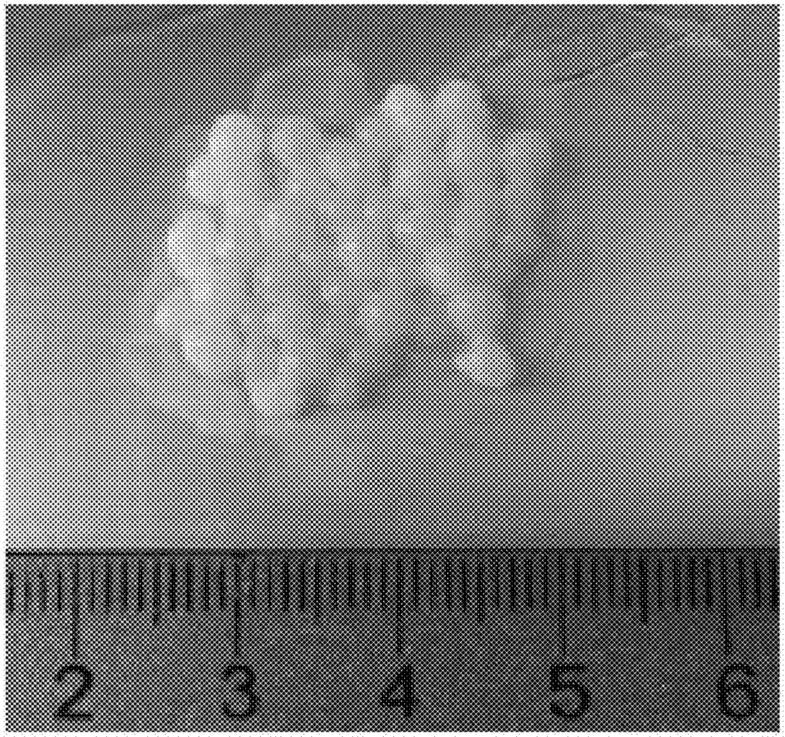
Figure 3E:
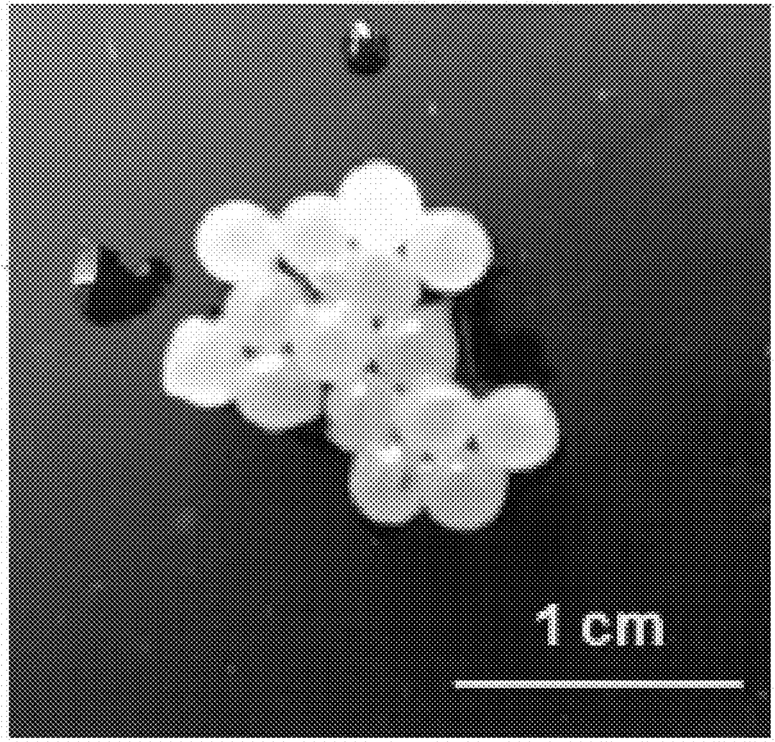
Figure 3F:
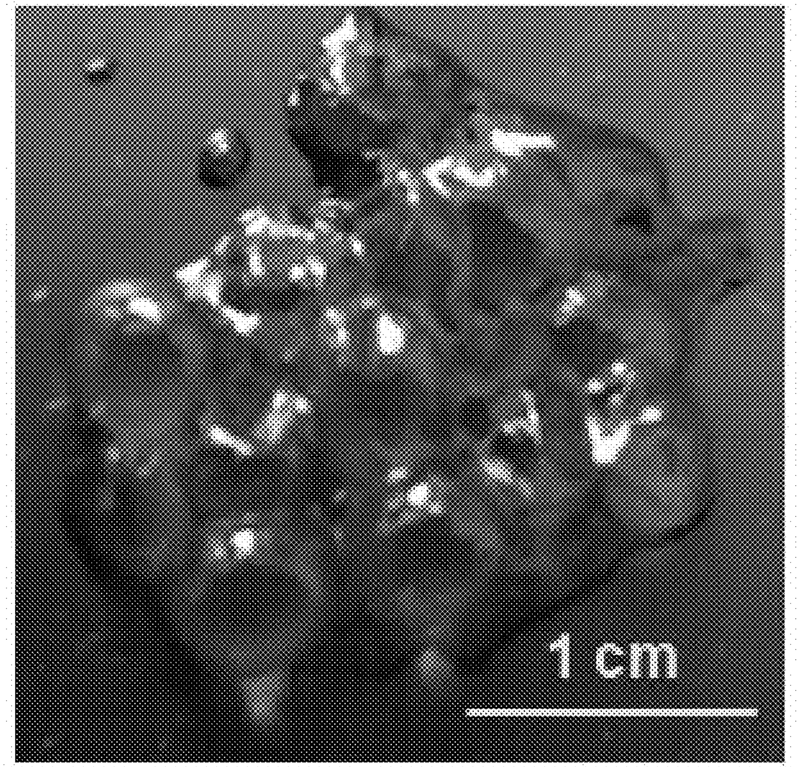
Figure 7D:
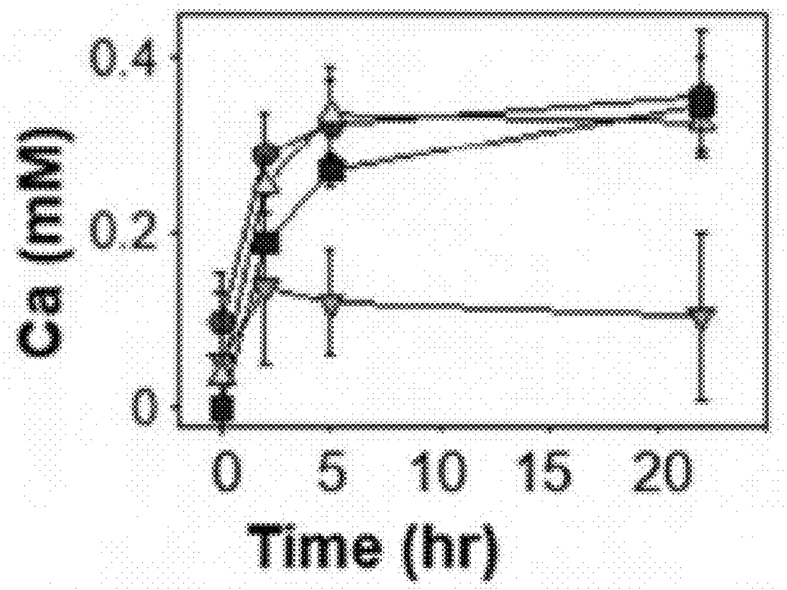

Interestingly, even in the HA-undersaturated condition, up to 68% of initial P was removed by Ca-Alg/CaP (FIG. 7B) by utilizing Ca-ions released from the beads. Thus, especially around the beads' surfaces, the batch environments become locally supersaturated with respect to HA, so CaP nucleation could be stimulated by the seed minerals. As a matter of fact, after P removal using Ca-Alg, Ca-Alg/$CaCO_3$, and Ca-Alg/CaP+$CaCO_3$, the Ca concentrations released into the undersaturated solutions became higher than 0.3 mM after 5 hours (FIG. 7D). The SI of this environment was 8.1 (0 3 mM Ca, 0.2 mM P, and 10 mM NaCl at pH 7.8). On the other hand, the release of Ca from Ca-Alg/CaP remained lower (~0.1 mM Ca) than those from other beads until 22 hours, while the P concentration decreased from 200 μM to 66 μM. Therefore, it can be estimated that the released Ca ions were reversely consumed by formation of new CaP phases. However, the loss of $Ca^{2+}$ from the beads visibly destroyed the beads' gelated state and spherical shape under the HA-undersaturated condition (FIG. 3E and FIG. 3F). Hence, the existence of sufficient $Ca^{2+}$, as in the HA-supersaturated condition, would be an important factor for stable operation.

Although P removal was less efficient with carbonate seed mineral than phosphate seed, Ca-Alg/$CaCO_3$ beads removed about 35% of P from the HA-supersaturated condition (FIG. 7A). The higher removal efficiency by Ca-Alg/$CaCO_3$ than by Ca-Alg with no seed minerals indicates the contribution of $CaCO_3$ seeds to the P removal. No phosphate mineral phases were observed from the XRD pattern of Ca-Alg/

Figure 5D:
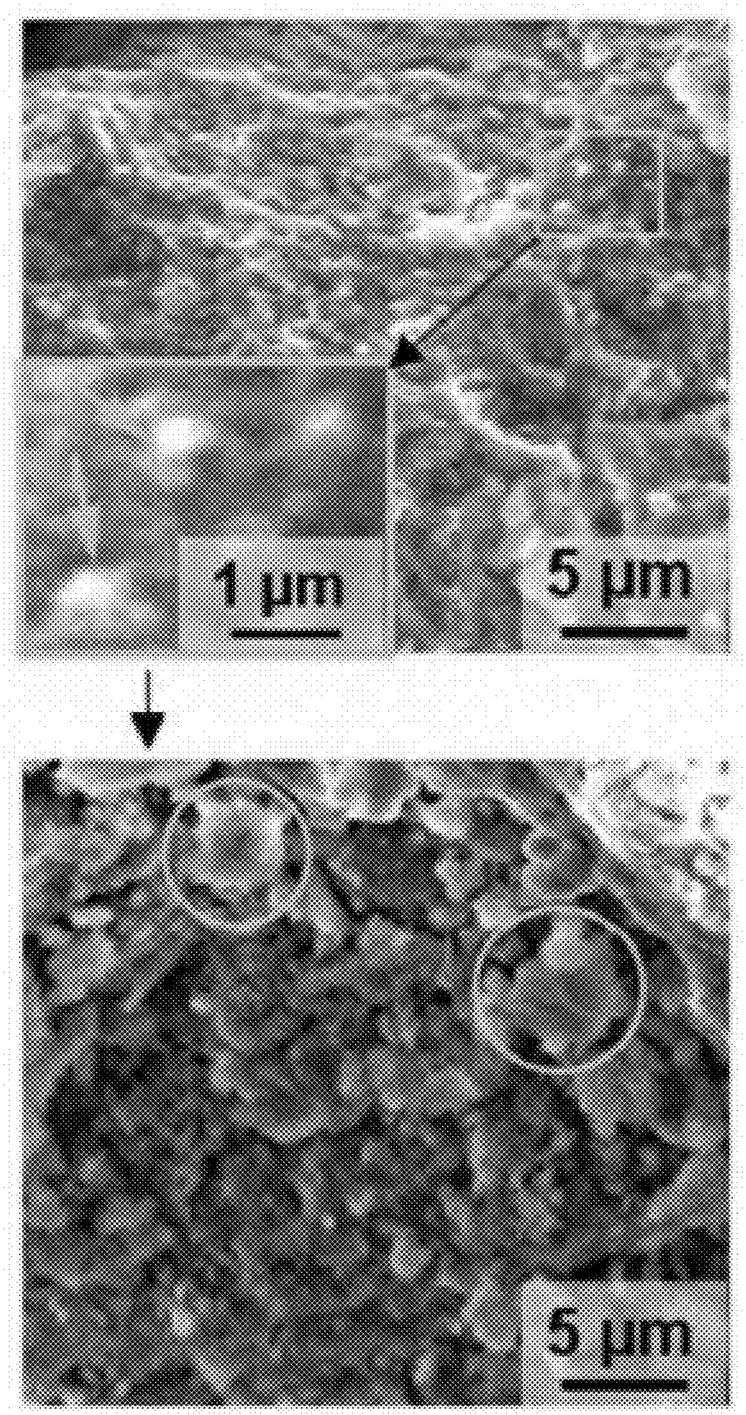

$CaCO_3$ after P removal (FIG. 4). Therefore, adsorption on surfaces of Ca-Alg and calcite seed are the most probable P removal mechanisms.[43,51] A similar removal efficiency was achieved by Ca-Alg/CaP+$CaCO_3$ beads, whose ACC-like seed transformed to HA-like platy particles at the outer surface of the beads after P removal under the HA-supersaturated condition (FIG. 4 and FIG. 5D). This transformation indicated that ionic Ca and P species were dissolved from seeds and then secondarily precipitated. Indeed, in the HA-undersaturated condition with Ca-Alg/CaP+$CaCO_3$ beads, P concentrations increased over time due to the dissolution of seed minerals (FIG. 7B). The XRD pattern of the final CaP products on the Ca-Alg/CaP+$CaCO_3$ surface after P removal (FIG. 4, red line) was comparable to that of seed minerals in Ca-Alg/CaP (FIG. 4). However, the P removal efficiency of Ca-Alg/CaP+$CaCO_3$ was much lower than that of the Ca-Alg/CaP system. Therefore, CaP seeds can be more effectively used for P removal when they form simultaneously with the beads (Ca-Alg/CaP) than when they are transformed from the amorphous phase during the P removal process (Ca-Alg/CaP+$CaCO_3$). Therefore, the later part of this study further evaluates the roles of seed minerals in Ca-Alg/CaP beads in aqueous P management.

Aqueous P concentrations controlled by the crystalline degree of CaP seed minerals: Based on evaluations of different types of seed minerals, it was found that seeding HA-like particles within the beads (Ca-Alg/CaP) was most effective for P removal. The crystalline structure of newly precipitated CaP from the aqueous solution during P removal was the same as that of the initial seed mineral. Therefore, if the aqueous P concentration reaches an equilibrium with CaP seed, the solubility of the seed mineral governs the equilibrium P concentration. Given that the solubility of amorphous calcium phosphate is much higher than that of HA,[52] the equilibrium P concentration after P removal may be engineered by controlling the crystallinity of seed nuclei.

To prove this hypothesis, Ca-Alg/CaP was prepared in the Ca bath with lower $OH^-$ concentrations of 0 and 10 mM, and then compared them with original samples prepared with 20 mM $OH^-$. Higher $OH^-$ concentrations in the nucleating solution increased the $PO_4^{3-}$ species fraction, and consequently, the IAP of calcium phosphate minerals, such as HA ($IAP_{HA}=[Ca^{2+}]^5[PO_4^{3-}]^3[OH^-]$). As was hypothesized in the experimental section, the increased IAP enhances the thermodynamic driving force for HA nucleation, which decreases the free energy of nucleation quickly,[53] forming stable CaP seed mineral with low solubility and high crystallinity.

Figure 8A:
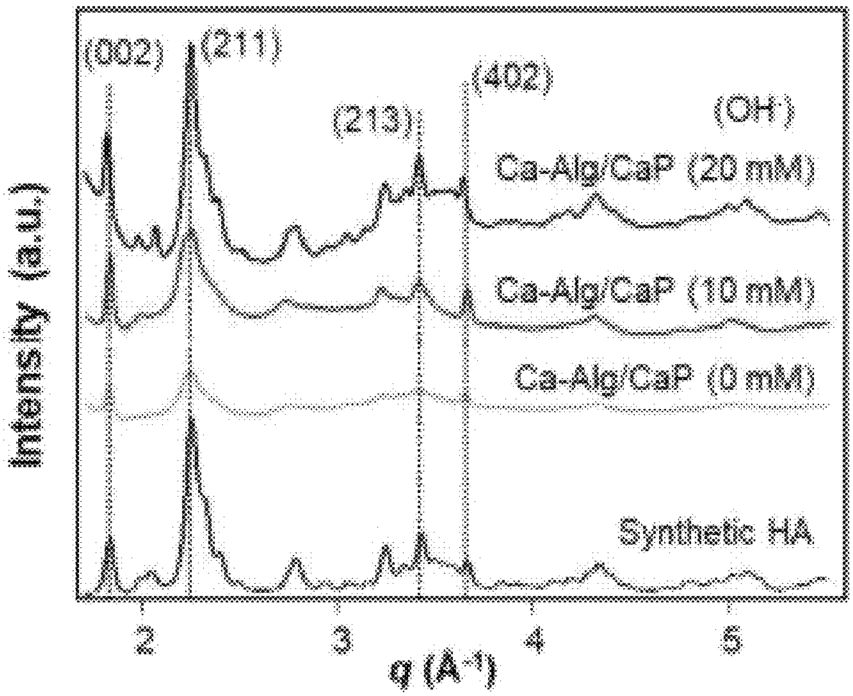
FIG. 8A, FIG. 8B, and FIG. 8C depict crystalline structure of CaP seed nuclei and equilibrium P concentrations.
Figure 8B:
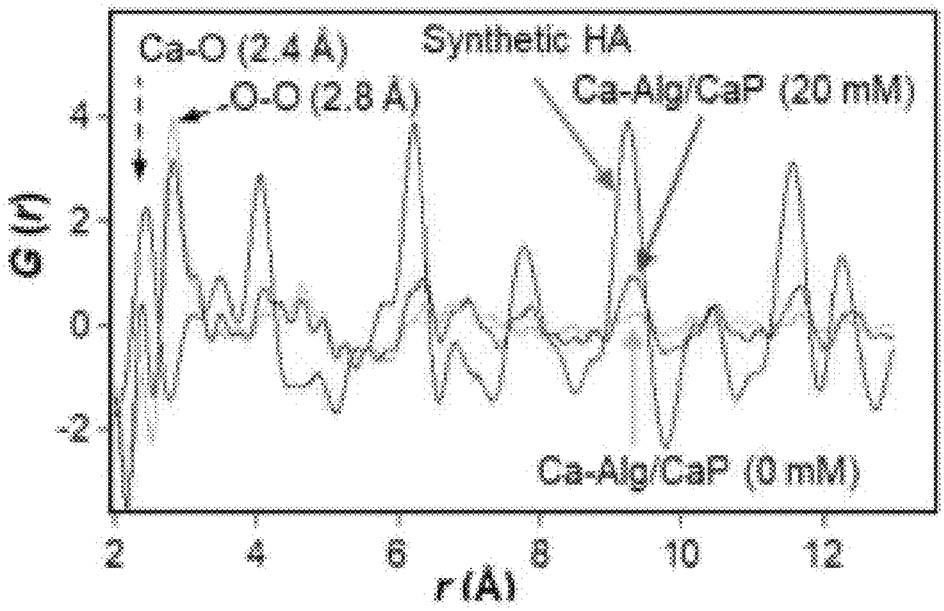

WAXD patterns of Ca-Alg/CaP beads clearly confirmed that seed minerals prepared with 20 mM $OH^-$ have a more HA-like structure than those prepared with 0 or 10 mM $OH^-$ (FIG. 8A). In the WAXD pattern of Ca-Alg/CaP prepared in 0 mM, only a few broad peaks appear, such as at q=1.83, 2.23, 3.41, and 3.58 $Å^{-1}$, which correspond to the (002), (211), (213), and (402) faces of HA. However, with 20 mM $OH^-$, most peaks observed from synthetic HA also appeared identically. The influence of $OH^-$ concentrations on the crystalline structures of Ca-Alg/CaP was further analyzed by X-ray PDF (FIG. 8B). Ca-Alg/CaP samples prepared with 0 and 20 mM of $OH^-$ both showed their first two peaks at the same interatomic distances, r, in their PDF functions, G(r). The first peak, at r=2.4 Å, corresponds to the nearest-neighbor Ca—O, which is evidence of calcium phosphate nuclei formation.[54] The second peak, at r=2.8 Å, indicates an O—O interatomic distance typically observed in liquid water.[55] This peak at r=2.8 Å was strong because the beads were all analyzed in a hydrated condition to prevent potential alteration of the seed nuclei's crystalline structures by dehydration. Compared to the PDF of synthetic HA, which showed a clear long-range order (interatomic distance, r>12 Å), that for Ca-Alg/CaP prepared with 20 mM $OH^-$ was weaker, but the correlation still extended for over 10 Å. Any comparable correlation essentially disappeared for samples prepared with 0 mM $OH^-$. Therefore, it was concluded that seed mineral in Ca-Alg/CaP became structurally ordered more like HA when prepared with 20 mM $OH^-$ than that with 0 mM $OH^-$.

Figure 8C:
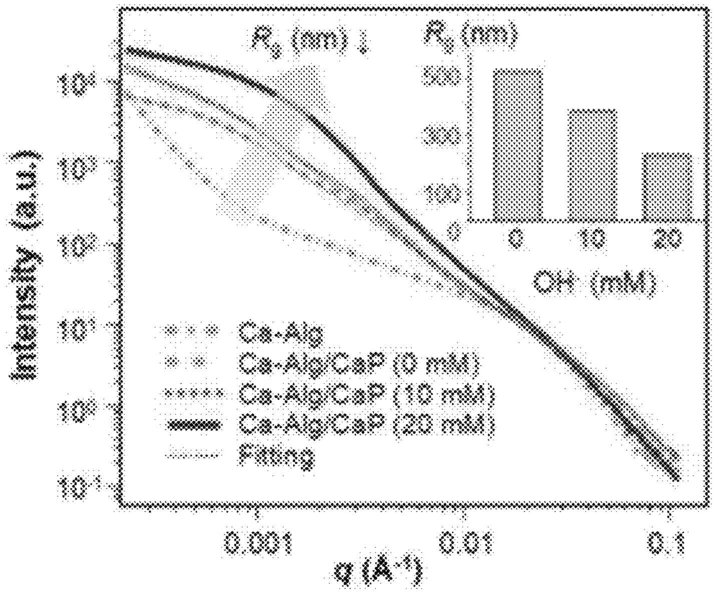

During the phase transformation of CaP particles from amorphous to crystalline apatite in biologically relevant aqueous systems, the size of particles often decreases because the particles form via aggregation and subsequent condensation of nucleation precursors.[29, 46, 56] However, the size of CaP seeds embedded in beads could not be easily evaluated using conventional surface characterization tools. From USAXS analysis of the Ca-Alg/CaP, the grain size of the nuclei as a radius of gyration, Rg (FIG. 8C) was determined.[57-59] The Rg of CaP nuclei decreased significantly with increasing crystallinity, from 522 nm (with 0 mM $OH^-$) to 232 nm (with 20 mM $OH^-$). No discernible features of smaller size particles, such as apatite plates (40 nm×30 nm×2 nm) in bones,[60] were observed by using either USAXS or SAXS (with an adjusted q range to better analyze particles smaller than 70 nm).[61, 62] With a limited amount of calcium and phosphate precursors, the crystallization of seed nuclei might not proceed further during the Ca-Alg beads formation. Therefore, Ca-Alg/CaP beads prepared under different $OH^-$ conditions could maintain specific seed nuclei crystalline structures and grain sizes, as introduced in this study.

Figure 9A:
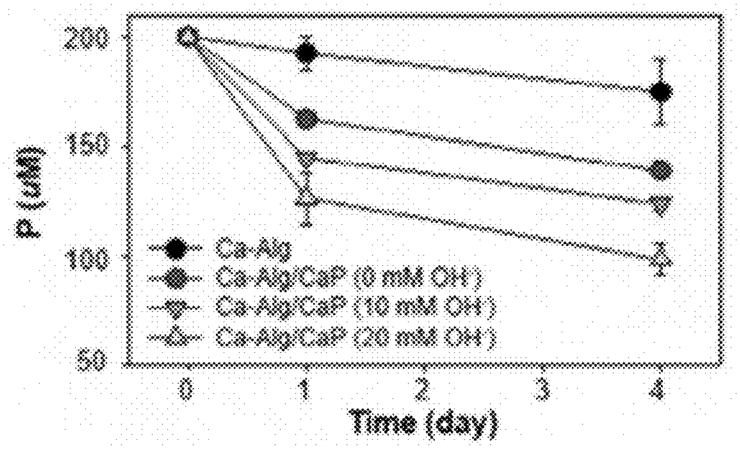
FIG. 9A, FIG. 9B, and FIG. 9C depict (FIG. 9A) Equilibrium aqueous P concentrations in the presence of Ca-Alg/CaP during P removal. Initial conditions: 10 mM NaCl, 0.2 mM $Na_2HPO_4$, pH=7.6, and 2 mM $CaCl_2$.
Figure 9B:
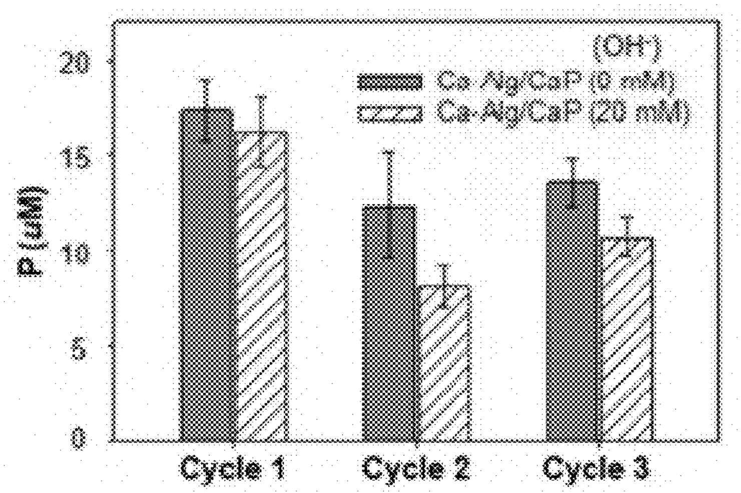

It was confirmed that higher $OH^-$ concentrations in the Ca bath for the beads' preparation resulted in a more ordered crystalline structure of HA-like seed minerals (FIG. 8A and FIG. 8B). The higher crystallinity of the seed minerals made them less soluble, lowering the P concentrations at the end of the removal experiments (FIG. 9A). From this clear trend, it can be concluded that the equilibrium P concentration is highly governed by the crystalline degree of the seed mineral. After the P removal experiments, to evaluate whether the beads could release P into the aqueous system as a potential fertilizer, the beads were recovered from the batch and then placed in P-free solutions. P released from Ca-Alg/CaP reached equilibrium within five hours. This time to reach equilibrium was nearly constant over three cycles of the release experiments, although the P concentration was slightly higher in the 1st cycle than in the 2nd and 3rd cycles (FIG. 9B). The equilibrium P concentrations in the 2nd and 3rd cycles with Ca-Alg/CaP prepared with 20 mM $OH^-$ were 9.4±2.0 μM, which was about 28% lower than with Ca-Alg/CaP prepared with 0 mM $OH^-$ ($p<0.1$ by Student's t-test, final pH values for both systems were equal to 7.0). This result indicates that the crystallinity of the seed nuclei also governs the P concentrations during the P release process, supporting the potential application of P-loaded Ca-Alg/CaP beads as a slow-release fertilizer. Over the three cycles, only 20% of the total immobilized P was released from the beads.

Figure 9C:
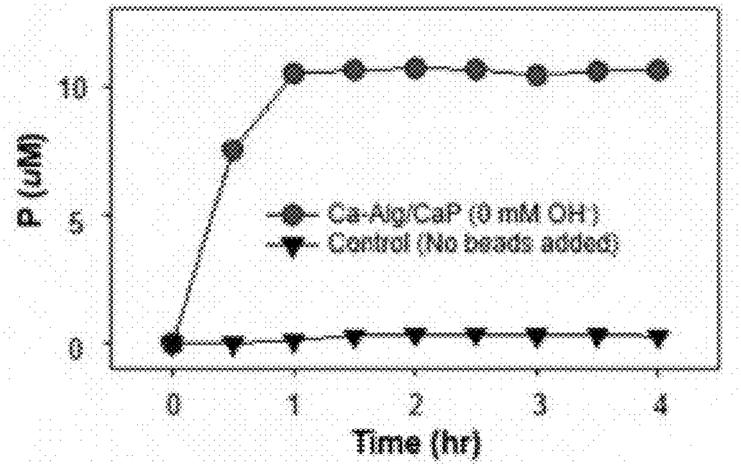

The beads' ability to maintain the P equilibrium concentration was also validated by sand column experiments. After the Ca-Alg/CaP beads (prepared in 0 mM $OH^-$) were placed on top of the 5 cm thick sand layer, P concentration in the effluent reached ~10 μM at pH ~7 within an hour (FIG. 9C). Although the column experiments simulated a simplified soil system, the tests demonstrated that, within a relatively short time period, the P-captured beads can release P into the soil pore-water. The released P concentration was 10 times higher than the minimum P required in a rhizosphere soil solution (~1 μM),[63] suggesting that P can be released sufficiently fast for plant growth. Furthermore, the P level in the effluent from the column remained constant for an extended time, without excessive release of P, thus working as a slow-release fertilizer. This release pattern is clearly distinct from that of other, much more soluble phosphate fertilizer, such as triple superphosphate ($CaH_4P_2O_8$, solubility in water is about 20 $g^{L-1}$, releasing up to 0.17 M of P).[64,65] These findings provide an insight into the engineered control of steady P transport from fertilizer to plants.

FIG. 10 presents the final P concentrations (near equilibrium) obtained from the removal and release experiments, together with their final pH values, for comparison with the P solubility curves of reference CaP minerals (HA and OCP). At a final pH range 6.6-6.8, the data points from seed minerals with higher crystallinity are closer to the HA solubility curve, despite the slightly lower pH values. At this range of final pH values, the difference in equilibrium P concentrations for the different seed minerals most obviously appears as expected from the largest difference between the solubility curves for HA and OCP. The apparent solubility products, $pK'_{sp}$, of HA calculated based on the experimental data of CaP seed with 20 mM and 0 mM were 54.2 and 52.5, respectively, indicating that P solubility was controlled by the seed minerals' crystallinity over approximately two orders of magnitude.

Although the $pK'_{sp}$ of CaP seeds prepared in 20 mM $OH^-$ was lower than that of synthetic HA ($pK_{sp}$=58.5),[47] the seeds effectively decreased P concentrations from an initial 200 μM to ~20 μM at the end of release experiments (final pH 7.0-7.2). This P range is below the level allowed for typical wastewater effluents (~30-60 μM).[7] Therefore, the beads can be effectively utilized to treat aqueous systems contaminated by various P pollution sources, such as wastewater and landfill leachate (240-880 μM P, pH 7.5-8.5),[66] without the need for secondary pH adjustments. Similar equilibrium P concentrations with the CaP seed minerals (~10 μM P at pH 7.0-7.2) were also achieved during the P release experiments, highlighting the potential use of recovered P as a slow-release fertilizer. This level of P is sufficient to maintain the growth of crops,[63] without excessive P release into the environment.

Figure 11:
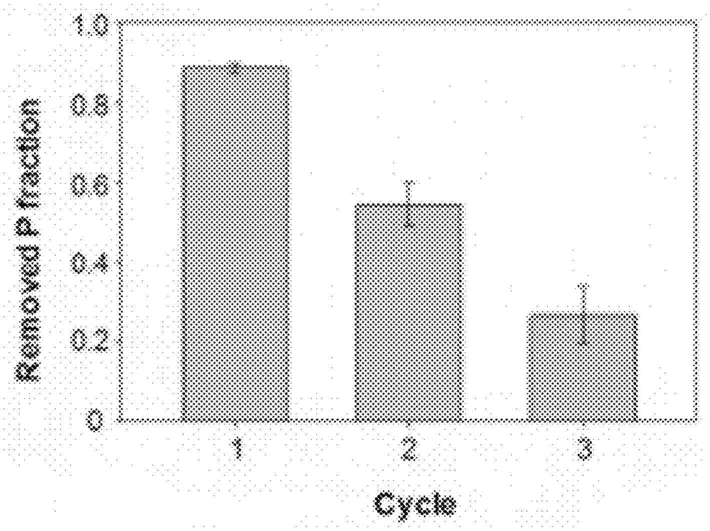
FIG. 11 depicts removed P fractions in solutions (initial conditions were 10 mM NaCl, 0.2 mM $Na_2HPO_4$, and 2 mM $CaCl_2$, pH=7.8) using Ca-Alg/CaP. Experiments were conducted by adding beads prepared by addition of 2 mL sodium alginate solution (equivalent to 5.7 mg of dry CaP seed mineral) into a batch containing 100 mL solution (first cycle). After 24 hours of reactions, beads were collected and then transferred to a fresh batch (second cycle). Three batches were used for removal with the same beads.
Figure 12A:
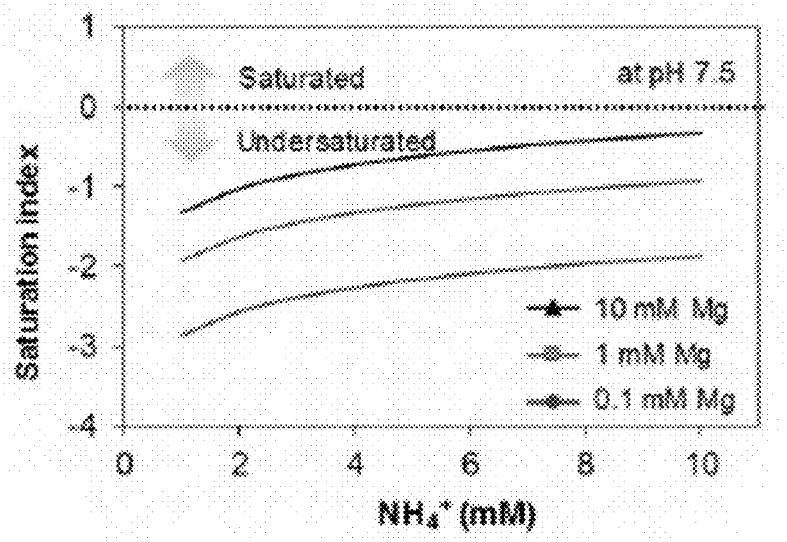
FIG. 12A and FIG. 12B depict supersaturation index with respect to struvite in the HA-supersaturated condition.
Figure 12B:
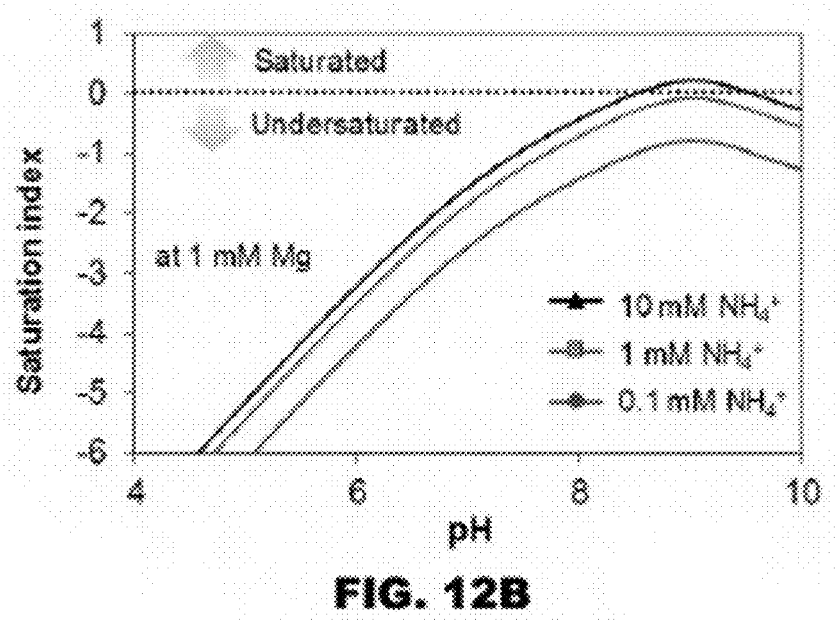

Potential field applications of Ca-Alg/CaP: In this study, the aqueous P concentrations were controlled by the solubility of seed minerals, and the CaP seeded beads could remove almost 90% of P in the HA-supersaturated system within a day at pH 7.2 (from initial 200 μM to ~20 μM, FIG. 7A). Therefore, the suggested approach can be successfully operated for the P removal at neutral pH, avoiding expensive secondary pH adjustment of the effluent. The same principle for reaching equilibrium with poorly crystalline HA-like CaP seed mineral can also be applied for P release (FIG. 9C), highlighting the potential use of recovered P as a fertilizer. The use of a macroscale organic template of calcium alginate beads provided a practical benefit of easier recovery for reuse as a fertilizer without the need for further processes, such as filtration or centrifugation. In addition, the large volume of the beads (compared to the amount of alginate and seed mineral) can store a large amount of P. In our experiments under the HA-saturated condition, 96.4 mg of P was captured per g of dry seed mineral (FIG. 7A and Table 1). In our additional experiments, the beads captured additional P over two more cycles, showing removal of up to 186 mg $g^{-1}$ (FIG. 11). This value was significantly higher than for other recently reported P adsorbents, such as commercial HFO-201 (an Fe(III) oxide-based nanocomposite, ~35 mg $g^{-1}$ at pH 6-7), hydrated La(III) oxide nanoclusters (~60 mg $g^{-1}$ at pH 6-7),[67] or zirconium oxide nanoparticles (99 mg $g^{-1}$ at pH 6.2).[68] However, more accurate comparisons with these materials can be made by evaluating P removal efficiency under the same experimental conditions and with the same dose of adsorbents in the future. Especially, the competition among phosphate and other oxyanions, such as arsenic and nitrate, needs to be evaluated because these oxyanions potentially affect the P removal efficiency of beads and their environmental safety when applied as a clean fertilizer. Although struvite formation in our experimental condition was not plausible (FIG. 12A and FIG. 12B), when the beads are used for effluents from wastewater treatment plants with anaerobic digestion,[65] the influence of $NH_4^+$ should be considered because it may compete with HA by forming struvite in the presence of $Mg^{2+}$.

Figures 1C, 1D:
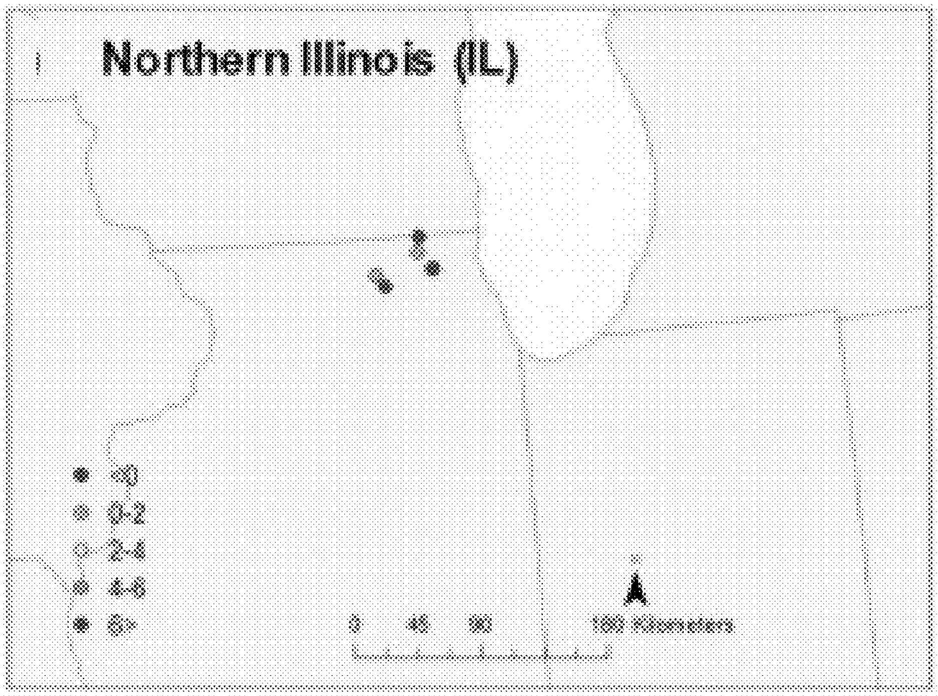
FIG. 1D shows a table of the total and percent saturation.

As discussed, Ca-Alg/CaP performed best under the HA-supersaturated condition (2 mM Ca and 0.2 mM P) at circumneutral pH, and this condition is highly comparable to Ca-rich and/or P-rich aqueous environments. According to the USGS National Water-Quality Assessment, about 60 percent of sampled wells provide hard water (>120 mg/L as $CaCO_3$). Moreover, many of them have hardness levels even higher than 180 mg $L^{-1}$ (equivalent to 1.8 mM of $Ca^{2+}$ generally classified as very hard water).[22] These aqueous systems with high $Ca^{2+}$ concentrations can be easily HA-supersaturated when exposed to P-abundant streams. For example, even without significant commercial or industrial loads, the concentration of total phosphorus in wastewater treatment effluent may exceed 6 mg $L^{-1}$ as P (~0.2 mM).[69,70] Indeed, our evaluation of the saturation of groundwater using USGS National Groundwater Monitoring Network data showed that most of samples in the Chesapeake Bay and Louisiana areas (pH 7.7±0.9 and 7.7±0.7, respectively) were HA-supersaturated (FIG. 1A, FIG. 1B, and FIG. 1C). This analysis strongly supports our approach as a potential P management strategy by showing that many aqueous environments at neutral pH are already supersaturated with respect to HA.

Figure 13A:
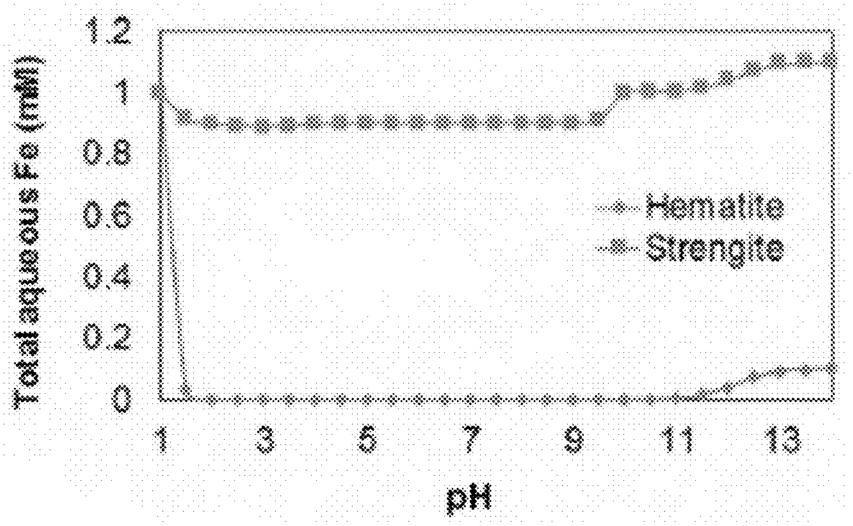
FIG. 13A and FIG. 13B depict aqueous Fe and P concentrations equilibrated with hematite ($Fe_2O_3$) and strengite ($FePO_4 \cdot 2H_2O$). Thermodynamic equilibrium calculations were conducted by Visual MINTEQ (Ver. 3.1). Initial conditions of the system were 1 mM $FeCl_3$ and 0.1 mM $Na_3PO_4$. A lower Fe concentration equilibrated with hematite than with strengite indicates that iron oxide is more thermodynamically stable than iron phosphate minerals (FIG. 13A). If hematite precipitation occurs (FIG. 13B), the immobilization of P as a strengite mineral is inhibited. At higher pH, iron hydroxide formation dominates, therefore P immobilization is also inhibited.
Figure 13B:
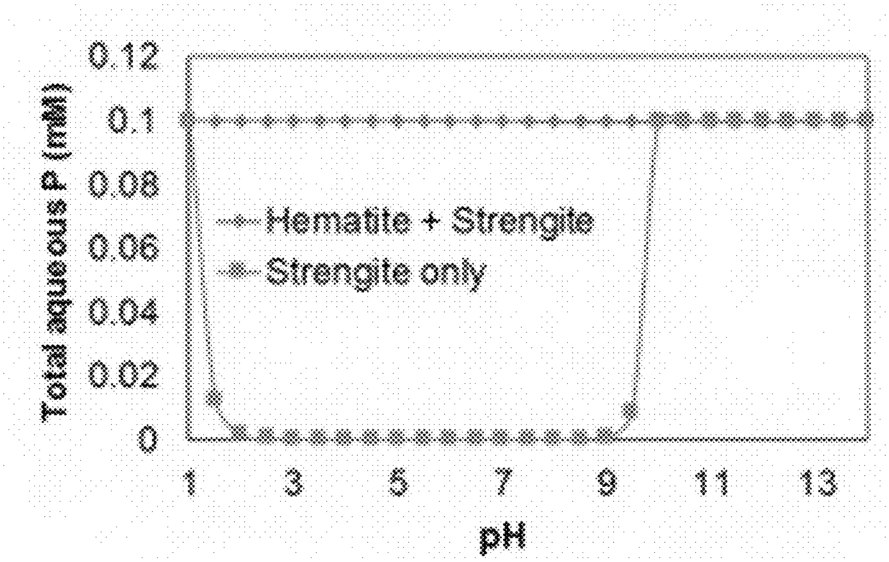

The current options for chemical precipitations using ferric salts or calcium (hydr)oxide are known to be effective, but they have limited applicability for on-site operations due to their significant pH alteration.[7] Moreover, although phosphate minerals are generally formed during these chemical processes, they turn into other mineral forms, such as ferric oxide, coloring water orange. Indeed, hematite ($Fe_2O_3$) is thermodynamically more stable than strengite ($FePO_4 \cdot 2H_2O$) at a wide pH range, as shown in an example of a system containing 1 mM $FeCl_3$ and 0.1 mM $Na_3PO_3$ (FIG. 13A and FIG. 13B). Thus, the consumption of ferric ions by hematite precipitation would inhibit P immobilization in certain environments. In addition, pH must be maintained around 5 during chemical precipitation using ferric chloride, because iron hydroxide minerals, which compete with iron phosphate minerals, can form at a higher pH range.[7] During treatments using CaO or Ca bearing materials, calcium hydroxide or calcium carbonate may form instead of CaP minerals (pH >8.5, FIG. 4), which can release P into the aqueous environments again. This adverse effect significantly weakens the capacities of these processes as effective treatment methodologies.

REFERENCES

1. G. M. Filippelli, *Rev. Mineral. Geochem.*, 2002, 48, 391-425.

2. S. M. Powers, T. W. Bruulsema, T. P. Burt, N. I. Chan, J. J. Elser, P. M. Haygarth, N. J. K. Howden, H. P. Jarvie, Y. Lyu, H. M. Peterson, A. N. Sharpley, J. Shen, F. Worrall and F. Zhang, *Nat. Geosci.,* 2016, 9, 353-356.
3. R. J. Diaz and R. Rosenberg, *Science,* 2008, 321, 926-929.
4. J. Elser and E. Bennett, *Nature,* 2011, 478, 29-31.
5. D. Cordell, J.-O. Drangert and S. White, *Global Environ. Change,* 2009, 19, 292-305.
6. T. Lougheed, *Environ. Health Perspect.,* 2011, 119, a302-a305.
7. S. A. Parsons and J. A. Smith, *Elements,* 2008, 4, 109-112.
8. P. J. A. Withers, J. J. Elser, J. Hilton, H. Ohtake, W. J. Schipper and K. C. van Dijk, *Green Chem.,* 2015, 17, 2087-2099.
9. P. Wilfert, P. S. Kumar, L. Korving, G.-J. Witkamp and M. C. M. van Loosdrecht, *Environ. Sci. Technol.,* 2015, 49, 9400-9414.
10. Z. Bradford-Hartke, J. Lane, P. Lant and G. Leslie, *Environ. Sci. Technol.,* 2015, 49, 8611-8622.
11. A. S. Brooks, M. N. Rozenwald, L. D. Geohring, L. W. Lion and T. S. Steenhuis, *Ecol. Eng.,* 2000, 15, 121-132.
12. A. R. Buda, G. F. Koopmans, R. B. Bryant and W. J. Chardon, *J. Environ. Qual.,* 2012, 41, 621-627.
13. C. Vohla, M. Koiv, H. J. Bavor, F. Chazarenc and U. Mander, *Ecol. Eng.,* 2011, 37, 70-89.
14. J. P. Gustafsson, A. Renman, G. Renman and K. Poll, *Water Res.,* 2008, 42, 189-197.
15. Y. Li, C. Liu, Z. Luan, X. Peng, C. Zhu, Z. Chen, Z. Zhang, J. Fan and Z. Jia, *J. Hazard. Mater.,* 2006, 137, 374-383.
16. A. Heistad, A. M. Paruch, L. Vrale, K. Adam and P. D. Jenssen, *Ecol. Eng.,* 2006, 28, 374-379.
17. S. Karaca, A. Gurses, M. Ejder and M. Acikyildiz, *J. Colloid Interface Sci.,* 2004, 277, 257-263.
18. J. Thistleton, T. A. Berry, P. Pearce and S. A. Parsons, *Process Saf. Environ. Prot.,* 2002, 80, 265-269.
19. F. Xie, F. Wu, G. Liu, Y. Mu, C. Feng, H. Wang and J. P. Giesy, *Environ. Sci. Technol.,* 2014, 48, 582-590.
20. S. R. Joshi, R. K. Kukkadapu, D. J. Burdige, M. E. Bowden, D. L. Sparks and D. P. Jaisi, *Environ. Sci.* Technol., 2015, 49, 5887-5896.
21. National Ground-Water Monitoring Network Website, http://cida.usgs.gov/ngwmn/index.jsp.
22. L. A. DeSimone, P. A. Hamilton and R. J. Gilliom, *Quality of water from domestic wells in principal aquifers of the United States,* 1991-2004*: overview of major findings*, US Department of the Interior, US Geological Survey, 2009.
23. O. Borkiewicz, J. Rakovan and C. L. Cahill, *Am. Mineral.,* 2010, 95, 1224-1236.
24. E. Smolders, E. Baetens, M. Verbeeck, S. Nawara, J. Diels, M. Verdievel, B. Peeters, W. De Cooman and S. Baken, *Environm. Sci. Technol.,* 2017, 51, 2584-2592.
25. J. L. Gamble, *Chemical anatomy physiology and pathology of extracellular fluid: A lecture syllabus*, Harvard University Press, Sixth edition edn., 1967.
26. M. J. Glimcher, *Rev. Mineral. Geochem.,* 2 479 006, 64, 223-282.
27. J. D. Pasteris, B. Wopenka and E. Valsami-Jones, *Elements,* 2008, 4, 97-104.
28. Y. Wang, T. Azais, M. Robin, A. Vallee, C. Catania, P. Legriel, G. Pehau-Arnaudet, F. Babonneau, M.-M. Giraud-Guille and N. Nassif, *Nat. Mater.,* 2012, 11, 724.
29. A. Dey, P. H. Bomans, F. A. Muller, J. Will, P. M. Frederik and N. A. Sommerdijk, *Nat. Mater.,* 2010, 9, 1010-1014.
30. R. Russo, M. Malinconico and G. Santagata, Biomacromolecules, 2007, 8, 3193-3197.
31. L. S. Nair and C. T. Laurencin, *Prog. Polym. Sci.,* 2007, 32, 762-798.
32. J. R. Dodson, H. L. Parker, A. Munoz Garcia, A. Hicken, K. Asemave, T. J. Farmer, H. He, J. H. Clark and A. J. Hunt, *Green Chem.,* 2015, 17, 1951-1965.
33. S. Bajpai, N. Chand and V. Chaurasia, *Food Bioprocess Technol.,* 2012, 5, 1871-1881.
34. K. Zhao, L. Feng, Z. Li, Y. Fu, X. Zhang, J. Wei and S. Wei, *RSC Adv.,* 2014, 4, 51321-51329.
35. X. Shen, J. L. Shamshina, P. Berton, G. Gurau and R. D. Rogers, *Green Chem.,* 2016, 18, 53-75.
36. W. Chen, L. Li, W. Zhang, F. Xu, M. Niu, J. Wang and Y. Wang, *Clean: Soil, Air, Water,* 2014, 42, 561-570.
37. H. Yang, Q. Zhou, W. Luo, C. Yan and C. Zhou, *Desalin. Water Treat.,* 2016, 57, 18354-18365.
38. Y. Vijaya, S. R. Popuri, A. S. Reddy and A. Krishnaiah, *J. Appl. Polym. Sci.,* 2011, 120, 3443-3452.
39. J. H. Clark, *Green Chem.,* 1999, 1, 1-8.
40. B. Bhushan, *Philos. Trans. R. Soc., A,* 2009, 367, 1445-1486.
41. H. C. W. Skinner, Mineral. *Mag.,* 2005, 69, 621-641.
42. Q. Li, A. Fernandez-Martinez, B. Lee, G. A. Waychunas and Y.-S. Jun, *Environ. Sci. Technol.,* 2014, 48, 5745-5753.
43. L. Wang, E. Ruiz-Agudo, C. V. Putnis, M. Menneken and A. Putnis, *Environ. Sci. Technol.,* 2012, 46, 834-842.
44. M. J. Arellano-Jimenez, R. Garcia-Garcia and J. Reyes-Gasga, *Journal of Physics and Chemistry of Solids,* 2009, 70, 390-395.
45. S. Tsang, F. Phu, M. M. Baum and G. A. Poskrebyshev, *Talanta,* 2007, 71, 1560-1568.
46. W. J. E. M. Habraken, J. Tao, L. J. Brylka, H. Friedrich, L. Bertinetti, A. S. Schenk, A. Verch, V. Dmitrovic, P. H. H. Bomans, P. M. Frederik, J. Laven, P. van der Schoot, B. Aichmayer, G. de With, J. J. DeYoreo and N. A. J. M. Sommerdijk, *Nat. Commun.,* 2013, 4.
47. H. McDowell, T. Gregory and W. Brown, *J. Res. Nat. Bur. Stand. A,* 1977, 81, 273-281.
48. M. Tung, N. Eidelman, B. Sieck and W. Brown, *J. Res. Nat. Bur. Stand.,* 1988, 93, 613-624.
49. T. M. Gregory, E. C. Moreno and W. E. Brown, *J. Res. Nat. Bur. Stand. A,* 1970, 74A, 461-475.
50. L. N. Plummer and E. Busenberg, *Geochim. Cosmochim. Acta,* 1982, 46, 1011-1040.
51. L. Wang, L. Qin, C. V. Putnis, E. Ruiz-Agudo, H. E. King and A. Putnis, *Environ. Sci. Technol.,* 2016, 50, 259-268.
52. C. Combes and C. Rey, *Acta Biomater.,* 2010, 6, 3362-3378.
53. J. J. De Yoreo, G. A. Waychunas, Y.-S. Jun and A. Fernandez-Martinez, *Rev. Mineral. Geochem.,* 2013, 77, 229-257.
54. J. M. Delgado-Lopez, R. Frison, A. Cervellino, J. Gomez-Morales, A 525. Guagliardi and N. Masciocchi, *Adv. Funct. Mater.,* 2013, 24, 1090-1099.
55. A. Nilsson and L. G. M. Pettersson, *Nat. Commun.,* 2015, 6.
56. D. Kim, B. Lee, S. Thomopoulos and Y.-S. Jun, *Cryst. Growth Des.,* 2016, 16, 359-5366.
57. J. Ilavsky and P. R. Jemian, *J. Appl. Crystallogr.,* 2009, 42, 347-353.
58. J. Ilavsky, P. R. Jemian, A. J. Allen, F. Zhang, L. E. Levine and G. G. Long, *J. Appl. Crystallogr.,* 2009, 42, 469-479.

59. F. Zhang, J. Ilavsky, G. Long, J. G. Quintana, A. Allen and P. Jemian, *Metall. Mater. Trans. A,* 2010, 41, 1151-1158.
60. W. J. Landis, M. J. Song, A. Leith, L. McEwen and B. F. McEwen, *J. Struct. Biol.,* 1993, 110, 39-54.
61. Y.-S. Jun, B. Lee and G. A. Waychunas, *Environ. Sci. Technol.,* 2010, 44, 8182-8189.
62. Y.-S. Jun, D. Kim and C. W. Neil, *Acc. Chem. Res.,* 2016, 49, 1681-1690.
63. A. E. Johnston, P. R. Poulton, P. E. Fixen and D. Curtin, *Adv. Agron,* 2014, 123, 177-228.
64. L. P. F. Benicio, V. R. L. Constantino, F. G. Pinto, L. Vergutz, J. Tronto and L. M. da Costa, *ACS Sustain. Chem. Eng.,* 2017, 5, 399-409.
65. G. Kongshaug, B. A. Brentnall, K. Chaney, J.-H. Gregersen, P. Stokka, B. Persson, N. W. Kolmeijer, A. Conradsen, T. Legard, H. Munk, O. Skauli, H. Kiiski, K. R. Solheim, T. Legard, B. A. Brentnall and P. Rauman-Aalto, in *Ullmann's Encyclopedia of Industrial Chemistry*, Wiley-VCH, 2000.
66. K. Yetilmezsoy and Z. Sapci-Zengin, *J. Hazard. Mater.,* 2009, 166, 260-269.
67. Y. Zhang, B. Pan, C. Shan and X. Gao, *Environ. Sci. Technol.,* 2016, 50, 1447-1454.
68. Y. Su, H. Cui, Q. Li, S. Gao and J. K. Shang, *Water Res.,* 2013, 47, 5018-5026.
69. S. Sengupta and A. Pandit, *Water Res.,* 2011, 45, 3318-3330.
70. T. D. McCobb, D. R. LeBlanc, D. A. Walter, K. M. Hess, D. B. Kent and R. L. Smith, *Phosphorus in a ground-water contaminant plume discharging to Ashumet Pond*, Cape Cod, Mass., 1999, Report 2002-4306, 2003.
71. J. D. Hagy, W. R. Boynton, C. W. Keefe and K. V. Wood, Estuaries, 2004, 27, 634-658.
72. N. N. Rabalais, R. E. Turner, R. J. Díaz and D. Justić, ICES J. Mar. Sci., 2009, 66, 1528-1537.
73. N. N. Rabalais, R. E. Turner, B. K. S. Gupta, E. Platon and M. L. Parsons, Ecol. Appl., 2007, 17, S129-S143.
74. C. L. Schelske, E. F. Stoermer and W. F. Kenney, Limnol. Oceanogr., 2006, 51, 728-748.
75. E. K. Read, M. Ivancic, P. Hanson, B. J. Cade-Menun and K. D. McMahon, Water Res., 2014, 62, 229-240.
76. M. J. Olszta, X. Cheng, S. S. Jee, R. Kumar, Y.-Y. Kim, M. J. Kaufman, E. P. Douglas and L. B. Gower, Mater. Sci. Eng. R, 2007, 58, 77-116.
77. X. Cao, W. G. Harris, M. S. Josan and V. D. Nair, Sci. Total Environ., 2007, 383, 205-215.
78. K. W. Chapman, S. H. Lapidus and P. J. Chupas, J. Appl. Crystallogr., 2015, 48.
79. X. Qiu, J. W. Thompson and S. J. Billinge, J. Appl. Crystallogr., 2004, 37, 678-678.
80. J. Ilavsky, F. Zhang, A. J. Allen, L. E. Levine, P. R. Jemian and G. G. Long, Metal. Mater. Trans A, 2013, 44, 68-76.
81. X. Lu and Y. Leng, Biomaterials, 2005, 26, 1097-1108.
82. C. N. Sawyer, P. L. McCarthy and G. F. Parkin, Chemistry for Environmental Engineering and Science, McGraw Hill, 2002.

Figure 14:
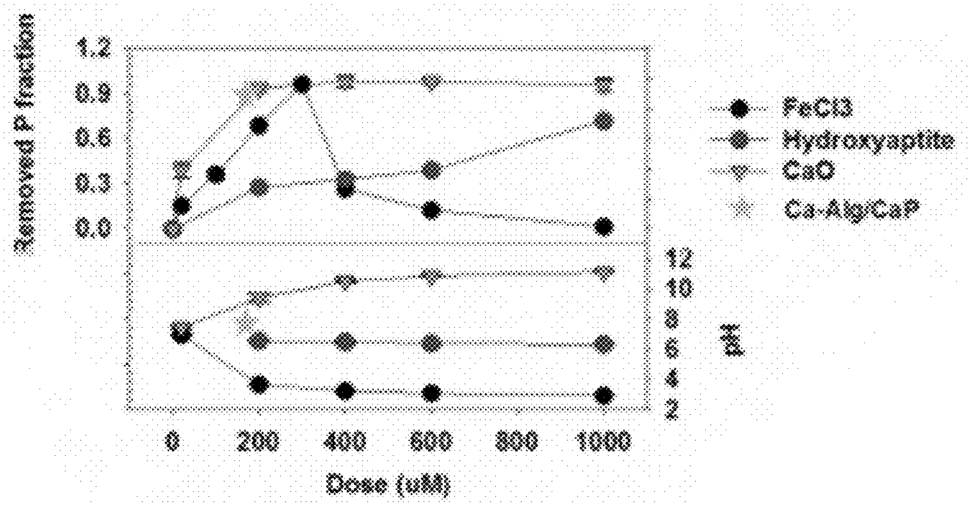
FIG. 14 depicts P concentrations during removal using $FeCl_3$, hydroxyapatite, CaO, and Ca-Alg/CaP beads.

Example 2: Comparison with Other Treatments Using $FeCl_3$, Hydroxyapatite, CaO 0-1000 mM of $FeCl_3$, hydroxyapatite, and CaO were added to 100 mL of P-containing solution (10 mM NaCl, 2 mM $CaCl_2$, 0.2 mM $Na_2HPO_4$, pH 7.6). After 22 hour reaction, P concentrations in solution and pH of the solution were measured. The result was compared with P removal data at 22 hour using calcium alginate beads with calcium phosphate seed mineral (Ca-Alg/CaP, indicated by star symbol, data from FIG. 7A, green reverse triangle (FIG. 14)). The dose of Ca-Alg/CaP represents the amount of seed minerals.

Example 3: Comparison of Phosphorous Removal Using CaP Beads and Commercially Available Product, Phoslock (La-Modified Bentonite)

200 mg/L (dry weight/Solution) of beads (Ca-Alg/CaP) and Phoslock were placed in tea bags (as an easier recovery tool), then the tea bags were added to a P-containing solution (10 mM NaCl, 1 mM $CaCl_2$, 0.1 mM $Na_2HPO_4$). The pH of the solutions was maintained at either 7.5 or 8.0. The P concentrations in solutions and pH of the solutions were measured at 1, 2, 3, 4, and 5 days. After 5 days, the tea bags were recovered to observe remaining beads and Phoslock.

Figure 15A:
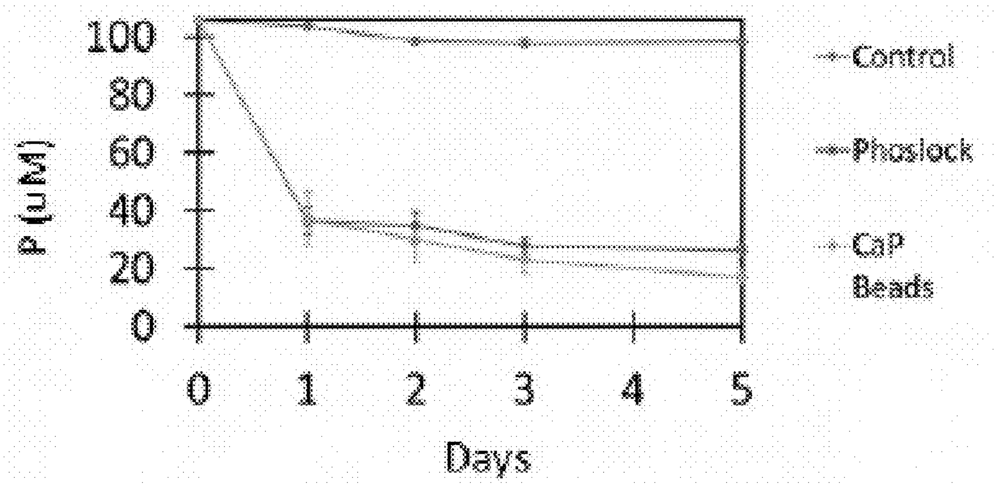
FIG. 15A and FIG. 15B depict comparison of P removal using CaP beads and Phoslock.
Figure 15B:
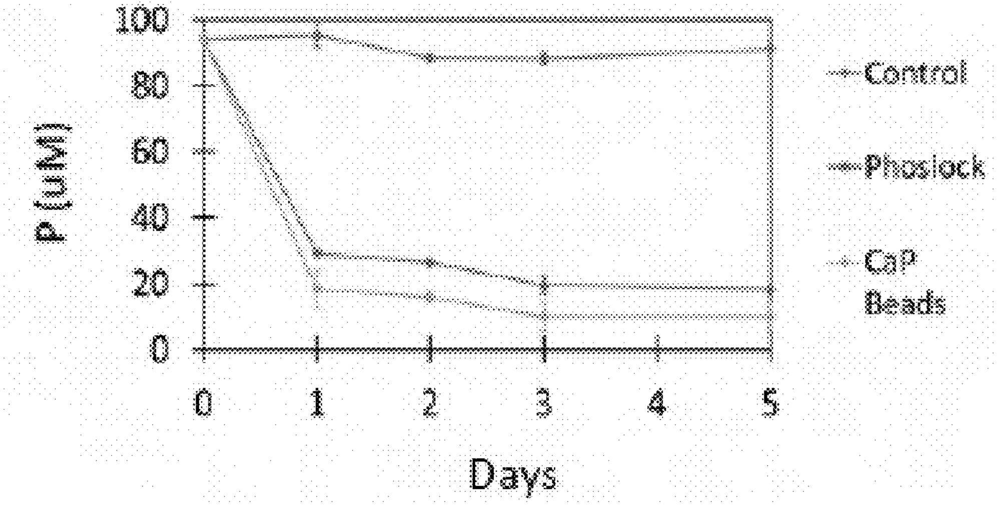
Figure 15C:
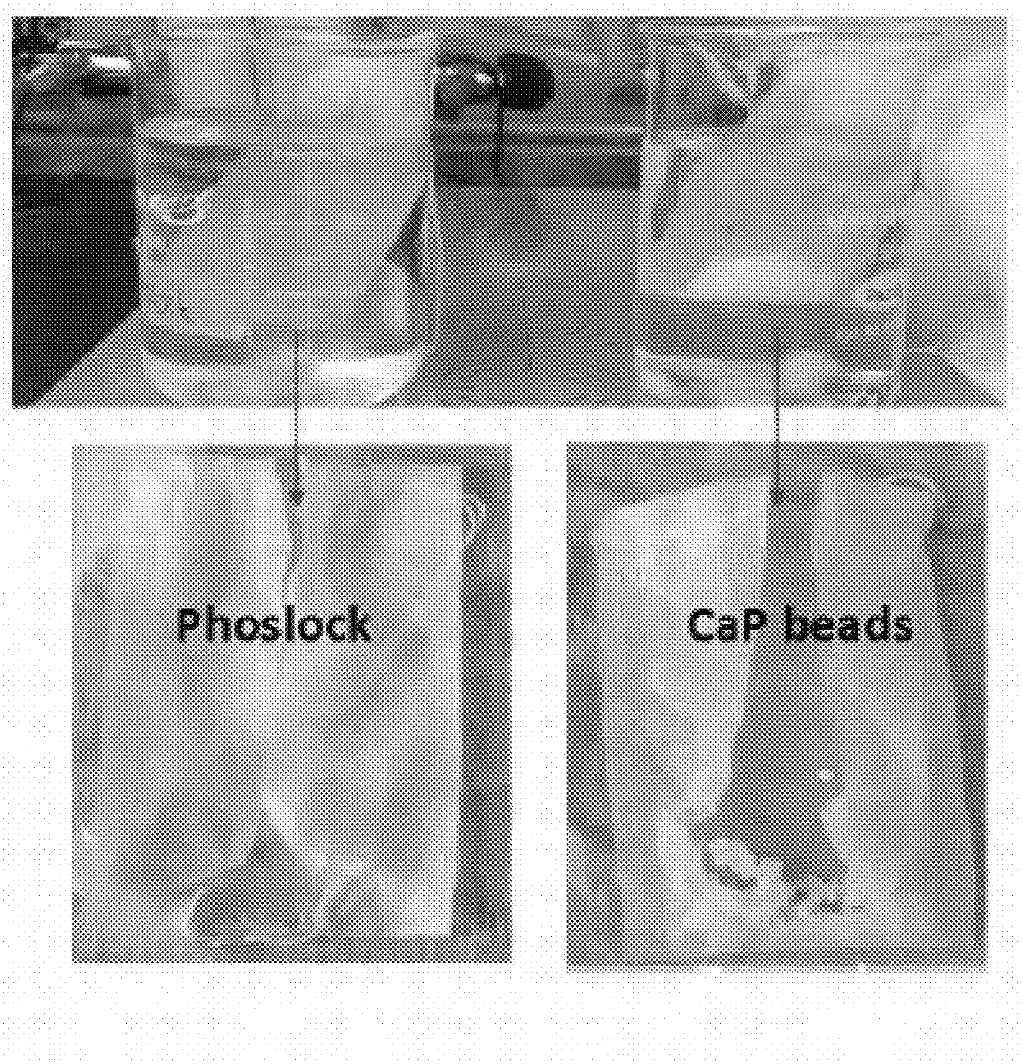
FIG. 15C shows phosplock and CaP beads in solution and dried.

The biodegradable material described herein shows faster kinetics and lower equilibrium phosphate concentrations than Phoslock at both pH 7.5 and 8.0 (FIG. 15A). In addition to the improved removal efficiency, our product provides practical benefits of easier recovery. During the removal using Phoslock, most of initial products were dissolved into the solution, thus cannot be removed out from aqueous solution. On the other hand, beads were easily recovered by simply using a tea bag (FIG. 15B).

Example 4: Selective P Removal During 3 Cycles of P Removal Process Using Ca-Alg/CaP Ca-Alg/CaP beads (5.7 mg dry seed weight) were placed in 100 mL of P-containing solutions (Initial condition: 10 mM NaCl, 2 mM $CaCl_2$, 0.1 mM $Na_2HPO_4$, pH 7.8). In one condition, we additionally added 0.2 mM $Na_2HAsO_4$ to evaluate the influence of co-existing As on P removal. Another condition has only P as a control group (Data also presented in FIG. 11). After 24 hours of reaction (end of the first cycle), beads were collected and then transferred to a fresh batch (second cycle). Total three batches (three cycles) were tested for each condition for the P and As removal.

Figure 16:
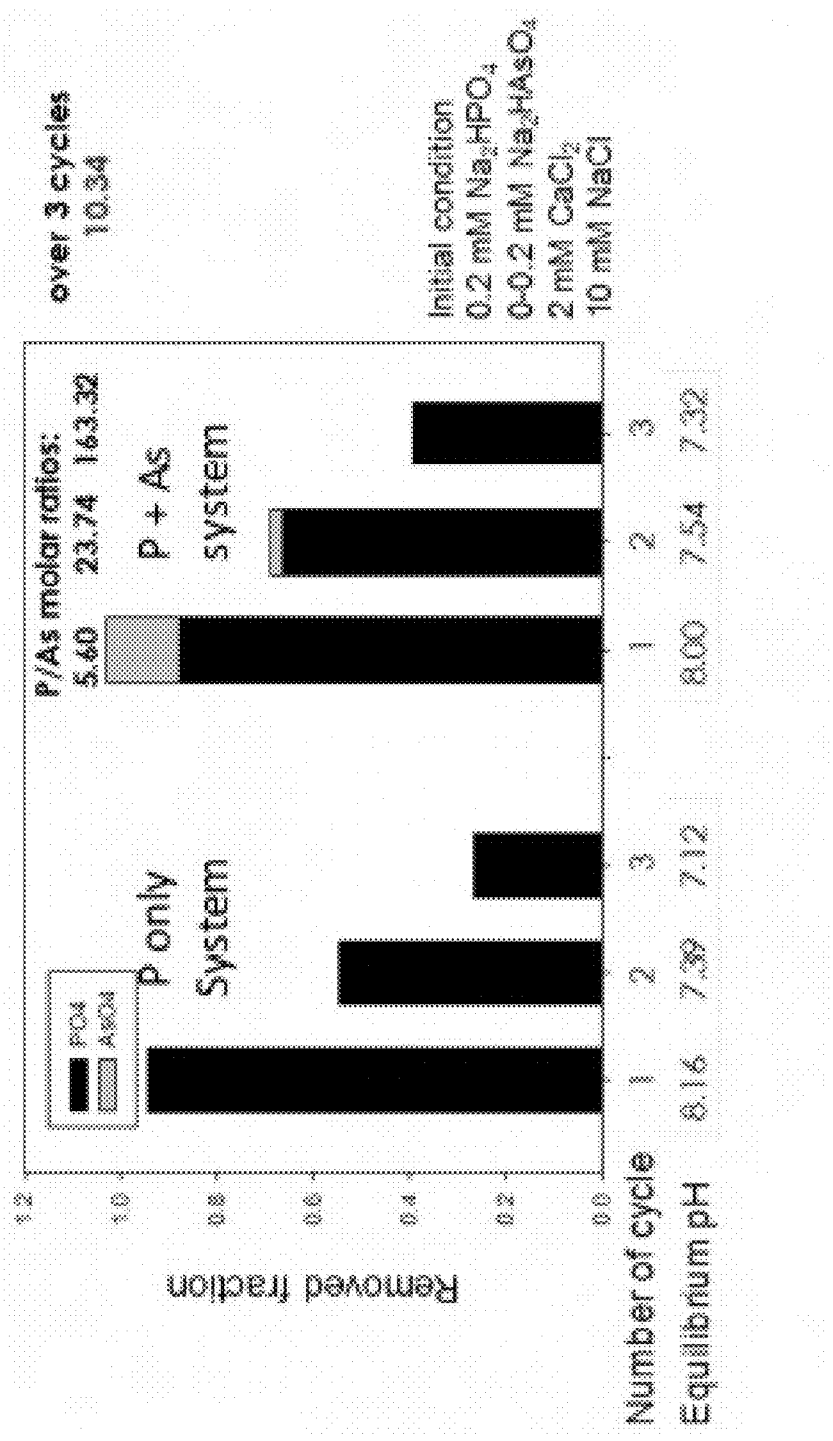
FIG. 16 depicts selective P removal during 3 cycles of P removal process using Ca-Alg/CaP.

Left 3 bar graphs were obtained from the P only system and Right 3 bar graphs were obtained from the P+As system (FIG. 16). P removal efficiency is not affected by co-existing arsenate during the 3 cycles of P removal processes. In addition, the selectivity toward P over As increases significantly over cycles, probably due to the decreased equilibrium pH at the later cycles. The decreased equilibrium pH resulted in overall lower removal efficiency.

All cited references are herein expressly incorporated by reference in their entirety.

Whereas particular embodiments have been described above for purposes of illustration, it will be appreciated by those skilled in the art that numerous variations of the details may be made without departing from the disclosure as described in the appended claims.

Example 5: Testing in Simplified General Wastewater Solution

Testing solution: 2 mM $CaCl_2$, 0.2 mM $Na_2HPO_4$, 10 mM NaCl pH=7.8 or 2 mM $CaCl_2$, 0.2 mM $Na_2HPO_4$, 30 mM NaCl, and pH=7.8 (Test solution volume=100 ml, ~0.0028 mg beads added (dry weight))

Bead fabrication conditions: 0.6% w/v sodium alginate (Food chemical codex (F.C.C.) grade; Spectrum Chemicals)

(NaAlg)+35 mM $Na_2HPO_4$ dripped with a syringe pump into 180 mM $CaCl_2$+20 mM NaOH solution, and pH≈12

Justification: 10 mM NaCl conditions reflect the ionic strength of surface waters, while 30 mM reflects the ionic strength of municipal wastewater. Previously, we had tested the beads in 10 mM NaCl conditions.

Figure 17:
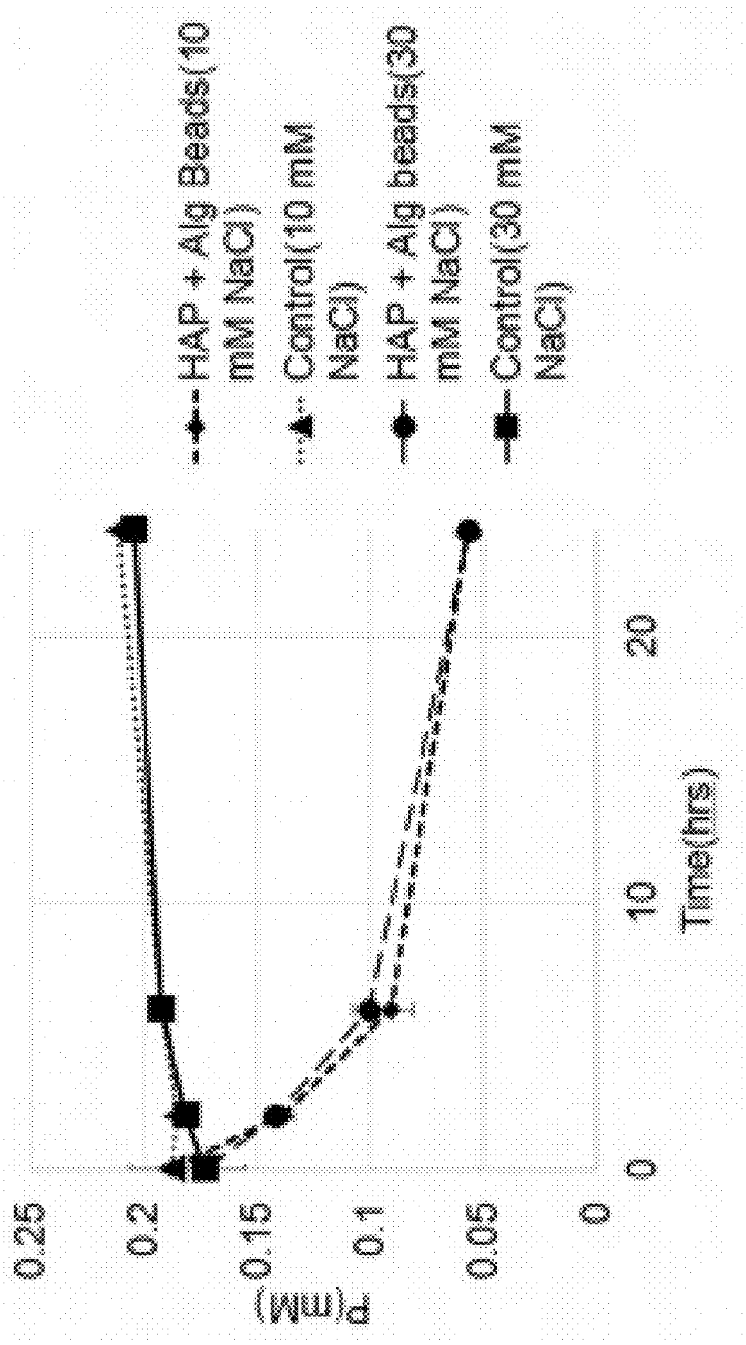
FIG. 17 depicts ionic strength shift (increase) from 10 mM NaCl (10 mM ionic strength) to 30 mM NaCl (≈30 mM ionic strength) had no effect on phosphate removal procedure.

Ionic strength shift from 10 mM NaCl (≈10 mM ionic strength) to 30 mM NaCl (≈30 mM ionic strength) had no effect on phosphate removal procedure (FIG. 17).

Testing solution: 2 mM $CaCl_2$, 0.2 mM $Na_2HPO_4$, 20 mM NaCl, 10 mM $NaHCO_3$, and pH=7.5 (Test solution volume=100 ml, ~0.0028 mg beads added (dry weight)).

Bead Fabrication conditions: 0.6% w/v sodium alginate (F.C.C grade; Spectrum Chemicals)(NaAlg)+35 mM $Na_2HPO_4$ dripped with a syringe pump into 180 mM $CaCl_2$+20 mM NaOH solution, and pH≈12.

Figure 18:
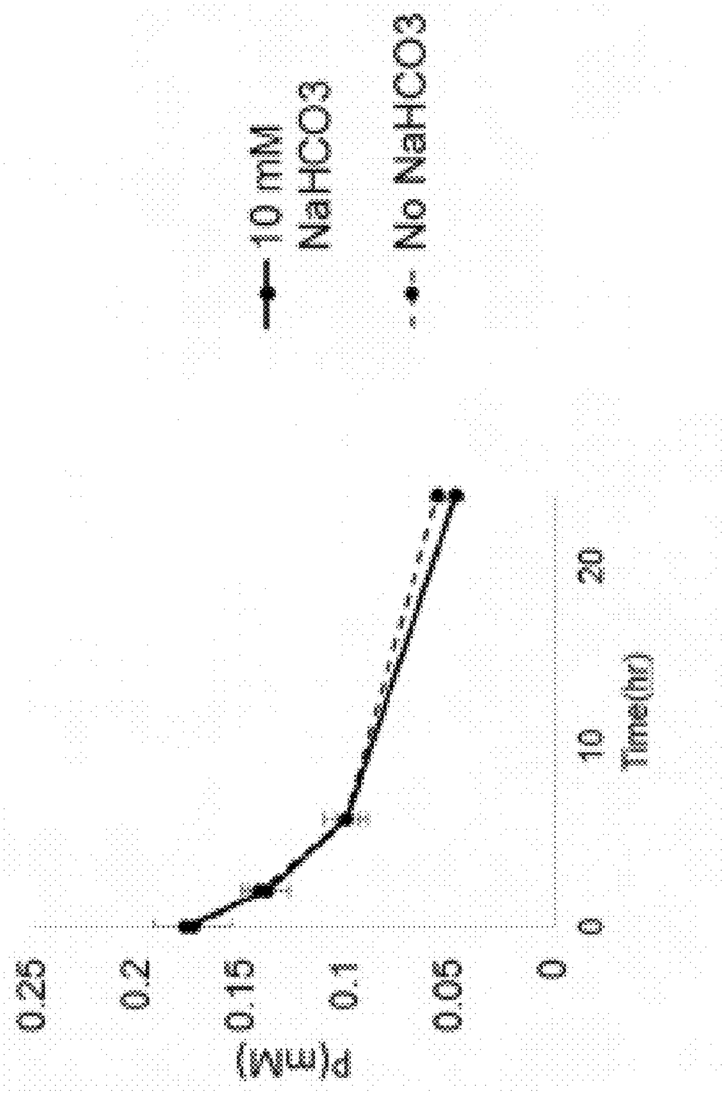
FIG. 18 depicts the beads perform well even with 10 mM $NaHCO_3$ addition (The effects of carbonate on the performance were not discernible).

Justification: Bicarbonate is present at an elevated level in wastewater due to both dissolution of $CO_2$ and organic waste degradation/microbial activity. Bicarbonate is a common inhibitor of precipitation of calcium phosphate minerals at high pH values due to the formation of calcium carbonate minerals. FIG. 18 shows the beads perform well even with 10 mM $NaHCO_3$ addition.

Testing solution: 2 mM $CaCl_2$, 0.2 mM $Na_2HPO_4$, 30 mM NaCl, and pH=7.5 (Test solution volume=100 ml, ~0.0028 mg beads added (dry weight)).

Bead fabrication conditions: 0.6% w/v sodium alginate (F.C.C grade; Spectrum Chemicals)(NaAlg)+35 mM $Na_2HPO_4$ dripped with a syringe pump into 180 mM $CaCl_2$+20 mM NaOH solution, and pH≈12 (Beads were dried before application).

Figure 19:
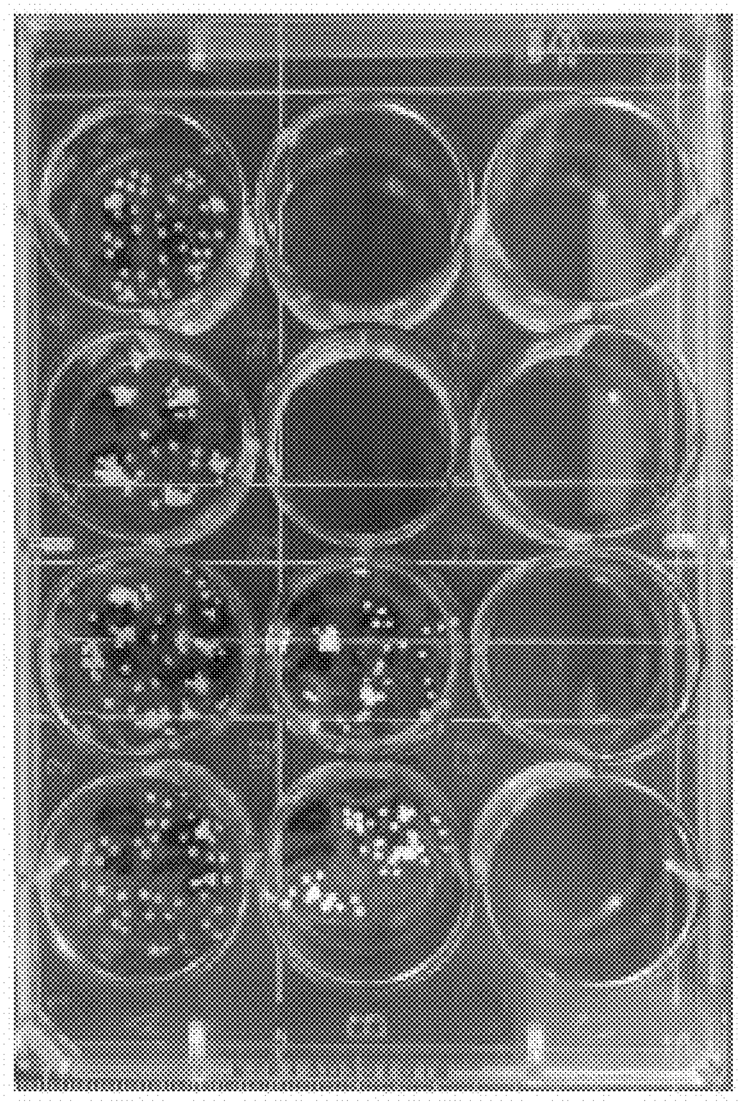
FIG. 19 depicts after drying, beads are not able to swell and have much slower kinetics for P removal in DI water.
Figure 20A:
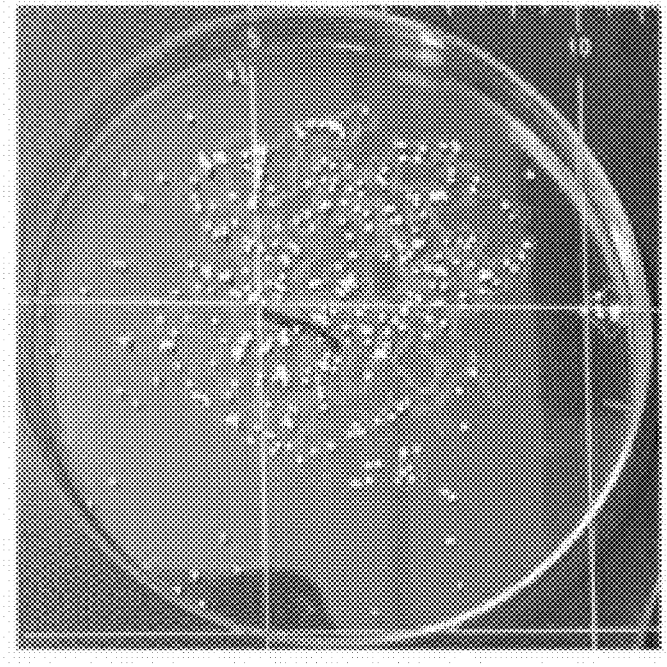
FIG. 20A shows when beads were located in NaCl, they were swollen back (0.6% Alg+35 mM P).
Figure 20B:
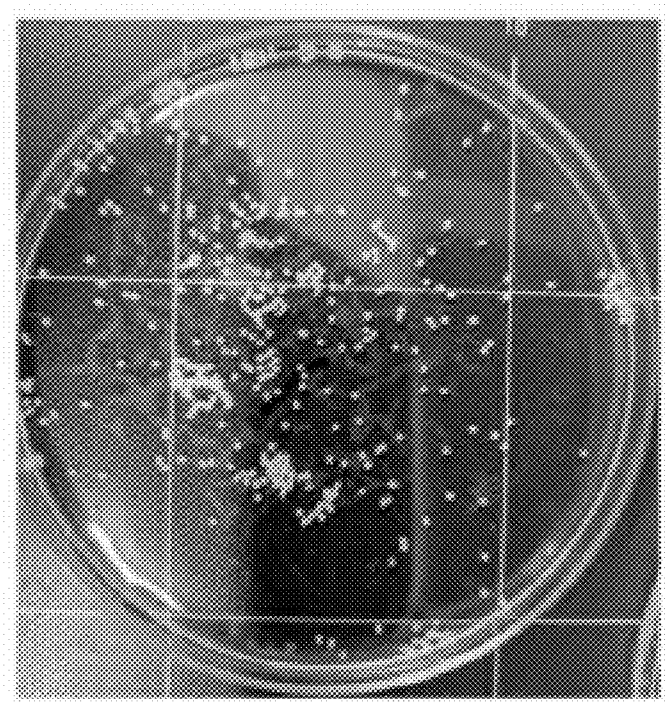
FIG. 20B shows after 4 hours in 100 mM NaCl.
Figure 20C:
FIG. 20C shows same bead samples in 0.5 M NaCl (After ~24 hours).

Justification: Drying the beads makes transport easier and can also increase their flexibility potential future applications (e.g. agricultural runoff control). After drying, beads are not able to swell and have much slower kinetics for P removal in DI water. After 24 hours in simulated wastewater or DI water, no significant volume change is observed (FIG. 19). However, when beads were dried after exposure to NaCl solution, they were swollen back (FIG. 20B-FIG. 20C).

Example 6: Testing in Complex Simulated Wastewater Solution

Testing solution: (see Table 2 for composition) Test solution volume=200 ml, ~0.014 mg beads added (dry weight).

Bead fabrication conditions: 0.6% w/v sodium alginate (F.C.C grade; Spectrum Chemicals)(NaAlg)+35 mM $Na_2HPO_4$ dripped with a syringe pump into 90 mM $CaCl_2$+20 mM NaOH solution, and pH≈12. Previous tests have shown little difference in bead performance when incubated in 90 mM $CaCl_2$ vs. 180 mM $CaCl_2$ (data not shown) Using a lower concentration $CaCl_2$ bath will lower the manufacture costs.

Figure 21:
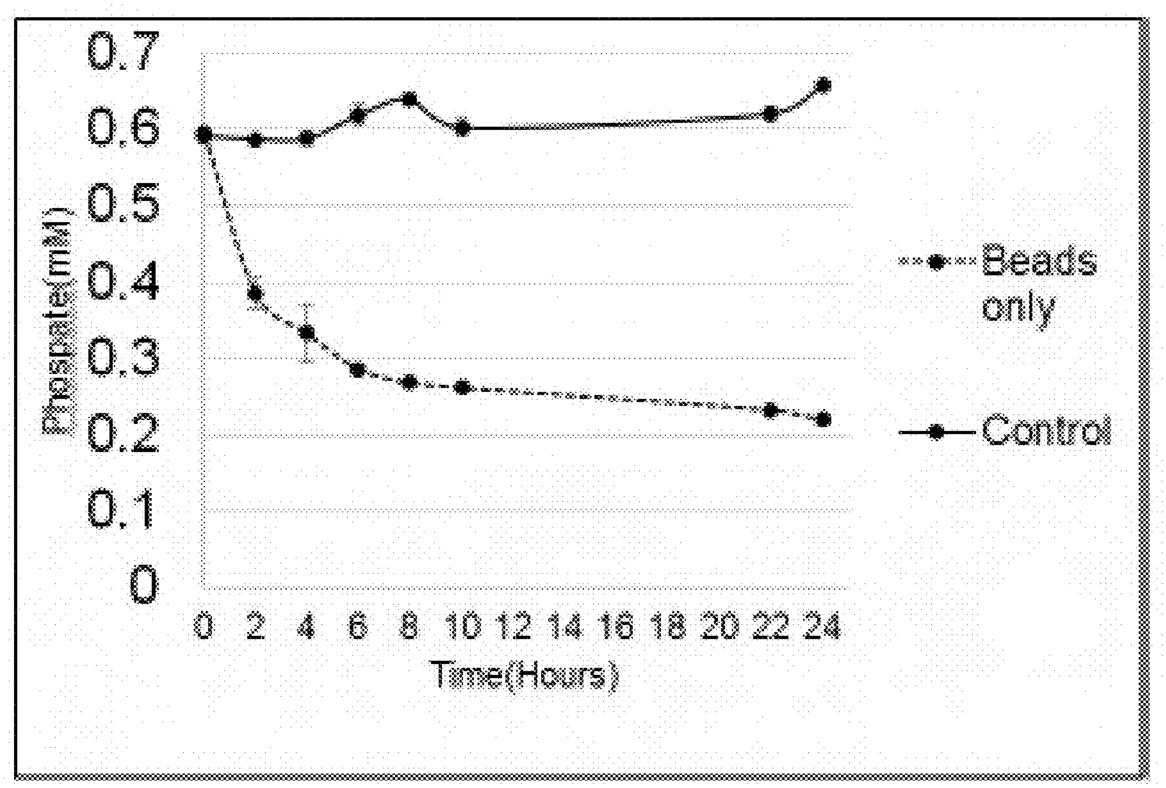
FIG. 21 shows beads were able to perform well in more complex matrix.

Justification: This test will assess the bead's function in more complex wastewater solutions with more phosphorus. Beads were able to perform well in more complex matrix. Final [P] is higher than previous tests (may be a limitation of calcium in original solution) (FIG. 21).

TABLE 2

| WW model solution (pH = 8.0) | | | | | |
|---|---|---|---|---|---|
| Salt | Concentration (g/L) | MW (g/mol) | Concentration (mM) | Element | mM |
| NaCl | 0.1519 | 58.44 | 2.60 | Na | 17.00 |
| $NaHCO_3$ | 0.9829 | 84.01 | 11.70 | NH4 | 9.20 |
| $NaH_2PO_4$ | 0.0840 | 119.98 | 0.70 | PO4 | 0.60 |
| $MgCl_2*6H_2O$ | 0.4473 | 203.31 | 2.20 | SO4 | 1.00 |
| $CaCl_2*2H_2O$ | 0.3528 | 147.02 | 2.40 | HCO3 | 20.90 |
| KCl | 0.1938 | 74.55 | 2.60 | Ca | 2.00 |
| $NH_4HCO_3$ | 0.7274 | 79.06 | 9.20 | Mg | 2.20 |
| HCl | 0.0584 | 36.50 | 1.60 | Cl | 16.00 |
| $Na_2SO_4$ | 0.1420 | 142.00 | 1.00 | K | 2.60 |

Example 7: Engineering Calcium-Bearing Mineral/Hydrogel Composites for Effective Phosphate Recovery Effectively recovering phosphate from wastewater streams and reutilizing it as a nutrient will critically support sustainability. Here, to capture aqueous phosphate, novel mineral-hydrogel composites were developed composed of calcium alginate, calcium phosphate (CaP), and calcium silicate hydrate (CSH) (CaP+CSH/Ca-Alg). The CaP+CSH/Ca-Alg composites were synthesized by dripping a sodium alginate (Na-Alg) solution with ionic precursors into a calcium chloride bath. To change the mineral seed's properties, the amounts and ratios of the calcium bath concentrations and the ionic precursor (sodium dibasic phosphate ($NaH_2PO_4$) and/or sodium silicate ($Na_2SiO_3$)) were varied. The added CSH in the mineral-hydrogel composites resulted in the release of calcium and silicate ions in phosphate-rich solutions, increasing the saturation ratio with respect to calcium phosphate within the mineral-hydrogel composites. The CSH addition to the mineral-hydrogel composites doubled the phosphate removal rate while requiring lesser initial amounts of Ca and P materials for synthesis. By incorporating both CSH and CaP mineral seeds in composites, a final concentration of 0.25 mg-P/L from an initial 6.20 mg-P/L were achieved. Moreover, the mineral-hydrogel composites can remove phosphate even under CaP undersaturated conditions. This suggests their potential to be a widely applicable and environmentally sustainable treatment and recovery method for nutrient-rich wastewater.

Anthropogenic phosphorus (P) pollution originates from both point sources (e.g., wastewater treatment plants or industrial effluents) and nonpoint sources (e.g., agricultural runoff), and is one of the primary drivers of eutrophication. Eutrophication drives harmful algal blooms that release cyanobacterial toxins, which can threaten public health and harm industries such as fisheries or tourism. For example, in a 2015 report, the United States Environmental Protection Agency estimated a loss of $37 million to $47 million in tourism revenue over two years due to an algal bloom in an Ohio lake and a loss of $2.5 million in fisheries revenue in Maine due to one harmful algal bloom. Spurred by such losses, much effort has been made to limit eutrophication by reducing the loading of nutrients in surface waters. Effective P management is especially important, because considerable evidence implicates it as the limiting nutrient for harmful algal blooms. On the supply side, P mining costs are increasing, and most phosphate rock sources are geographically concentrated, thus presenting accessibility challenges. Furthermore, the increasing global population is consuming more P. All these factors that motivate effective P recovery from waste streams and its reuse.

A promising method for nutrient recovery from high concentration phosphate-containing wastewater is crystallization, which recovers nutrients by forming solids, such as struvite ($MgNH_4PO_4$) or calcium phosphate (CaP). Previously, struvite formation and recovery has been heavily studied, and pilot plants and full-scale applications are already being implemented. However, struvite precipitation can be impeded by common wastewater constituents, such as calcium or bicarbonate, and require chemical feedstocks, such as magnesium chloride. CaP precipitation is also advantageous for phosphorus recovery, owing to the abundance of calcium in natural waters and the chemical similarity of CaP to typical phosphate rock sources. Commonly, to induce CaP precipitation, calcium chloride, calcium hydroxide, or lime are used as supplementary calcium sources. In such processes, nucleation is usually the rate-determining step for CaP precipitation; thus, an additional pH adjustment to alkaline pH values (>10) or an adjustment to $[Ca^{2+}]$ concentration can also be necessary to induce fast CaP precipitation by increasing the thermodynamic driving force. Because of the required high pH value, simultaneous formation of calcium carbonate can also lower the overall purity of the final product. In addition, CaP precipitates exhibit low settleability and can be difficult to collect due to their small sizes.

The removal of phosphorus through crystallization can be improved by implementing "seed" materials, which are generally applied as suspended powders in solution to act as substrates for mineral growth. Seed materials for struvite, such as preformed struvite crystals, increase the overall recovery efficiency, kinetics, and final particle size. To form CaP, a variety of seed materials have been suggested, such as calcite or calcium silicate minerals. Seed materials benefit the CaP crystallization process by increasing the kinetics of the process or by buffering or changing aqueous conditions to favor CaP formation.

Using CaP as a seed mineral, CaP/calcium alginate (Ca-Alg) mineral-hydrogel composites were developed as disclosed herein. During gelation, Ca-Alg formation is accompanied by CaP mineral seed formation in situ. This method distributes the CaP seed throughout the hydrogel matrix while circumventing the generally high-energy mixing step required to evenly disperse nanoparticles in a hydrogel precursor matrix. Based on low solubility of CaP, this composite was able to remove and recover P effectively (from 6.2 mg-phosphorus/L (mg-P/L) to 0.7 mg-P/L in ~22 h, with a loading capacity of 96.4 mg-P/g CaP mineral seed). Furthermore, compared to other nanometer or micrometer sized seed materials, the ~2 mm size of the mineral-hydrogel composite facilitates easier separation and collection from solution. Implementing the CaP seeds also lowers the high energy barrier for CaP formation, prompting the formation of CaP from solutions. CaP/Ca-Alg composites can be applied for recovery and removal of phosphorus from water containing excess phosphate. While this approach is highly advantageous, a few improvements can be made: For one, the kinetics of phosphorus removal using this technique are slower than in traditional adsorption processes or crystallization from highly supersaturated solutions, which typically reach equilibrium within 1-4 h. The process is also dependent on the aqueous chemistry of the target waterbody and, therefore, is not applicable to soft waters or to waters with a pH<7, where the solubility of calcium phosphate increases as pH decreases. To improve these aspects, the present Example presented here, mixed soluble phosphate (P) and silicate (Si) in a sodium alginate precursor solution. Then, during gelation in a calcium chloride bath, the calcium interacted and formed CaP and calcium silicate hydrate (CSH) seed minerals while simultaneously cross-linking the alginate. These mineral-hydrogel composites were then applied for P removal and recovery.

Therefore, the present Example provides the synthesis of novel calcium mineral-hydrogel composites that enable fast and broadly applicable P removal and recovery. CSH was incorporated into the CaP/Ca-Alg mineral-hydrogel composites. the P-removal/recovery performance of (1) CaP only containing mineral-hydrogel composites, (2) CSH containing mineral-hydrogel composites, and (3) CaP+CSH containing mineral-hydrogel composites were then compared to determine the mineral seeds' individual and synergistic effects. Furthermore, the effect of varying the calcium bath concentration was examined. The calcium bath concentration directly affected the mineral seed's characteristics and its subsequent P recovery ability. However, the large amount of calcium necessary for the process made it one of the largest sources of cost for the composites. Therefore, it was also examined whether adding Si can lower the material synthesis requirements, improving the resource-use efficiency. Finally, the underpinning mechanisms of phosphorus removal and recovery, especially the effect of the hydrogel system on the P removal and recovery performance and the presence of silicate during both the synthesis and the application of the mineral-hydrogel composites were elucidated. The findings here demonstrated the potential of CaP+CSH/CaAlg as a new phosphate removal and recovery technology that utilizes green chemistry principles.

Synthesis and Characterization of Mineral-Hydrogel Composites: After the sodium alginate and ionic precursor solutions were dripped into the calcium chloride bath, they formed spherical hydrogel beads (shown suspended in water in FIG. 22A). If ionic precursors were included in the sodium alginate solution, the hydrogel bead quickly turned opaque, indicating mineral seed formation. After synthesis, the dry weights of the mineral-hydrogel composites were measured to confirm the formation of and quantify the mineral seed formed. The CaP seeds and CSH seeds formed similar weights of mineral, with the two mineral seeds making up ~29% of the total dry weight. The CaP+CSH seeds together accounted for ~44% of the total dry weight. Overall, as expected, the combined CaP+CSH seeds formed about twice as much mineral seed weights as the CaP and CSH seeds, based on their dry weight. For example, the mineral seed weights were 25 mg for CaP+CSH, compared to ~13 mg and ~16 mg for CSH only and CaP only, respectively. The hydrogel bead sizes were similar (~2 mm diameter) and showed no observable difference among the various mineral seeds.

Hydrogel samples were measured with USAXS and WAXS at APS beamline 9-ID-C. USAXS measured the mineral seed's morphology and particle size in the composites, while WAXS identified the mineral phase present in the composites. Standard mineral peaks were referenced from the Mindat database. WAXS scattering patterns (FIG. 22A) showed that the CaP seeds formed phases similar to hydroxyapatite, showing major peaks at d-spacings of ~2.8 and 3.4 Å (Spectrum 3 in FIG. 22A). CSH seeds displayed peaks similar to those of tobermorite, a naturally occurring CSH mineral, indicated by major peaks at d-spacings of ~1.8, 2.8, and ~3.0 Å (Spectrum 2 in FIG. 22A). In the combined seed cases, both mineral phases were observed (Spectrum 1 in FIG. 22A). In addition, a peak around ~2.3

Figure 22A:
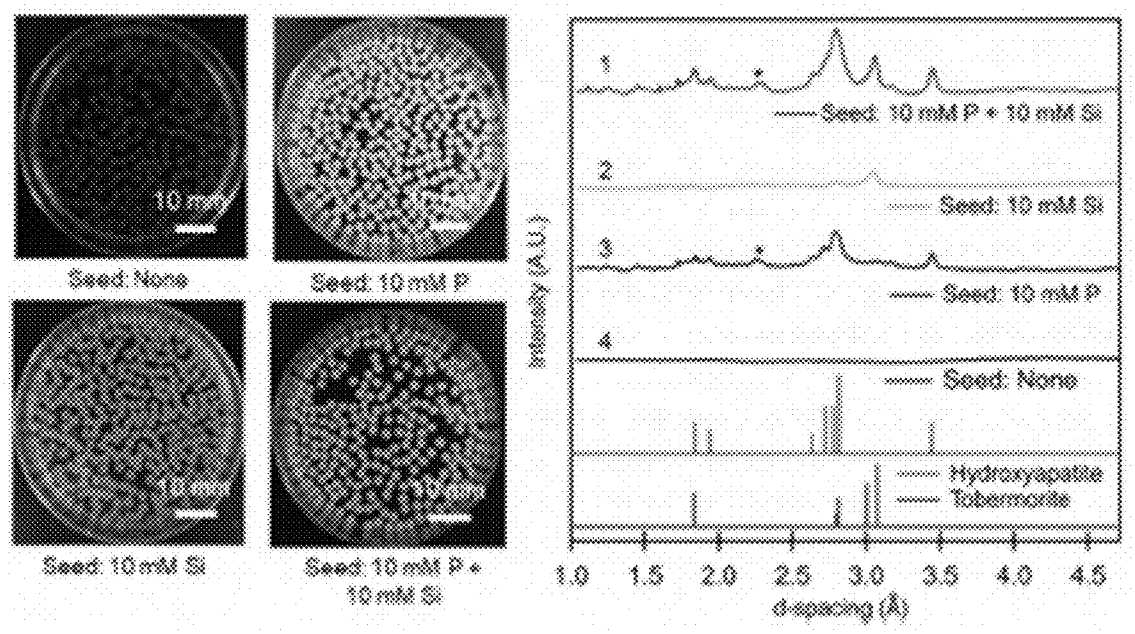
FIG. 22A shows pictures of mineral-hydrogel composites made with each different mineral seed and reference wide-angle X-ray spectra (WAXS) and representative sample WAXS spectra. Each spectrum has the same intensity scale (y-axis), allowing for direct comparison of crystallinities. Calcite peaks are marked with *. The scans shown here were taken from a depth of 400-600 μm in the hydrogel samples prepared for X-ray scattering characterization.
Figure 22B:
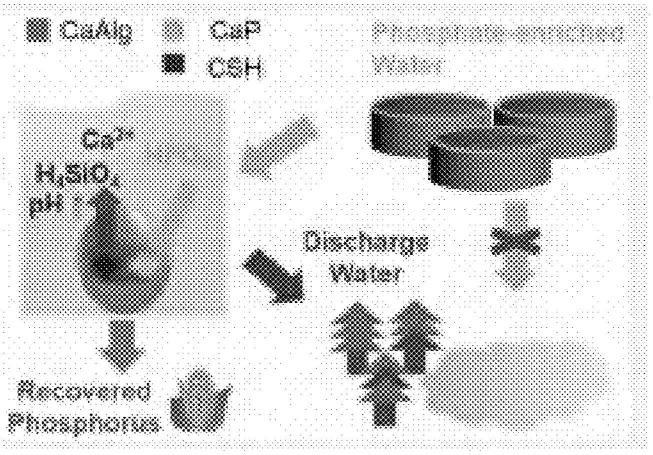
FIG. 22B shows a schematic of the potential of the mineral-hydrogel composites composed of alginate to be a widely applicable and environmentally sustainable treatment and recovery method for nutrient-rich wastewater.

Å was attributed to calcite (marked with *), which may have formed owing to the high calcium concentration and high pH conditions in the calcium bath (Spectra 1 and 3 in FIG. 22A). These results are similar to those recently reported by Solonenko et al., (Mater. Charact. 2020, 161, 110158) who studied precipitation in an aqueous system containing Ca—Si—P for application as a bioceramic material for bone regeneration. Interestingly, instead of tobermorite, they reported clear calcite XRD peaks as the result of Si incorporation. In the present Example, peaks associated with tobermorite were mainly observed (Spectra 1 and 2 in FIG. 22B). In another report regarding a Ca—P—Si precipitation system, Mostafa et al. (J. Am. Ceram. Soc. 2011, 94 (5), 1584-1590) found only hydroxyapatite peaks. Their study examines the simultaneous increased incorporations of silicate and carbonate into the HAP structure during precipitation of $Ca(OH)_2$, $NaH_2PO_4$, and $Na_4SiO_4$ in solution without the presence of alginate. On the other hand, in the present system, while some carbonate substitution may have occurred, clear peaks in Spectrum 1 of FIG. 22A can be attributed to CSH, suggesting that the dominant mineral phase in Si-containing systems is tobermorite. Overall, the present method of coprecipitation during gel formation was able to produce mineral-hydrogel composites seeded with CSH or CaP+CSH without a large amount of calcite or carbonate impurities, limiting their roles in inhibition of CaP nucleation and growth during P recovery.

Figure 23A:
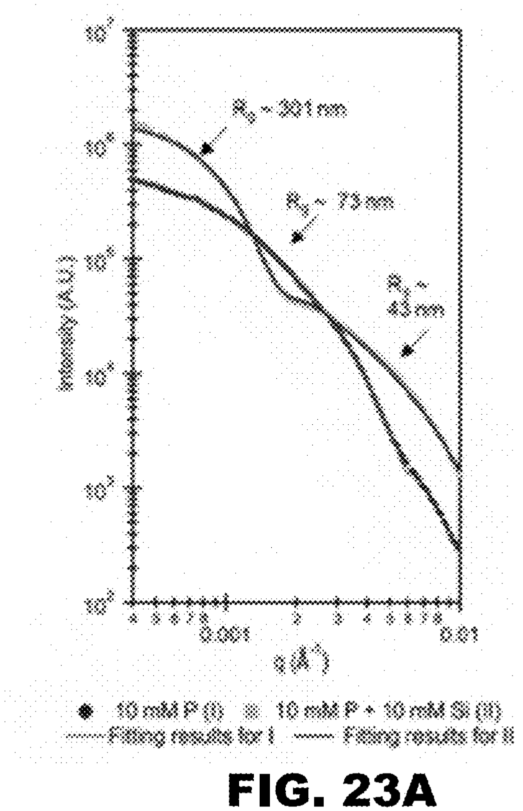
FIG. 23A show ultrasmall angle X-ray scattering results and their fittings for different mineral seeds.

USAXS scattering patterns (FIG. 23A) revealed that the mineral seed morphology and particle size were different for each different mineral seed. The CaP seeded system had one primary particle size distribution with a radius of gyration (Rg) ~73±2 nm (three replicates). Assuming a spherical shape, the relation between Rg and the particle diameter is Rg 2=R2·(3/5). Therefore, the CaP seeded system had an estimated diameter (D) of ~190 nm. Scattering at lower q revealed that the primary particles may have associated in mass fractal aggregates with a dimension of ~2.4, indicating that they are relatively densely packed. The CaP+CSH seeded hydrogels had two main particle sizes (Rg1 and Rg2), with Rg1 ~301±36 nm and Rg2 ~43±14 nm (three replicates). Once again assuming a spherical particle, these radii correspond to D1 ~780 nm and D2 ~93 nm. For the CSH seeded hydrogel, the contrast in electron density between the mineral seed and the surrounding water/hydrogel matrix was not high enough for USAXS to clearly determine the particle size and morphology. Therefore, the measured USAXS patterns for CSH/Ca-Alg were not used.

Figure 23B:
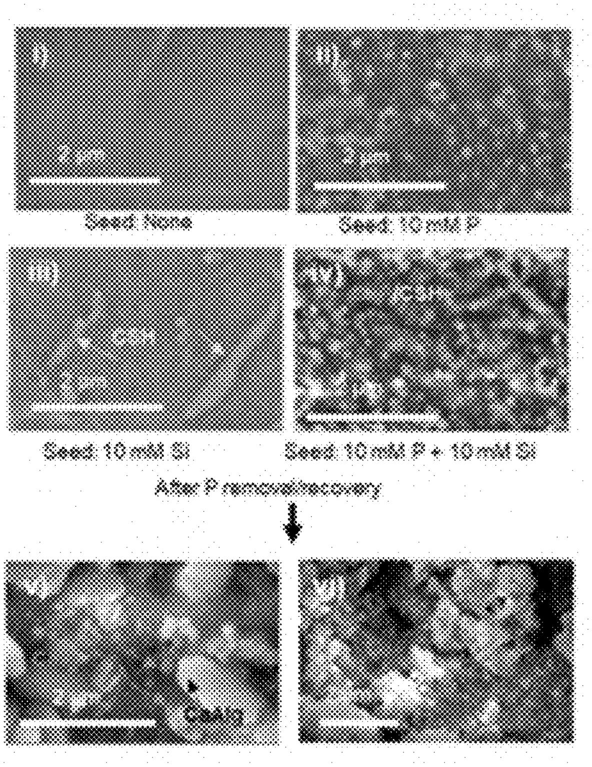
FIG. 23B shows SEM images of the different mineral-hydrogel composites. Yellow or green arrows indicate examples of the mineral seeds. The corresponding colored text is its composition as determined by Energy dispersive X-ray (EDS) spectroscopy. In (FIG. 23B), ii, iv, v, and vi, green arrows indicate CaP containing particles and aggregates before and after the P recovery reaction for 10 mM Si and 10 mM P+10 mM Si seeded mineral-hydrogel composites, identified using SEM-EDS. The black arrow indicates that the large solid features were determined to be the calcium alginate hydrogel.

To the interpretation of the USAXS patterns, complementary SEM-EDS analyses were conducted. For this measurement, the hydrogels were dehydrated in ethanol and ground them in a mortar and pestle. The grinding of the hydrogel beads created freely floating hydrogel fragments that, when imaged, clearly showed the mineral seeds (FIG. 23B). Imaging a hydrogel without a mineral seed revealed a smooth dried hydrogel surface (FIG. 23B). Imaging the 10 mM P mineral-hydrogel composites revealed spherical particles with diameters of 104 nm±27 nm (n=81), and their SEM-EDS analysis indicated that the mineral particles are CaP. Imaging of the 10 mM Si mineral seeded composites with SEM-EDS (FIG. 23B) revealed a large size range of CSH particles. Finally, the 10 mM P+10 mM Si mineral seeds in hydrogels were comprised of similarly sized small spherical particles (diameters of 137 nm±27 nm (analyzed particle numbers=66)) with larger irregularly shaped particles with dimensions of ~1 μm (FIG. 23B). Their SEM-EDS analysis identified the small spherical particles as mainly CaP, with some small silicate impurities, while the larger particles were a mix of CaP and CSH (3% atomic phosphorus and 1.5% atomic silica). This suggests that the 10 mM P+10 mM Si mineral seeds were formed through coprecipitation of CaP and CSH during calcium alginate hydrogel formation. The elemental composition of the mineral seed formed in this study was similar to that of the mineral aggregates precipitated from a Ca—Si—P system reported by Solonenko et al. (Mater. Charact. 2020, 161, 110158). With regards to the mineral aggregate size, however, they reported that, regardless of silicate content, their mineral precipitates were comprised of aggregates sized from 3 to 100 μm. On the other hand, the CaP mineral seeds in the present example were largely spherical single particles with submicrometer sizes. This difference was attributed to the presence of alginate polymers and the formation of Ca-Alg hydrogel during the initial stages of nucleation and growth of minerals. As a result, the present mineral seeds were smaller, with a correspondingly larger surface areas and increased reactivities.

The mineral-hydrogel composites seeded with CSH and CaP+CSH mineral seeds were imaged after the P removal/recovery reaction in the P-rich solution. It was found that CaP particles a few micrometers in size formed after the reaction, whereas only submicrometer CaP particles were observed before the reaction. The XRD patterns showed that the CaP mineral seeds' phase did not change during the P-recovery reaction. For the CSH mineral seeds, phosphate containing aggregates were observed. The large (micrometer scale) solid regions that were also observed did not contain large amounts of silicon or phosphorus, indicating that it was the calcium alginate matrix. For the CaP+CSH seeded mineral-hydrogel composites, similar aggregates were observed. Spherical CaP particles with a similar size to the particles observed before the reaction are also still visible. Additionally, large micrometer scale solid particles in the top right of are observed that clearly contain CSH based on their elemental composition. For the CSH mineral seeded composites, the presence of phosphorus after the reaction was clearly shown, while a decrease in silicate content was also observed. For the CaP+CSH mineral seed, the mineral compositions, as measured by SEM-EDS, were similar before and after the reaction. The recovered CaP minerals' phase, is expected to be similar to its mineral phase before the reaction. These aggregates and mineral-seed particles are contained within the macroscale structure of the calcium alginate hydrogel and can be thus easily recovered from the solution due to the hydrogel's millimeter-scale size. The CaP containing aggregates and particles can thus be reused as a fertilizer or for other applications.

One caveat is that the mineral morphologies and sizes, especially of the CSH minerals, can be altered by drying. Thus, the particle size from the USAXS fitting and that was measured from the SEM-BSE images could differ. Drying can shrink hydrated particles, or alternatively, the same drying process can cause aggregation of small particles that were originally dispersed in the hydrogel, making them appear larger.

Effects of Seed Compositions on P Removal: Comparison of P, Si, and Their Combinations: Mineral-hydrogel composites with different seed minerals were synthesized by changing the ionic precursor amounts in the sodium alginate solution before gelation in the $CaCl_2$ bath. The ionic precursors tested were 10 mM $Na_2HPO_4$ (CaP), 10 mM $Na_2SiO_3$ (CSH), or 10 mM $Na_2HPO_4$+10 mM $Na_2SiO_3$ (CaP+CSH). Their phosphate removal and recovery performances were then tested with the P-rich solution. For comparison, the formulation (0.6% (w/w) sodium alginate+

Figure 24A:
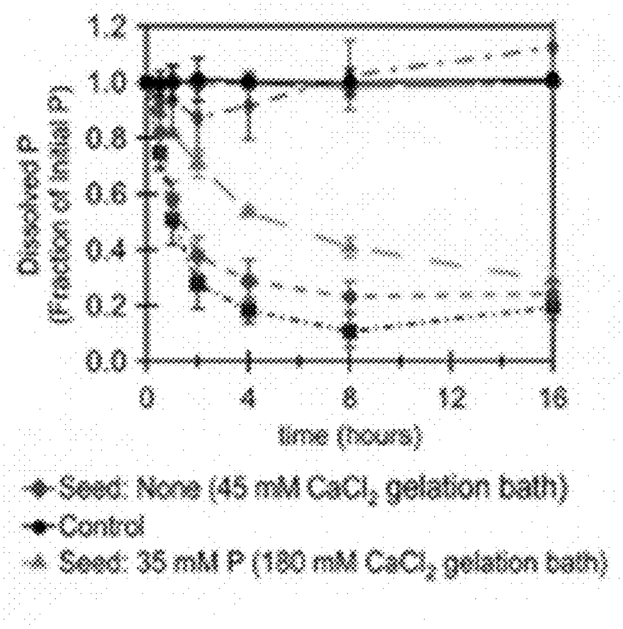
FIG. 24A shows kinetics of dissolved phosphate in the P-rich solution system over time, when exposed to the different mineral-hydrogel composites.
Figure 24B:
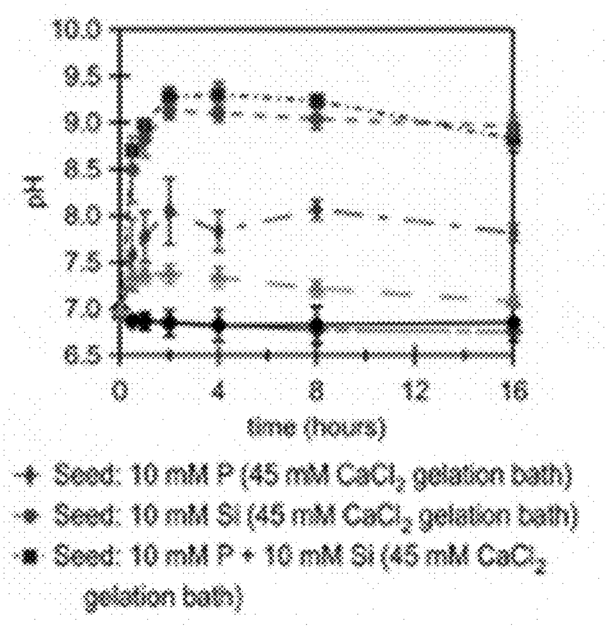
FIG. 24B shows pH change over time for the P-rich solution when exposed to different mineral-hydrogel composites.

35 mM $NaHPO_4$, formed in a 180 mM $CaCl_2$+20 mM NaOH bath) was also tested under identical conditions. Both the Ca-Alg hydrogel seeded with 10 mM Si and that with 10 mM Si+10 mM P reached comparable final dissolved P values. Their P removal kinetics were twice as fast as those of the previous formulation: they reached equilibrium in ~8 h, as opposed to >16 h (FIG. 24A). As expected, adding CSH seeds released soluble silicates and increased the pH (FIG. 24B). In addition, phosphate removal and recovery with the CaP+CSH seeded Ca-Alg used less material than the previously reported formulation (25% of the original $CaCl_2$ and 28.5% of the original P amount necessary for the CaP seed). The pure CaP seed formed using the reduced P amount (10 mM P seed, which is 28.5% of the original P concentration (35 mM P)) did not remove phosphate effectively.

Figure 24C:
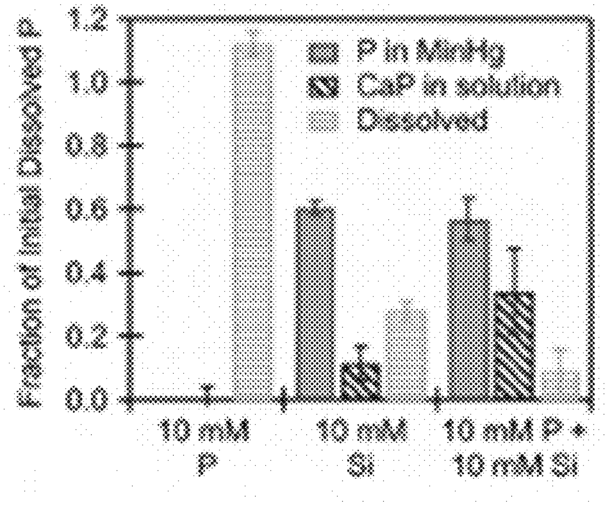
FIG. 24C shows final distribution of phosphate in the system after 16 h.

Phosphate was removed as either homogeneously nucleated and grown CaP particulates or, within the mineral-hydrogel composite, as heterogeneously nucleated and grown CaP mineral (FIG. 24C). The homogeneous nucleation occurred due to the increase in pH and released [$Ca^{2+}$] induced by the dissolution of the CSH seeds. Thus, there is competition between the formation and growth of homogeneous CaP nuclei in solution and the uptake of [P] by heterogeneous nucleation within the mineral-hydrogel composites. Of the two nucleation types, the heterogeneously nucleated P is easily recovered from the mineral-hydrogel composites, while the homogeneously nucleated P is present in solution as aggregates of CaP mineral. However, the homogeneously nucleated P also contributes to a final low soluble P concentration. For example, reacting the CaP+CSH/Ca-Alg mineral-hydrogel composites in the model P-rich solution resulted in final concentrations as low as 0.018 mM phosphate (or 0.55 mg-P/L). By comparison, reacting the CSH/Ca-Alg mineral-hydrogel composite in the P-rich condition only reached a final P concentration of 0.056 mM phosphate (or 1.73 mg-P/L). Despite the CSH-only and CaP+CSH mineral-hydrogel composites removing similar amounts of P through heterogeneous nucleation (60.4% and 56.9% of the initial dissolved P for CaP+CSH and CSH, respectively, FIG. 24C), the CaP+CSH mineral-hydrogel composites induced more homogeneous nucleation and reached lower final P concentrations. Therefore, both types of nucleation need to be considered in assessing the mineral hydrogel composite's ability to remove and recover phosphate. Additionally, by increasing the dosage of the mineral-hydrogel composite, the combined mineral seed reached concentrations as low as 0.25 mg-P/L. phosphate.

Figure 24D:
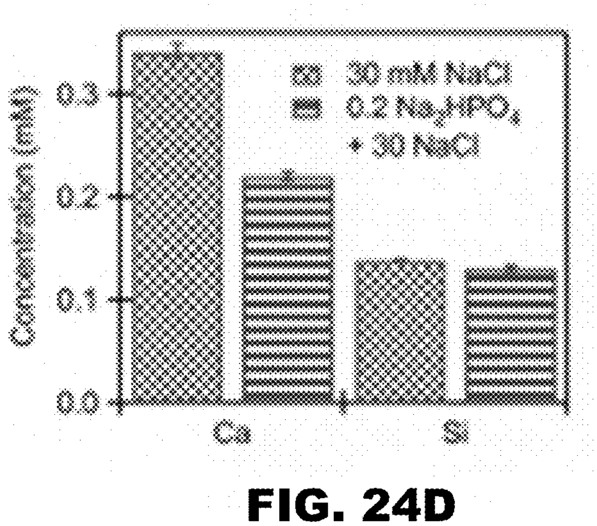
FIG. 24D shows release of calcium and silicate from CaP+CSH/Ca-Alg in different reaction solutions after 16 h.
Figure 24E:
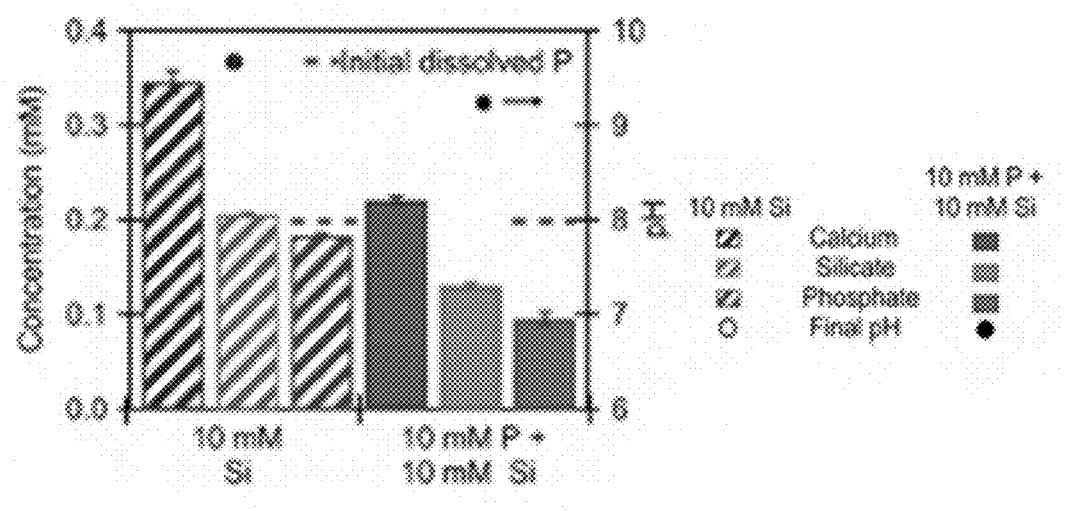
FIG. 24E shows pH and final concentrations after a 16 h reaction in a solution undersaturated with respect to hydroxyapatite (0.2 mM $Na_2HPO_4$, 30 mM NaCl, initially at pH 7) for CaP+CSH mineral-hydrogel composites and CSH mineral seeded mineral mineral-hydrogel composites.
Figure 24F:
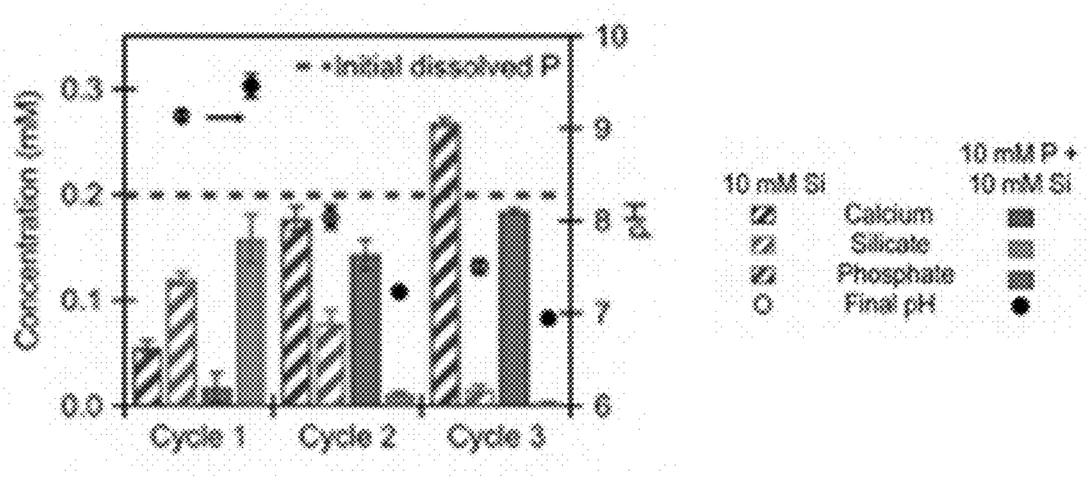
FIG. 24F shows final dissolved phosphate and silicate concentrations and final pH for CaP+CSH mineral and CSH mineral seeded hydrogel composites after repeated exposure to P-rich solutions (1 cycle is defined as 16 h reaction). The red dashed line is the original dissolved phosphate concentration before the reaction starts. All error bars are from triplicate samples and represent 1 standard deviation. Red arrows in (A), (C), and (E) indicate where dissolution of CaP mineral seed occurred.

In the P-rich solutions tested, as mentioned above, comparable amounts of P were removed by heterogeneous nucleation on the CaP+CSH seeded mineral-hydrogel composites and the CSH seeded mineral-hydrogel composites (FIG. 24C). The main difference was the homogeneously removed P fraction amount. However, the two mineral-hydrogel composites differed in other key regards: For one, the CaP+CSH mineral seeded composites released silicate more quickly than the CSH mineral seeded composites. This quicker release contributes to the larger homogeneous nucleation fraction, as the quick release of $Ca^{2+}$ increases the supersaturation ratio of CaP in the solution, promoting the homogeneous removal of P that occurs in parallel to the heterogeneous recovery of P. The CaP+CSH mineral seeded composites also have a higher ability to heterogeneously remove P. When the mineral-hydrogel composites were reacted in hydroxyapatite undersaturated solutions, the combined CaP+CSH seeded mineral-hydrogel composites recovered significantly more P than the CSH seeded mineral-hydrogel composites (FIG. 24E). The CaP+CSH mineral seeded composites are also more stable that the CSH mineral seeded composites. When the mineral-hydrogel composites were reused in multiple cycles, the CaP+CSH mineral seeded composites did not release P, while the CSH mineral-hydrogel composite began leaching P (FIG. 24F). Overall, the CaP+CSH mineral seeded composites have a higher affinity for heterogeneous P removal, making P recovery more expedient, and do not leach P as easily as the CSH mineral seeded composites, promoting their use.

Reaction of Mineral-Hydrogel composites in the P Rich Solution: Mechanisms for P Removal and Recovery: To confirm the mechanism of P removal by the mineral-hydrogel composites, the calcium and silicate release from CaP+CSH seeded mineral-hydrogel composites was also tested in two additional solution conditions: (1) 30 mM NaCl and (2) 0.2 mM $Na_2HPO_4$+30 mM NaCl (undersaturated with respect to hydroxyapatite, SI=−59.3), both at initial pH=7 (FIG. 24D). The silicate release was found to be largely consistent whether P was present or not. With regard to calcium, the calcium release was much less when phosphate was present, indicating that P uptake was mainly accomplished by CaP mineral formation within the mineral-hydrogel composites (~60% of initial P heterogeneously removed). This heterogeneous CaP formation occurred even though the initial solution was undersaturated with respect to hydroxyapatite, because the release of $Ca^{2+}$ from the composite was locally sufficient to create supersaturated conditions in the mineral-hydrogel composites. The total amount of silicate released was also ~60% of the theoretical total amount of silicate incorporated as CSH in the mineral-hydrogel composites, based on a mass balance of total silicate introduced into the solution from the mineral-hydrogel composites compared to the final silicate concentration in the aqueous solution. This finding precludes the possibility of phosphate adsorption to the CSH mineral seeds as a dominant mechanism for P removal. It is also worth noting that the final silicate concentrations observed (~9 mg-$SiO_2$/L) are in the range of ambient silica concentrations in surface streams and groundwater (~14 mg-$SiO_2$/L and ~17 mg-$SiO_2$/L, respectively). Therefore, the amount of silicate release that was observed would not create a new concern.

Figure 25:
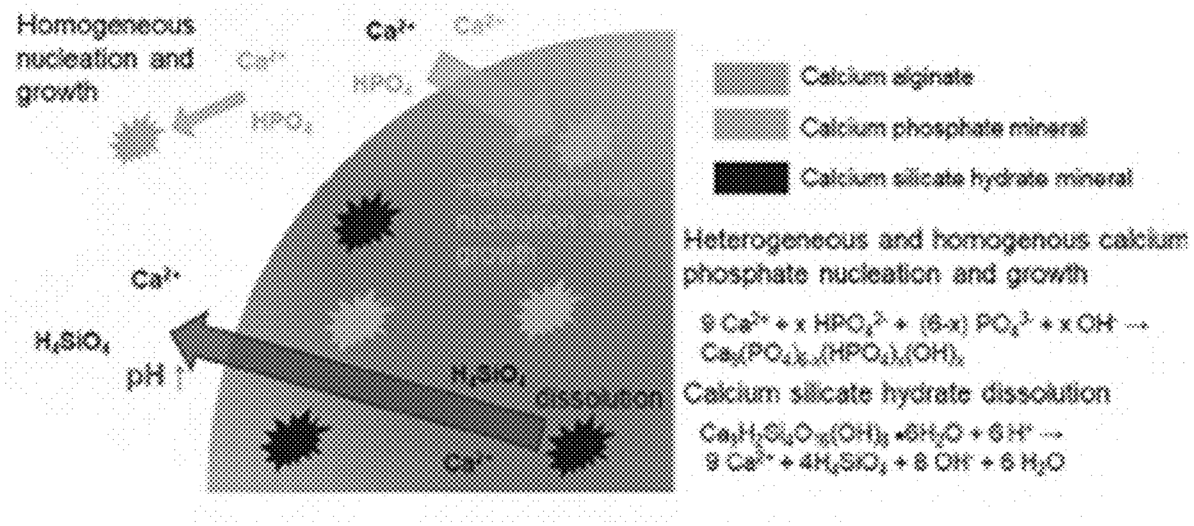
FIG. 25 shows proposed mechanisms and stoichiometric reactions governing calcium and silicate release, the increase in pH, and the removal and recovery of phosphate.

The mechanisms and processes for silicate release and P removal and recovery are presented in FIG. 25. Proposed are two main processes involved in P recovery by the mineral-hydrogel composites (FIG. 25). First, CSH mineral seeded composites release $Ca^{2+}$ and $H_3SiO_4$—by dissolution. These ions then diffuse through the hydrogel to the outer solution. Simultaneously, P diffuses inward from the solution, creating a local microenvironment within the hydrogels that highly favors heterogeneous CaP nucleation and growth, the second process contributing to P recovery. The role of local microenvironments for P recovery through crystallization has been recently emphasized. For example, Lei et al. (Environ. Sci. Technol. 2017, 51 (19), 11156-11164) reported the importance of elevated pH near the cathode during electrochemical recovery of CaP. Hovelmann and Putnis (Environ. Sci. Technol. 2016, 50 (23), 13032-13041) used atomic force microscopy to directly observe the nucleation and growth of struvite on a brucite ($Mg(OH)_2$) surface. The dissolution of brucite in their system created a boundary layer with a highly favorable environment for struvite formation. Cunha et al. (Environ. Sci. Technol. 2018, 52 (22), 13144-13154) reported that CaP formation is favored in granules with an increased internal pH from biological activity. In hydrogel systems, increased internal pH values have been engineered for the removal of heavy metal ions through selection of appropriate monomer units or for the protection of pH-sensitive enzymes through the inclusion of brucite. These engineered hydrogels were respectively applied to selectively recover metal ions and protect acid-sensitive compounds. In the present system, an elevated internal pH was engineered through the inclusion of highly soluble CSH mineral seed within the hydrogel. The dissolution and diffusion of $H_3SiO_4$—through the hydrogel act as transport barriers to maintain a locally high internal pH.

To gain further insights into CaP formation and CSH dissolution, their stoichiometries were estimated (FIG. 25). While the exact stoichiometries of the mineral seeds and heterogeneously and homogeneously formed CaP minerals are unknown, they can be estimated by the known stoichiometries for amorphous CaP and amorphous CSH. For amorphous CSH, the reported stoichiometry was used for the highest Ca:Si ratio (2.2:1) to represent the CSH mineral seed, because it is the closest value to the Ca:Si ratio from dissolution of the mineral-hydrogel composites in 30 mM NaCl solution (FIG. 24D). Based on these equations, the dissolution of CSH can directly promote the growth of CaP seed through the release of $Ca^{2+}$ and $OH^-$. Importantly, the hydrogel facilitates this process because it contains both mineral seeds near each other. The released silicate may also contribute to CaP nucleation and growth, both during mineral seed formation and phosphate recovery. Previously, low concentrations of silicate have been reported to increase the nucleation rate of hydroxyapatite in simulated body fluid and in neutral aqueous solutions. Silicate can also potentially be incorporated into the CaP structure. This can potentially inhibit the crystallization of calcium phosphate, stabilizing the amorphous phase and making the mineral seeds more soluble and the phosphate more available for reuse applications. Another potential possibility is that a silica shell/patch can form as reported by Wang et al. (Cryst Eng Comm 2016, 18 (3), 379-383), who observed this phenomenon during the precipitation of amorphous CaP in the presence of silicate, which might slow the release rate of phosphate from the mineral-hydrogel composites.

Reduction of Calcium and Phosphate Addition Required for Composite Synthesis: Different fabrication parameters, such as the calcium chloride bath concentration, change the mineral seeds and its P removal and recovery performance, influencing the composites' performance. Thus, we tested varied calcium chloride bath concentrations (22.5 mM-180 mM) for the three different mineral seeds (CaP, CSH, CaP+CSH).

Figure 26:
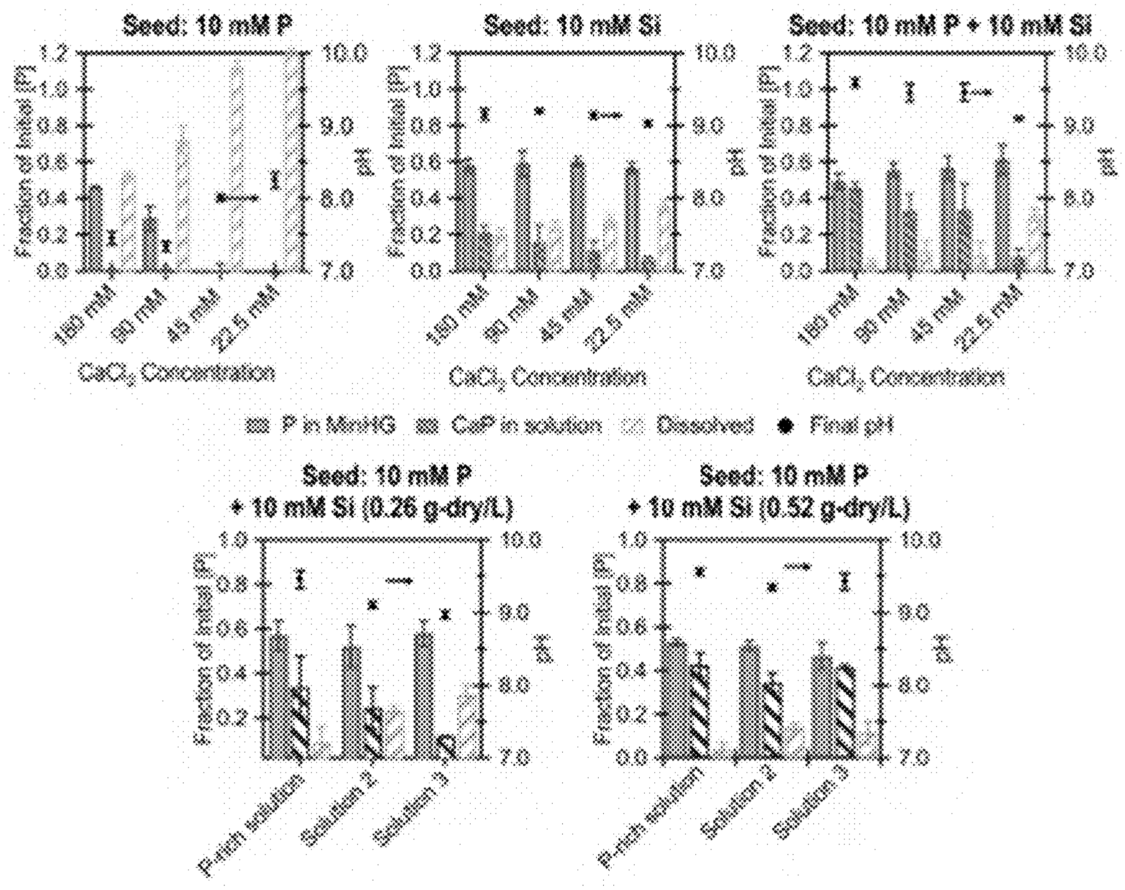
FIG. 26 shows pH values and distributions of phosphate in P-rich solution batch reactions after 16 h of reaction with mineral-hydrogel composites formed from different calcium chloride batch concentrations, with seed minerals formed from ionic precursors of 10 mM P, 10 mM Si, and 10 mM P+10 mM Si. The amount of NaOH in the calcium bath was fixed at 20 mM NaOH for each concentration. All error bars are from triplicate measurements and represent 1 standard deviation. Composite dose of 0.26 g-dry hydrogel/L and composite dose of 0.52 g-dry hydrogel/L. Final pH values and P distributions of and after 16-h batch reactions in P-rich aqueous solution, P-rich aqueous solution with 1 mM $NaNO_3$ and 1 mM $Na_2SO_4$ (Solution 2 in bottom graphs), and P-rich aqueous solution with 1 mM $NaNO_3$, 1 mM $Na_2SO_4$, and 2 mg-C/L dissolved organic matter (DOM) (Solution 3 in bottom graphs). In the bottom graphs, the mineral-hydrogel composites were made with a 45 mM $CaCl_2$ batch concentration.

The calcium concentration mainly affected the solubility of the CaP mineral seed (FIG. 26). At 180 mM and 90 mM $CaCl_2$, the CaP mineral seeds were much less soluble than those formed in either a 45 mM $CaCl_2$ bath or a 22.5 mM $CaCl_2$ bath, as shown by the final dissolved phosphate levels after 16 h. The CSH mineral's characteristics were less affected, as evidenced by the consistent levels of P removal and the final pH level (FIG. 26). For the combined CaP+CSH seeds as shown in FIG. 26, the calcium chloride bath concentration mainly affected the amount of homogeneous nucleation and growth, with 180 mM $CaCl_2$ yielding the highest and 22.5 mM $CaCl_2$ yielding the lowest. This result indicates that the overall amount of calcium incorporated into the mineral seed is dependent on the $CaCl_2$ bath concentration, with higher concentrations incorporating more calcium. When the mineral-hydrogel composites are placed in the P-rich solution, the calcium is released, with more calcium causing more CaP mineral formation in the solution. However, for the combined CaP+CSH seeds, the amount of P removed by heterogeneous nucleation and the final dissolved P concentration were similar for all $CaCl_2$ concentrations. This aspect allows less $CaCl_2$ to be used in producing mineral-hydrogel composites, without affecting their removal and recovery performance. The Si ionic precursor also increases the supersaturation ratio during CaP mineral formation, producing a final CaP mineral seed that is less soluble with less phosphate compared to our previous work (10 mM compared to 35 mM). The supersaturation of CaP is also crucial in fabricating the mineral-hydrogel composites, so decreasing either calcium or phosphate in the fabrication process is normally offset by increasing the other element. Adding silicate to the mineral-hydrogel composites decreases both elements simultaneously, lowering the overall materials requirement for synthesis. Furthermore, the mineral-hydrogel composites are synthesized at room temperature from an environmentally-benign polymer and abundant elements of calcium and silica, in accordance with the principles of green chemistry. Additionally, the release of P from the mineral-hydrogel composites for the 10 mM P mineral seed in the first cycle (FIG. 24A and FIG. 24C) and the 10 mM Si mineral seed in the third cycle (FIG. 24F) demonstrate that the P contained within the CaP mineral seed is recoverable by dissolution. This was also demonstrated herein, where it was shown that P can be released in undersaturated aqueous conditions at a sufficient concentration for plant growth in a quartz powder column (simulating soil applications).

Effect of Different Anions on CaP+CSH/CaAlg Mineral-Hydrogel Composites: To determine the effect of common anions on the P recovery and removal performance of the CaP+CSH/CaAlg mineral-hydrogel composites, we modified the P-rich solution to contain (1) 1 mM sodium nitrate and 1 mM sodium sulfate (Solution 2 in FIG. 26) or (2) 1 mM sodium nitrate, 1 mM sodium sulfate, and 2 mg-C/L dissolved organic matter (DOM) (Solution 3 in FIG. 26). It was found that the presence of these anions and DOM mainly reduced the amount of homogeneous nucleation that occurs within the solution, whereas the heterogeneous nucleation amount was not affected. The final P concentrations are therefore higher than the final P concentration achieved when no competing anions are present (FIG. 26). It was found that increasing the dose of mineral-hydrogel composite can compensate for this effect, achieving similar final concentrations of aqueous P (FIG. 26).

Comparison with Other Calcium Silicate-Based and Common P-Removal/Recovery Methods: To determine the relative P affinity and reactivity of the mineral-hydrogel composites, the composites provided herein were compared to previously reported P recovery technologies using CSH mineral seeds (Table 3). For a more direct comparison, P-loading was used (mg-P/g mineral seed) at an equilibrium concentration of 2.65 mg-P/L, the final concentration reached by CaP+CSH/Ca-Alg in HAP undersaturated conditions (FIG. 24D). Overall, mineral-hydrogel composites disclosed herein have three advantages over the currently reported CSH mineral-based P removal methods. First, the composites of the present disclosure have comparable P reactivity to CSH mineral seeds reported recently as effective P recovery materials. Both of these studies created highly reactive seed minerals or adsorbents by using either pore-forming agents or sonochemical synthesis, demonstrating that mineral seeds synthesized inside the hydrogel are highly reactive with respect to P uptake. However, the present in situ mineral-hydrogel composite synthesis is simpler and less energy intensive. Second, the mineral-hydrogel composites are more reactive than similar materials that combined hydrogels with inorganic mineral seeds.

Both studies formed hydrogels around preformed CSH minerals. Their reduced reactivities can be attributed to transport limitations, commonly found in hydrogel adsorbent systems, or to reduced mineral reactivity. In our mineral-hydrogel composites, we expect that transport limitations will be lower than in other systems, because the calcium bath gelation method should form mineral seeds close to the surface of the mineral-hydrogel composites. Third, our CaP+CSH mineral seed can be easily recovered because of the mineral-hydrogel composite's large millimeter-scale size. Therefore, they are easily recovered for potential application as fertilizers, as studied in our previous work.

The CaP+CSH/Ca-Alg mineral-hydrogel composites also compare favorably with other reported P-targeting sorbents with regards to P-affinity. Here, we defined P-affinity as the P loading (mg-P/g) at a specified equilibrium concentration (qe). If a composite has a higher qe at the specified equilibrium concentration, it has a higher P-affinity. Based on a recent review that compiled 63 reported adsorbents and their Langmuir adsorption isotherm model parameters, our CaP+CSH/Ca-Alg mineral seed has a higher P-affinity at a concentration of 2.65 mg-P/L than 55 of the adsorbents. Moreover, while it maintains one of highest P-affinities, our mineral-hydrogel composite achieves this without the use of rare earth elements such as lanthanum or yttrium, using only renewable or environmentally abundant materials such as alginate, calcium, phosphate, and silicate. The mineral-hydrogel composites developed here also show a great promise compared to other P removal/recovery technologies. Conventional precipitation by aluminum or iron salts can reliably achieve concentrations of ~1-2 mg-P/L. This performance is the range of the mineral-hydrogel composites, which achieved concentrations of 0.25 mg-P/L and 2.65 mg-P/L under hydroxyapatite supersaturated and undersaturated conditions, respectively. The mineral-hydrogel composites also have the added benefit of recovering usable phosphate, while iron phosphates and aluminum phosphates are generally not suitable for reuse. Membrane technologies and biological phosphorus removal can also achieve low effluent phosphate levels, either alone or combined. However, membrane fouling is a concern, and the microbial community needs to be monitored and maintained to sustain optimal phosphate removal. Another biological method to remove and recover phosphate involves the use of algae. This approach is also promising; however, scaling up the system while maintaining the required illumination can be a challenge, whereas scaling up the mineral-hydrogel composites would require only increasing the amount of composite. Electrochemical systems using electrodes to induce CaP scaling, either alone or combined with biological processes, have also gained recent interest. These systems require power and maintenance, such as electrode cleaning and replacement, whereas the mineral-hydrogel composites do not.

Overall, mineral-hydrogel composites share many benefits with adsorptive technologies and crystallization technologies, while also mitigating some of their weaknesses. Like adsorption technologies, they are quickly and easily applied. Moreover, the use of CaP beneficially increases their P affinities, compared to commonly reported adsorbents. Like crystallization technologies, the recovered P is easily usable and in a stable mineral form. Furthermore, due to the prevalence of calcium, the CSH mineral seeds, and the templating ability of the CaP mineral seeds, no additional chemical dosing is required, as is common with crystallization technologies based on struvite or CaP. The mineral-hydrogel composites also can be applied directly to remediate phosphate-enriched water and easily collected, due to their large size and ease of P collection.

CONCLUSIONS: To remove and recover phosphate from aqueous solution, we developed new CaP+CSH/Ca-Alg mineral-hydrogel composites. By incorporating both P and Si into the precursor solution, we synthesized mineral-hydrogel composites composed of calcium alginate, CaP, and CSH. The mineral-hydrogel composites, when placed in the P-rich solution, quickly recovered phosphate, and their removal performance compared favorably with those of previously reported highly efficient P removal methods. The mineral-hydrogel composites create HAP-supersaturated conditions by releasing calcium, silicate, and hydroxide. In addition, the incorporation of Si into the mineral seeds lowers the amounts of calcium and phosphate used to fabricate the mineral-hydrogel composites, while maintaining favorable mineral seed properties for P recovery. This incorporation makes the fabrication process more economical and more resource efficient than its synthesis without Si incorporation. Furthermore, calcium alginate is biodegradable in soil, making the disposal and reuse of these mineral-hydrogel composites environmentally benign.

Through changing the calcium bath concentration and the amounts and their ratios of ionic precursors, the underlying role of each process parameter in P recovery and removal was revealed. The Ca-Alg hydrogel played a key role in both mineral seed formation, by limiting the mineral seed size and amount of carbonate impurities, and in P recovery, by creating an aqueous environment that is highly favorable for CaP formation and growth. The millimeter-size mineral-hydrogel composites we reported here showed promising performance, and the method can be further optimized for application in both point source treatment and nutrient recovery or remediation of nutrient polluted waters. After use, because the P is recovered in the form of CaP mineral, the mineral-hydrogel composites can be applied either as a direct reuse fertilizer or as a feedstock of P for other processes, allowing the mineral-hydrogel composites to contribute to "greening" the phosphorus cycle. Moreover, because the mineral-hydrogel composites create a locally favorable environment for P recovery, minimum effort is needed to adjust the bulk solution composition. This study successfully demonstrates the mineral-hydrogel composites as a promising sustainable technology for phosphate removal and recovery. Important future developments will include regeneration procedures to improve the mineral-hydrogel's performance for multiple cycles, scale up, and implementation in more realistic aqueous conditions, optimization of the mineral seeds for different aqueous conditions and applications, and reuse of the mineral-hydrogel composites.

TABLE 3

Comparison of Our Mineral-Hydrogel Composites with Different CSH Mineral Seeds/Adsorbents Reported in the Literature

| seed material | particle size | lowest reported [P] from batch experiments and final pH | P loading at ~2.65 mg · P/L |
|---|---|---|---|
| mineral seed in CSH-CaP/ Ca-Alg mineral-hydrogel composite | ~2 mm | 0.26 mg · P/L, pH = 9.6 | 27.2 mg · P/g minced seed |
| pourous CSH | ~74 μm | 2.10 mg · P/L, pH = 10.2 | 24.5 mg · P/g CSH |
| amorphous CSH | ~19 μm | 17.8 mg · P/L, pH = 8.6 | 14.1 mg · P/g CSH |
| porous CSH | ~74 μm | 0.15 mg · P/L, pH = 10 | 5.8 mg · P/g CSH |
| CSH powder immobilized in PVA hydrogel | 1 cm × 1 cm sheets, thickness NR | <0.5 mg · P/L, pH = 9.3 | 8 mg · P/g CSH |
| CSH pellets bound by PVA and Ca-Alg | pellets (mm scale) (exact measurements not reported) | 3.82 mg · P/L, pH = NR | 0.59 mg · P/g CSH |
| CSH (tobermorite) | 40-50 μm | 0.47 mg · P/L, pH = 10.2 | 9.1 mg · P/g CSH |
| CSH (Sonochemical Synthesis) | 80-150 μm | ~2.0 mg · P/L, pH = 9.5-10.5 | 29.4 mg · P/g CSH |

[a]P-loading at ~2.65 mg · P/L was either estimated from experimental data in published figures or calculated from the Langmuir equation referenced in the last column.

EXPERIMENTAL SECTION: Materials. Sodium silicate solution (Reagent grade) was purchased from Sigma-Aldrich. Its concentrations were measured by an inductively coupled plasma optical emission spectroscopy (Optima 7300DV) (ICP-OES). Sodium alginate (FCC grade) was purchased from Spectrum Chemicals. All other chemicals used were at least ACS grade. Deionized (DI) water (≥18.1 MΩ·cm) was obtained using a Barnstead Nanopure Diamond Ultrapure water system. Fabrication of Mineral-Hydrogel Composites. A 0.6% (w/w) sodium alginate solution, with ionic precursors of sodium silicate for silicate (Si) or sodium dihydrogen phosphate for phosphate (P), was dripped into calcium chloride gelation baths with calcium concentrations of 180 mM, 90 mM, 45 mM, and 22.5 mM, and 20 mM NaOH (at a pH of ~11.7). The sodium alginate drip was driven by a syringe pump at a rate of 5 mL/min from a height of 10 cm above the bath, with magnetic stirring at 400 rpm. The calcium concentrations and synthesis conditions were chosen after pretests to determine what calcium concentrations and conditions successfully form mineral-hydrogel composites in the form of spherical beads of consistent and uniform sizes (FIG. 22). The resulting hydrogel beads were soaked in the calcium chloride bath for 4 h and then washed with DI water three times to remove unreacted precursors. Characterization of Mineral-Hydrogel Composites. After washing, mineral-hydrogel composites were patted to remove extra water and weighed to determine their wet weight. They were then dried for 24 h in a 40° C. incubator and weighed again to determine their dry weight. To image the mineral seeds, mineral-hydrogel composites were dehydrated in pure ethanol and then, while still swollen with ethanol, ground in a mortar and pestle to fragment the hydrogel structure and allow clear imaging of the mineral seed. Afterward, the sample was allowed to air-dry at room temperature, and the resulting powder was imaged with a scanning electron microscope equipped with a backscattering electron detector (Thermofisher Quattro S E-SEM, SEMBSE). Energy dispersive X-ray (EDS) spectroscopy measurements of the composites were simultaneously collected (Oxford Instruments EDS detector). ImageJ 1.8 was used to measure the mineral-hydrogel composite sizes and the mineral seed sizes from the SEM-BSE images.

Multiple sites of the powders were imaged, and representative images are presented. To characterize the mineral seeds' sizes and mineral phases, synchrotron-based ultrasmall angle X-ray scattering (USAXS) (q=0.0001-0.3 Å-1), small-angle X-ray scattering (SAXS) (q=0.05-1.2 Å-1), and wide-angle X-ray scattering (WAXS) (q=1.0-6.0 Å-1) patterns were collected at beamline 9-IDC23-25 at the Advanced Photon Source (APS) at Argonne National Laboratory, IL. Hydrogel samples were prepared in 4 mm internal diameter glass NMR sample tubes closed at one end with a length of 55 mm (Wilmad Lab Glass). The hydrogel precursor solution (0.1 mL) was placed into the glass tube using a 28-gauge needle. The calcium chloride solution was then pipetted into the glass tube (0.5 mL), and the tube was submerged vertically in the gelation bath for 8 h. Afterward, the tube was submerged vertically in DI water for 1 h to remove unreacted precursors. The interface of the hydrogel was found visually. Scans were taken down from the interface in three distinct regions, 0-200 μm below the hydrogel surface, 200-400 μm below the hydrogel surface, and 400-600 μm below the surface. Three samples were measured for each different mineral seed conditions. Every sample scan was used (3 scans per sample, 3 samples per condition) for particle size fitting (USAXS) and peak identification (WAXS). The beam size was 200 μm×200 μm, and the beam energy was 21 keV USAXS, SAXS, and WAXS patterns were collected from the same spot. Scattering data was processed with various macros in Nika and Irena packages written for Igor Pro (Wavemetrics, Lake Oswego, Oreg., U.S.A.) developed by Dr. Jan Ilavsky. The use of three different detectors at beamline 9-ID-C allowed for the collection of X-ray scattering data from q values ranging from 0.0001 to 6 Å-1. The USAXS measurements were done with a photodiode detector, and the SAXS and WAXS measurements were conducted with a Pilatus 100 K detector and a modified Pilatus 300 K-W detector. Triplicate samples were measured and used for the sample analysis. Representative WAXS and USAXS data are presented in FIG. 22A and FIG. 22B, respectively.

Phosphate Removal Experiments: To test the P removal performance, a P-rich solution containing the main ionic precursors involved in CaP precipitation with an adjusted ionic strength (2 mM $CaCl_2$, 0.2 mM $Na_2HPO_4$, and 30 mM NaCl, at initial pH 7.0) was used (saturation index with respect to hydroxyapatite=6.95). These concentrations are typical values for dissolved calcium, phosphate, and ionic strength in secondary effluents. In particular, we chose this phosphate concentration as a compromise between high phosphate containing wastewaters (e.g., the side streams of a wastewater treatment plant (~10 mM soluble P) and low phosphate containing wastewaters (e.g., wastewater effluent without any targeted tertiary treatment for phosphorus removal (~0.03 mM P). The saturation index is defined as log 10(IAP/Ksp), where IAP is the ion activity product with respect to hydroxyapatite (Ca5(PO4)3(OH)1) and Ksp is the solubility product of hydroxyapatite (10-44.33 in the thermo.vdb database file). The saturation index was calculated by Visual MINTEQ (Version 3.1) using the thermo.vdb database. After mineral-hydrogel composites were added to the solution, the batch reaction was allowed to proceed for 16 h under stirring. The mineral-hydrogel composite amount was fixed at 5 mL of precursor solution, and the P-rich solution volume was set at 200 mL. Afterward, filtered (0.2 μm pore size) samples were taken. Additionally, after removing the mineral-hydrogel composites, we determined the amount of homogeneous CaP nucleation and growth in the solution by adding 100 μL of 1% nitric acid to dissolve CaP particles for analysis. Calcium, silicate, and phosphate concentrations were determined using ICP-OES. The partitioning of the initially dissolved P after the reaction was determined by three quantities: (1) the amount of phosphate remaining in the solution (dissolved) ($P_{diss}$), (2) the amount of phosphate removed by the mineral-hydrogel composites through heterogeneous nucleation and mineral growth in the composites ($P_{Het}$), and (3) the amount of phosphate that homogeneously nucleated and grew to form CaP precipitates in the solution ($P_{Hom}$). $P_{Diss}$ was determined by collecting filtered samples using 0.22 μm pore size filters. $P_{Hom}$ was determined by measuring the P concentration after acidifying the reaction solution with 1% nitric acid after filtration. The mineral-hydrogel composites were physically removed using a metal mesh (approximately US mesh size 18) before acidification. $P_{diss}$ was then subtracted from the total amount of dissolved P after acidification to determine the amount of CaP precipitate in the solution. $P_{Het}$ was determined by subtracting the sum of $P_{Diss}$ and $P_{Hom}$ from the initial amount of P in the solution. In the figures here, $P_{Het}$ is labeled "P in MinHG", $P_{Hom}$ is labeled "CaP in solution", and $P_{Diss}$ is labeled "Dissolved". The CaP mineral formation within the mineral-hydrogel composites is referred to as heterogeneous CaP nucleation and growth, because either the hydrogel or the mineral seed acts as a substrate that CaP can form on.

To determine the kinetics of P removal, reactions under identical conditions were also run, with 5 mL of sample being taken at doubling time points: 0, 30 min, 1 h, 2 h, 4 h, 8 h, and 16 h. To determine the solubility and mechanisms of P removal, similar reactions were also carried out in 30 mM NaCl solution at initial pH=7 and in solutions undersaturated with respect to hydroxyapatite (0.2 mM $Na_2HPO_4$, 30 mM NaCl, at initial pH=7) and having the same composite amount and reaction volume. To determine the effect of common anions on the P recovery and removal performance of the CaP+CSH/CaAlg mineral-hydrogel composites, we modified the model aqueous solution to contain (1) 1 mM sodium nitrate and 1 mM sodium sulfate or (2) 1 mM sodium nitrate, 1 mM sodium sulfate, and 2 mg-C/L dissolved organic matter (DOM). For DOM, we utilized Suwanee River Natural Organic Matter (2R101N) which was purchased from the International Humic Substance Society (IHSS). The DOM concentration from SRNOM stock solution was confirmed using a nonpurgeable total organic carbon measurement (NPOC, Shimadzu TOC Analyzer, TOC-L CPH). To measure the phosphate concentrations in solutions containing DOM, the molybdenum blue method was used. Specifically, 880 nm absorbances using a UV-visible spectrometer (Thermo Scientific Evolution 60S UV-visible spectrophotometer) were used to calculate phosphate concentrations. All experiments were performed in triplicate.

Example 8: Wollastonite Enabled Phosphate Removal in Mineral-Hydrogel Composites Through Synergy with Calcium Phosphate Seeds Elevated levels of phosphate (P) in surface waters from anthropogenic activities contribute to eutrophication, which threatens ecosystems and the communities relying on them. To mitigate this threat, new P removal and remediation method development is critical. To capture aqueous P, we developed novel mineral-hydrogel composites composed of calcium alginate (Ca-Alg), calcium phosphate (CaP), and wollastonite, a naturally occurring calcium silicate mineral. The wollastonite mineral seeds, through their dissolution, released calcium and silicate, creating a favorable aqueous environment within the hydrogel for heterogeneous CaP formation on the CaP seeds. Through the synergy between the two mineral seeds, the best observed P removal achieved was from 6.2 mg-P/L to 0.067 mg-P/L in a batch reactor. The addition of wollastonite mineral seeds improved the mineral-hydrogel composite's P removal ability in multiple cycles of 24-hour batch reactions, compared to the CaP mineral seeds alone. After P-removal, the mineral-hydrogel composites were characterized using scanning-electron microscopy-energy dispersive x-ray analysis (SEM-EDS), and x-ray scattering to determine the mechanism and limiting factor for P-removal within the composites. In this example, we demonstrated that the mineral-hydrogel composites seeded with CaP and wollastonite provide a promising solution to reduce P from nutrient-enriched water and to prevent harmful algal blooms.

Excessive release of phosphorus into aquatic environments are a driving factor in eutrophication, which can cause harmful algal blooms (HAB) that negatively impact natural ecosystems and the communities that surround them. To reduce HAB occurrence, strict phosphorus limits have been suggested or enacted for wastewater treatment plants and other point sources for phosphate (P) pollution. Efforts to restrict point and non-point source phosphate pollution and to remediate phosphorus rich surface water are necessary to reduce the excessive nutrient level in natural waters from anthropogenic sources. Despite these efforts, surface waters with high orthophosphate-P levels have been found across the United States. For example, the United States Geological Survey (USGS) has reported concentrations upward of 2 mg-P/L as orthophosphate in filtered samples from surface waterbodies, a value much higher than the United States Environmental Protection Agency's guidelines for surface water bodies such as lakes or streams (10-100 μg-P/L).

To restrict the harmful impacts of phosphorus pollution, techniques such as chemical precipitation, or, more recently, enhanced biological phosphorus removal, have been used to remove phosphorus from wastewater streams. However, chemical precipitation methods cannot provide very low final effluent phosphorus concentrations without an expensive excess of dosing chemical, while enhanced biological phosphorus removal can be difficult to implement and sensitive to influent conditions. Another precipitation method used for phosphate removal is seeded precipitation of phosphorus containing solids. In this method, "seeds", such as calcite, struvite, or calcium silicate, that induce phosphorus containing mineral formation are added to an aqueous solution. Calcium silicate based seeds are particularly adept at inducing calcium phosphate formation, due to their release of calcium and silicate creating aqueous chemistries that favor calcium phosphate formation. While some applications of calcium silicate favor the adsorption of phosphate as the main removal mechanism, many also report the formation of calcium phosphate solids. However, most methods relying on precipitation recent development has also been geared towards phosphorus recovery from highly concentrated waste streams, and are thus do not reduce the final P concentration to low levels.

Another promising method for phosphorus removal from phosphorus rich wastewater is adsorption. Adsorbents range from lanthanum-based materials to modified biochar. In general, adsorption has many advantages such as ease of application and fast reaction times. However, challenges exist with adsorbent application such as effective application and recycling due to their small particle sizes or low phosphate affinity leading to large dosing requirements. Additionally, though some materials, such as lanthanum based adsorbents, exist that have high P affinity at low P concentrations, reuse of the P contained within those composites is challenging. Overall, while adsorption is promising, advancements regarding these aspects need to be further developed.

The present disclosure provides mineral-hydrogel composites that use calcium phosphate (CaP) mineral seeds to recover and remove phosphate. The mineral hydrogel composites consist of calcium alginate embedded with CaP mineral seeds that are formed in situ during calcium alginate gelation. This method of phosphate removal and recovery combines favorable aspects of adsorptive techniques and chemical precipitation, while mitigating some of their challenges. For example, by engineering the synthesis conditions that highly favor a more crystalline calcium phosphate mineral seed, the mineral-hydrogel composite's phosphate affinity increased to 96.6 mg-P/g-CaP seed at that final concentration of 0.7 mg-P/L. The mineral-hydrogel composite's large size (~2 mm) compared to traditional adsorbents enabled the easy recovery of phosphate that was removed from solution, while also broadening its operational applicability. Additionally, we have integrated calcium silicate hydrate (CSH) into the mineral-hydrogel composite and found that it works synergistically with the CaP seed for P removal. The CSH mineral seed releases calcium and silicate, making the phosphate removal faster, while lowering the materials required for synthesis and making the mineral-hydrogel composite more robust with regards to initial solution composition.

This example builds on the synergy between calcium silicate based and the CaP mineral seeds for phosphate removal. Although the CSH/CaP mineral-hydrogel composite was able to remove P quickly from solution, a portion of that was due to removal of P through homogeneous nucleation. Homogeneously formed CaP mineral seeds are relatively mobile and may not settle easily. During point source treatment CaP particles may have the opportunity to settle out, but during remediation treatment or during tertiary treatment of point sources, their mobility may result in phosphate release to receiving waters.

Because the homogeneous nucleation is encouraged by the fast release of calcium and silicate from the fast dissolution of CSH, the integration of a more stable calcium silicate mineral, wollastonite, into our mineral-hydrogel composite is provided. Wollastonite has a slower dissolution process compared to the CSH mineral seed, allowing for heterogeneous nucleation on the CaP mineral seeds within the mineral-hydrogel composite to be the main mechanism for removal of phosphate to low levels. Through this removal mechanism, P will be immobilized within the mineral-hydrogel composite, also allowing for P recovery within the mineral-hydrogel composites. Furthermore, we determine the role of the hydrogel, and the evolution of the mineral seed throughout the P removal process. Overall, through the incorporation of wollastonite into the mineral-hydrogel composite system, we will trap P and create a promising platform to prevent P pollution.

P removal performance in supersaturated and undersaturated conditions—effect of P concentration and wollastonite amount: To determine the effect of the mineral-hydrogel composite composition, the ionic P precursor concentration (20 mM or 40 mM) was varied along with the wollastonite amount (2.6 g/L Woll. or 5.2 g/L Woll.). The P removal performance of the mineral-hydrogel composites were then evaluated in supersaturated or undersaturated conditions with respect to hydroxyapatite. Based on the P removal percentage after 24 and 72 hours (FIGS. 1A and 1B), it was found that higher initial concentrations of ionic P precursor resulted in a CaP mineral seed with improved P removal capability, suggesting that higher supersaturation levels with respect to hydroxyapatite (HAP) during the mineral-seed synthesis promote more P removal/recovery.

Figure 27:
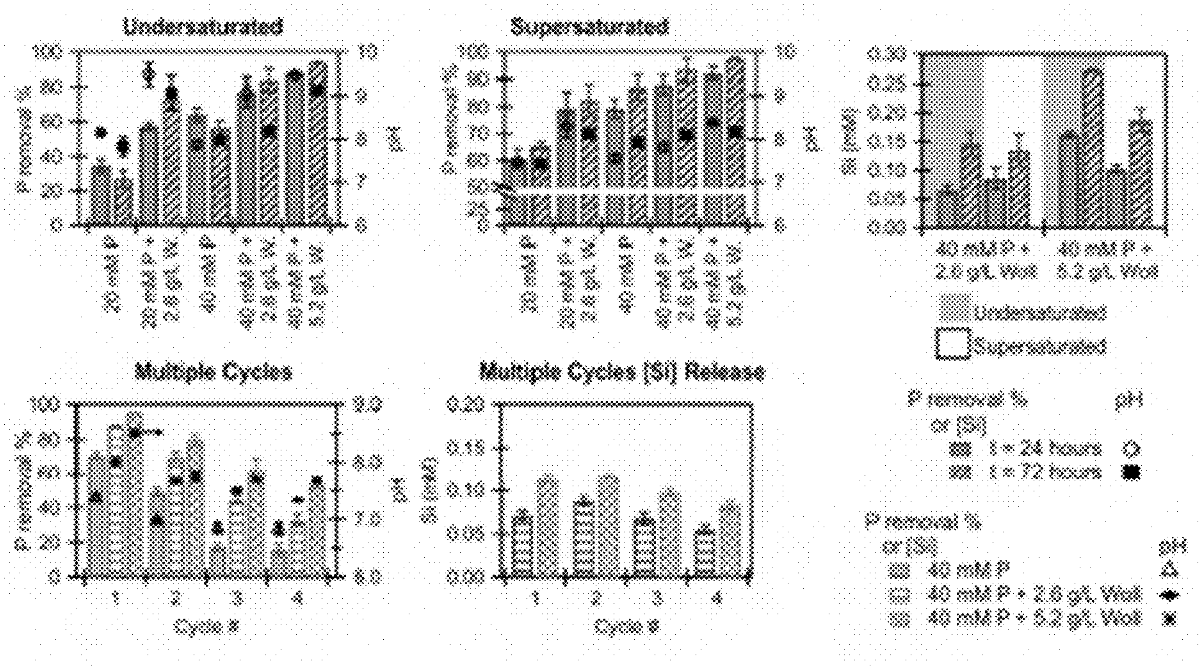
FIG. 27 shows P removal % from P-rich solutions initially undersaturated (0.2 mM $Na_2HPO_4$, 30 mM NaCl at initial pH 7) with respect to hydroxyapatite by mineral-hydrogel composites with various compositions. P removal % from P-rich solutions initially supersaturated (2 mM $CaCl_2$, 0.2 mM $Na_2HPO_4$, 30 mM NaCl at initial pH 7) with respect to hydroxyapatite by mineral-hydrogel composites with various compositions. Silicate release (reported as a proxy for calcium release/wollastonite dissolution amount) in undersaturated and supersaturated P-rich solutions for mineral-hydrogel composites containing 2.6 g/L Woll. or 5.2 g/L Woll. and CaP mineral seeds. P removal performance for mineral-hydrogel composites during multiple 24 hour cycles. Silicate release during multiple cycle P removal performance.

Wollastonite addition was found to generally improve P removal performance of the CaP mineral seed, especially in the conditions initially undersaturated with respect to hydroxyapatite (FIG. 27). With 5.2 g/L wollastonite addition to the precursor solution, the mineral-hydrogel composite was able to remove up to 37% (p-value=0.004) and 10.5% (p-value=0.0002) more P in the undersaturated condition and supersaturated condition, respectively, compared to the 40 mM P mineral seed. Additionally, wollastonite addition enables the removal of P to low concentration levels. Without wollastonite, in the supersaturated condition, the lowest concentration reachable was 0.8 mg-P/L, whereas, with 5.2 g/L wollastonite addition in the mineral-hydrogel composite, the lowest concentration reachable was 0.15 mg-P/L. Wollastonite, during its dissolution, releases $Ca^{2+}$ and increases the pH of the surrounding solution, providing a favorable aqueous condition for heterogeneous CaP formation and growth on the CaP mineral seeds. Another aspect that we must consider when using wollastonite is the pH elevation. When using wollastonite as a filter bed or a reactive filler for column experiments, the pH of the final solution is generally higher than 9. Additionally, lower outlet pH values are associated with higher final [P] concentrations when using these methods. This level exceeds the EPA's water quality standards, necessitating a pH adjustment treatment before release. However, in our system, the final pH in the supersaturated solution is below 9, while still achieving a final low [P] concentration.

In FIG. 27, the amount of silicate release is reported as a proxy for calcium released by wollastonite dissolution. Increasing the amount of wollastonite added increased the amount of calcium released, indicating that the amount of wollastonite addition mediates the calcium release kinetics, rather than the kinetics of dissolution. The CaP mineral seed also does not interfere with wollastonite dissolution, showing that the CaP mineral seed does not passivate the surface of wollastonite. Furthermore, in undersaturated solutions, the dissolution of wollastonite is favored (FIG. 27), showing that aqueous conditions that are not favorable for CaP formation and growth favor wollastonite dissolution. Blank CaAlg hydrogels and hydrogels with 5.2 g/L Woll. were unable to removal significant levels of phosphate through adsorption to either the hydrogel (<5% of initial [P]) or the wollastonite mineral seed (~10% of initial [P]). No homogeneous nucleation was detected as well. It is worth noting that the ~10% removed by adsorption onto wollastonite is most likely unrelated to the 10% increase in P removal of the 40 mM P+5.2 g/L wollastonite mineral seed compared to the 40 mM P mineral seed, because wollastonite is unlikely to maintain similar P-loading values at P concentrations of 5.8 mg-P/L and 0.15 mg-P/L. Therefore, wollastonite's main contribution in the combined 40 mM P+5.2 g/L Woll. mineral-hydrogel composites is its ability to provide calcium. This ability is especially important to allow the mineral-hydrogel composites to remove P from soft waters or surface waters that may have lower concentrations of calcium compared to municipal wastewater (20-120 mg/L for municipal wastewater and median 4 mg/L for surface waters worldwide).

The performance of the mineral-hydrogel composites over multiple 24 hour reaction cycles was also determined (FIG. 27). It was found that wollastonite addition greatly improves the multiple cycle P removal performance of the mineral-hydrogel composites. The overall P-removal capacity was also much greater with more wollastonite addition. We attribute the improved multiple cycle performance to the continued dissolution of wollastonite throughout the cycles providing an innate source of calcium for CaP heterogeneous nucleation and growth. Wollastonite dissolution also appears to be incongruent, with more calcium ions being released compared to silicate. Assuming a Ca/P ratio of 1.7 (based on hydroxyapatite's stoichiometry), if the calcium release equals the amount of silicate released each cycle (~0.1 mM), only ~30% of phosphate can be removed each cycle by new CaP mineral formation. (FIG. 27) This suggests that either incongruent dissolution occurs, which has been reported for wollastonite previously, or that calcium also can be sourced from the CaP mineral seed itself.

Effect of different cations, anions, and DOM: When the mineral-hydrogel composite is applied, various cations, anions, and DOM may be present in the solution, potentially interfering with the P removal process. To account for these potential interferences, we evaluated the performance of the mineral-hydrogel composite in the supersaturated solution with the addition of 1 mM nitrate, sulfate, bicarbonate, magnesium, and 10 mg-C/L dissolved organic matter (DOM) (solution II). Solutions with either 1 mM bicarbonate (solution III) or 10 mg-C/L DOM (solution IV) alone were also tested, due to those components being well known interferences with calcium phosphate precipitation.

Figure 28:
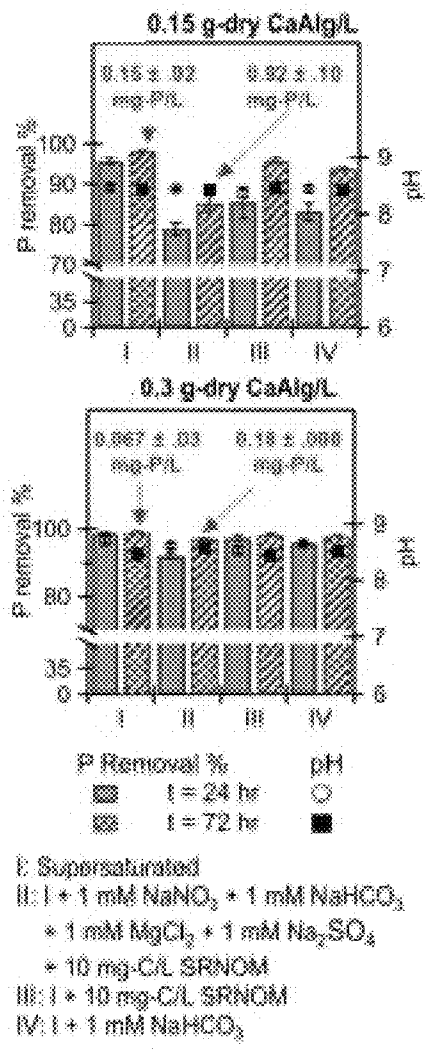
FIG. 28 shows effect of 1 mM sodium nitrate, 1 mM sodium bicarbonate, 1 mM magnesium chloride, 1 mM sodium sulfate and 10 mg-C/L dissolved organic matter (DOM) (II), 1 mM sodium bicarbonate (III) or 10 mg-C/L dissolved organic matter (DOM) on P removal by 40 mM P+5.2 g/L Woll. mineral-hydrogel composites with doses of 0.15 g-dry CaAlg/L and 0.3 g-dry CaAlg/L.

Without interference, the mineral-hydrogel composites were able to achieve 0.15 mg-P/L (FIG. 28) and 0.067 mg-P/L (FIG. 28) at doses of 0.15 mg-dry CaAlg/L and 0.3 mg-dry CaAlg/L respectively in one step from 6.2 mg-P/L, with final P-loadings of 18.3 mg-P/g-mineral seed and 9.3 mg-P/g-mineral seed respectively. Here we report the P-affinity for the mineral seeds' specifically (e.g., the wollastonite and CaP seed), as the alginate acts as a matrix that could contain any powdered adsorbent and does not actively bind phosphate. These P-loading capacities at such low concentrations of aqueous P compare favorably with more traditional reported adsorbents, showing that the CaP mineral seed and wollastonite mineral seeds' synergy results in a high P affinity.

Overall, it was found that these cations and anions did interfere with the P removal performance, lowering final P removal % after 72 hours to 85.2%, 95.9%, and 93.7% for solutions II, III, and IV, respectively. The presence of interfering anions and cations did not largely suppress the P removal ability of the mineral-hydrogel composites and the P removal performance was able to be recovered in the presence of interferences by increasing the dosage of the mineral-hydrogel composites (FIG. 2B).

Figure 29A:
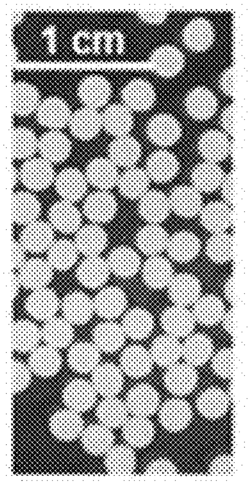
FIG. 29A shows digital micrographs of representative 40 mM P+5.2 g/L Woll. mineral-hydrogel composites. SEM images and atomic compositions for fresh (non-reacted).

Characterization of fresh mineral-hydrogel composites: Wollastonite was successfully incorporated into the mineral-hydrogel composite by simply mixing the wollastonite particles into the mineral-hydrogel composite's precursor solution. After its introduction into the calcium chloride bath, the mineral-hydrogel composite's appearance and final size were like mineral-hydrogel composites that we have previously studied (~2 mm in diameter). (FIG. 29A) The mineral-hydrogel composites were between 93-95% w/w water. For the 40 mM P mineral-hydrogel composite, the CaP mineral seed was ~57% of the overall dry weight, with the remainder being the hydrogel. For the 40 mM P+5.2 g/L Woll. mineral-hydrogel composite, the CaP mineral seed was ~40% w/w and the wollastonite was ~27% w/w of the dry weight, with the hydrogel comprising the remainder. For both mineral-hydrogel composites, the amount of CaP formed during synthesis by weight were similar (~0.04 g/5 mL precursor), showing that the wollastonite presence did not interfere with CaP formation.

Figure 29B:
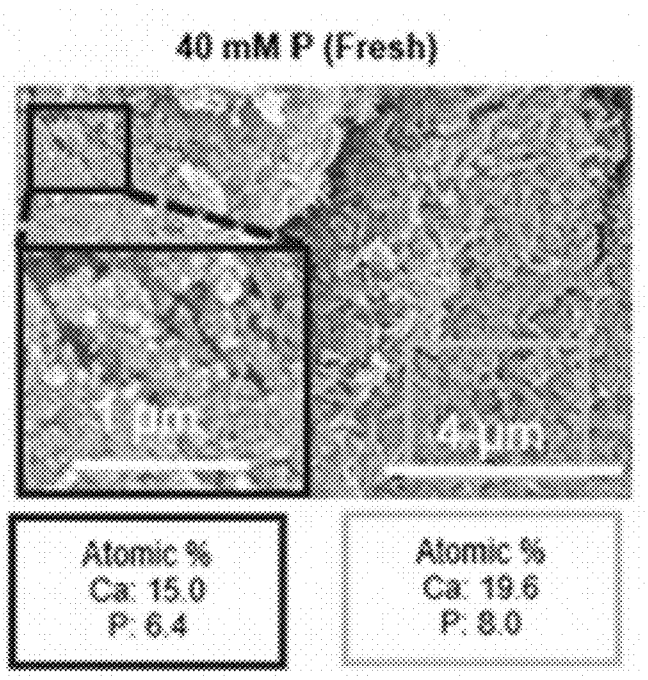
FIG. 29B shows digital micrographs of representative 40 mM P+5.2 g/L Woll. mineral-hydrogel composites. SEM images and atomic compositions for fresh (non-reacted) 40 mM P.
Figure 29C:
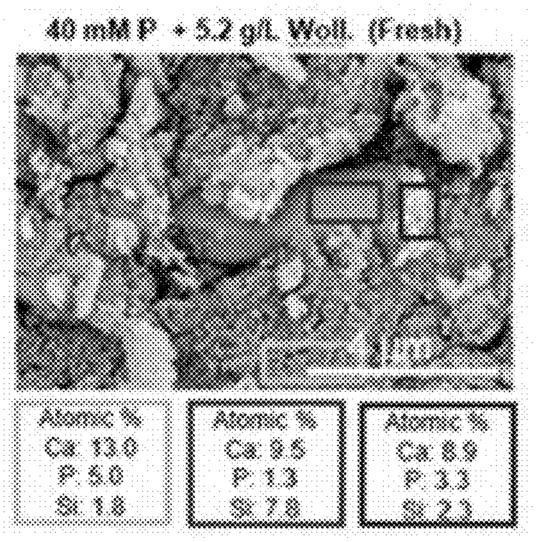
FIG. 29C shows digital micrographs of representative 40 mM P+5.2 g/L Woll. mineral-hydrogel composites. SEM images and atomic compositions for fresh (non-reacted) 40 mM P+5.2 g/L Woll. mineral hydrogel composites.

To characterize the mineral-hydrogel composite, USAXS and WAXS were used to determine the mineral seed's hydrated structure and mineral phase, while SEM-EDS images of the samples were used to complement the USAXS scans and provide information on the CaP mineral seeds' morphology. For the 40 mM P mineral seed, the mineral nanoparticles were present as either rounded amorphous particles (Blue box in FIG. 29B) or elongated particles (Yellow box in FIG. 29B). Based on the EDS scans, both particle morphologies were identified as CaP enriched in calcium, with Ca/P ratios greater than two. The rounded particles had a particle size of 99 nm±41 nm (number of particles measured, n=35), while the elongated particles had lengths of 507 nm±99 nm and widths of 162 nm±36 nm (n=35). The same CaP mineral morphologies were also present in the 40 mM P+5.2 g/L Woll. mineral-hydrogel composite, with the addition of micrometer scale elongated particles (red box in FIG. 29C) identified as wollastonite based on their elemental composition. The CaP mineral sizes observed in the 40 mM P+5.2 g/L Woll. mineral-hydrogel composite were roughly the same as those in the 40 mM P mineral-hydrogel composites. The smaller rounded particles (blue box in FIG. 29C) were 119±53 nm in diameter (n=35), while the elongated particles (yellow box in FIG. 29C) in had lengths of 328±59 nm with a width of 121±27 nm (n=35). Additionally, assuming a Ca:Si ratio of 1:1 from wollastonite, the Ca/P ratio for the CaP mineral seeds were also greater than or equal to 2 in the 40 mM P+5.2 g/L Woll. mineral-hydrogel composite.

Figure 29D:
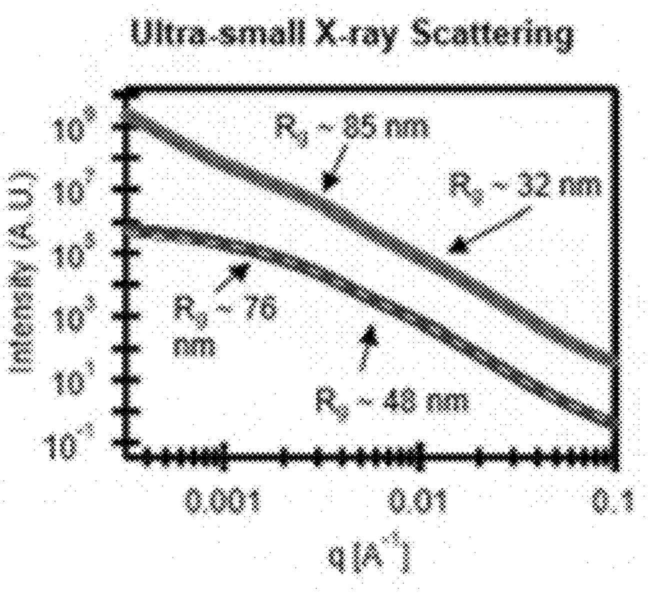
FIG. 29D shows USAXS.

USAXS patterns of hydrated mineral-hydrogel composites were collected to determine the mineral seed's size. (FIG. 29D) The USAXS patterns were able to sample larger populations of particles compared to SEM-EDS. The USAXS patterns also allowed the sampling of mineral seeds in water, removing any effects from drying on the mineral seeds' size or morphology. Based on the SEM images, the mineral-hydrogel composite was modeled as a two particle distribution. At the very low q and high q, unified fits were used to fit the scattering that comes from very large features (i.e., micrometer sized particles or interfaces present in the mineral-hydrogel composite) or very small features (~Rg=3 nm that may arise from hydrogel scattering, either from the crosslinking structures or from the hydrogel's interaction with the mineral-seed). The mineral seed particles of interest presented as scattering patterns in the q range of 0.0006-0.04 Å-1. To fit the particles, the smaller particle population (Rg,1) was assumed to be a sphere, while the larger particle (Rg,2) was assumed to be a spheroid with an aspect ratio of 3.25 based on the average value for aspect ratio (length: width) for the elongated particles from all of the images collected.

Based on this model, we found that the 40 mM P mineral seed had one particle population with an Rg,1 of 48±7 nm and another with an Rg,2 of 76±7 nm. Translating those into real dimensions assuming a sphere (Rg,1) and a spheroid (Rg,2) with an aspect ratio of 3.25, the spherical particle has a radius of 62±9 nm, while the spheroid has a width of 96±9 nm and a length of 627±60 nm. While the exact scattering cross section measured was unable to be controlled due to the nature of the sample (i.e., hydrogel swelling and exact placement of hydrogels relative to the beam), we can qualitatively determine the relative volume ratios of the two particle populations. The average relative volume ratio of the elongated particles to rounded particles is 0.48±0.001, indicating that the rounded particles are more prevalent in the 40 mM P mineral-hydrogel composite.

For the 40 mM P+5.2 g/L mineral-hydrogel composite, we found values of Rg,1=32±2 nm and Rg,2=85±6 nm. Translating those into real radii assuming a sphere (Rg,1) and a spheroid (Rg,2) with an aspect ratio of 3.25, the spherical particle has a radius of 41±3 nm, while the spheroid has a width of 107±8 nm and a length of 699±51 nm. The average relative volume ratio of the elongated particles to the spherical particles is 1.2±0.18, indicating that the two particle morphologies occur at roughly the same frequency. Based on these fitting results, we determined that the wollastonite mineral seed did not drastically shift the CaP mineral seed particle sizes and morphologies present in the mineral-hydrogel composite. However, wollastonite may have changed the relative prevalence of the two different CaP mineral morphologies, potentially contributing to its improved P removal performance (i.e., more active sites for CaP mineral growth based on surface area).

Figure 29E:
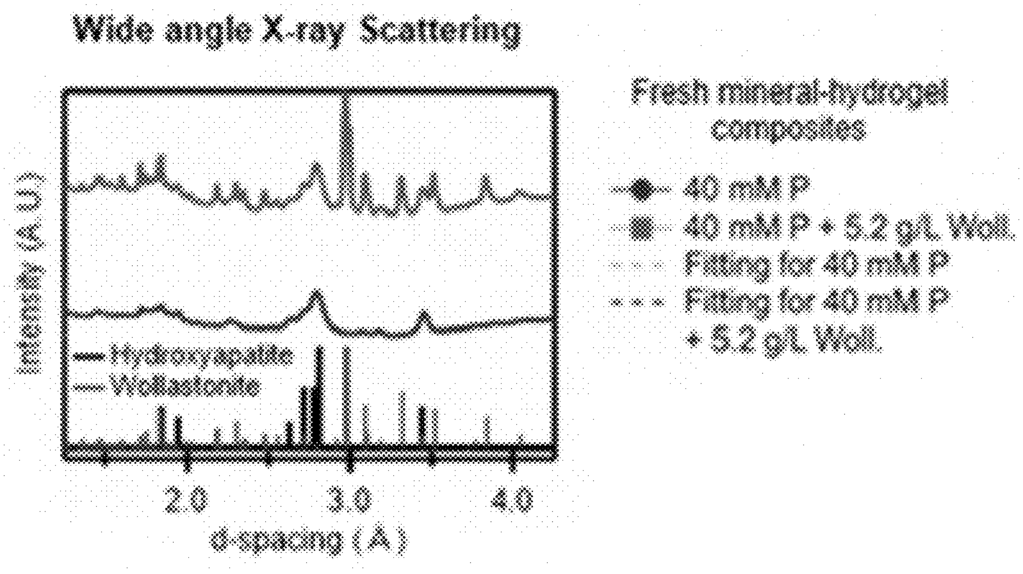
FIG. 29E shows WAXS scans of fresh mineral-hydrogel composites.

WAXS (FIG. 29E) was used to measure the mineral phase of the hydrated mineral-hydrogel composites. Based on this analysis, we found that the CaP mineral seeds' phase was like hydroxyapatite both with and without wollastonite present.

Effect of hydrogel matrix and local aqueous chemistry: To determine the role and importance of the calcium alginate matrix, various mineral-hydrogel composite and mineral seed configurations were tested. Overall, we found that the calcium alginate matrix improved the overall P-removal performance in two ways: 1) the calcium alginate matrix enabled the formation of a more reactive CaP mineral seed (compared to crystalline hydroxyapatite) (FIG. 30Ci compared to FIG. 30Cii) and 2) the calcium alginate matrix enabled the synergy between the Woll. and CaP mineral seed by holding them together in the same space (FIG. 30Civ compared to FIG. 30Cvi). We also discovered that the synergy between HAP and Woll. allows for excellent removal (comparable to the 40 mM P+5.2 g/L Woll. mineral-hydrogel composite) when solely using those two powdered mineral seeds at t=72 hours (FIG. 30Ciii compared to FIG. 30Civ). This provides the possibility of using those two powdered mineral seeds in any hydrogel matrix, if one proves to be more suitable for use compared to calcium alginate. However, the reactive mineral seed obtained using alginate does provide a kinetic advantage, as it removes more P at t=24 hours.

The internal mineral-hydrogel composite pH for the different compositions was also semi-quantitatively determined after 3 hours of reaction within the P-rich supersaturated solution. By dosing phenolphthalein, we were able to determine that the internal hydrogel pH and the pH near the surface of the mineral-hydrogel composites is raised above 8.5 due to the influence of wollastonite, even though the bulk pH is lower. (FIG. 30B) The CaP mineral-hydrogel composite also raises the local pH at t=3 hours. This potentially indicates that the CaP mineral seed has excess hydroxide that is released during P removal due to its enriched Ca/P ratio, based on the range of calcium phosphate compositions that exist ($Ca_9(PO_4)_{6-x}(HPO_4)_x(OH)_x$).

Overall, the locally high pH demonstrated here plays a large role in the excellent P removal performance of the mineral-hydrogel composite, similarly to other methods that have localized high pH value during mineral-precipitation processes.

Characterization of reacted mineral-hydrogel composites and determination of P-removal mechanism and limiting factors: Finally, to determine the limiting factor for P-removal performance over multiple cycles, we extensively characterized the mineral seed after 4 cycles of 24 hour reaction (FIG. 27) in the P-rich supersaturated solution (FIG. 31). By comparing the characteristics of the mineral seed before and after the reaction, we can determine the limiting factor for the P-capacity of the mineral-hydrogel composites and develop potential improvements to the mineral-hydrogel composite.

Based on the SEM images, the particle morphologies for both the 40 mM P and 40 mM P+5.2 g/L Woll. mineral hydrogel composites do not change drastically. Rounded particles (blue box in FIG. 31A and FIG. 31B) with diameters of 113±29 nm (n=35) and 79 nm±17 nm (n=35) were visible in the 40 mM P and 40 mM P+5.2 g/L Woll. mineral hydrogel composites, respectively, after 4 cycles of reaction. The elongated particles (yellow box in FIG. 31A and FIG. 31B) with lengths of 503 nm±106 nm (n=35) and 592 nm±236 nm (n=35) and widths of 141 nm±27 nm (n=35) and 164 nm±35 (n=35) nm were also visible after 4 cycles of reaction in the 40 mM P and 40 mM P+5.2 g/L Woll. mineral hydrogel composites, respectively. Overall, based on the SEM-EDS scans, we noticed no large shifts in CaP mineral seed morphology or composition after the reaction.

The USAXS scattering patterns also did not indicate a large shift in particle size. (FIG. 31C) The mineral-hydrogel composites were modeled as a two particle size distribution of one spherical particle and one spheroid with an aspect ratio of 3.25 in the q-range of 0.0006-0.04 Å-1, like the model used for the fresh mineral-hydrogel composites. For the 40 mM P mineral-hydrogel composite, we found Rg,1=55±1 nm (Spherical) and Rg,2=74±6 nm (Spheroid with AR 3.25). These translate into a sphere with a radius of 72±1 nm and a spheroid with a width of 93±8 nm and a length of 607±52 nm. For the 40 mM P+5.2 g/L Woll. mineral-hydrogel composite, Rg,1=43±3 nm and Rg,2=116 nm±29 nm. Again, assuming a spherical particle and a spheroid with an AR of 3.25, this translates into a sphere with a radius of 56±4 nm and a spheroid with a width of 146 nm±37 nm and a length of 948±238 nm. Overall, while the average modelled particle sizes are generally larger after the reaction, the difference is not significant considering the variance of the samples.

Interestingly, for the 40 mM P+5.2 g/L Woll. mineral-hydrogel composites, another particle population was required with an Rg of 9.9±4.6 nm to fit the USAXS patterns. Assuming a spherical particle, this translates to a radius of 12.8±6 nm. The presence of these smaller particles in this mineral-hydrogel composite after 4 cycles of reaction is supported by the SEM images. These smaller particles could be heterogeneously nucleated CaP particles that partially explain why the 40 mM P+5.2 g/L Woll. mineral-hydrogel composite has a greater capacity for P removal compared to the 40 mM P mineral-hydrogel composite.

The relative volume ratio of the elongated particles to the spherical particles, however, does shift significantly after the reaction. After the reaction, the ratio of elongated to spherical particles is 0.88±0.3 for the 40 mM P mineral-hydrogel composite and 0.6±0.15 for the 40 mM P+5.2 g/L Woll. mineral-hydrogel composite. Compared to before the reaction (0.48±0.001 and 1.2±0.18, for 40 mM P and 40 mM P+5.2 g/L Woll., respectively), this indicates that, for the 40 mM P mineral-hydrogel composite, the elongated particle volume fraction increased in prevalence, while the opposite holds true for the 40 mM P+5.2 g/L Woll. mineral-hydrogel composite. Therefore, for the 40 mM P mineral-hydrogel composite, growth of the elongated particles and/or transformation of spherical CaP particles to elongated particles may drive P removal. For the 40 mM P+5.2 g/L Woll. mineral-hydrogel composite, the nucleation and growth of spherical CaP particles may drive P removal.

Based on the WAXS scans of the mineral-hydrogel composites, the mineral phase of the CaP mineral seed does not change significantly before and after reaction (FIG. 31E). Overall, based on SEM-EDS, USAXS, and WAXS, the mineral seeds' sizes and mineral phase do not change significantly after 4 cycles of reaction. The potential presence of new particles and a shift in the relative amounts of the different particle morphologies was, however, detected and may limit the overall P-removal amount.

Figure 31A:
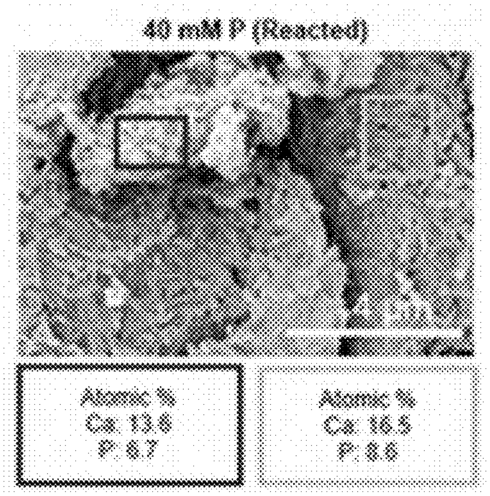
FIG. 31A shows SEM images and atomic compositions for 40 mM P.
Figure 31B:
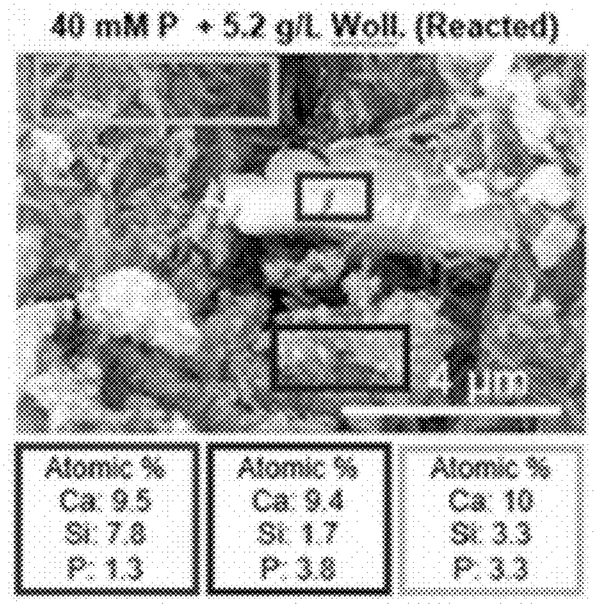
FIG. 31B shows SEM images and atomic compositions for 40 mM P+5.2 g/L Woll. mineral hydrogel composites reacted for 4 cycles of 24 hour reactions in supersaturated P-rich solution.
Figure 31C:
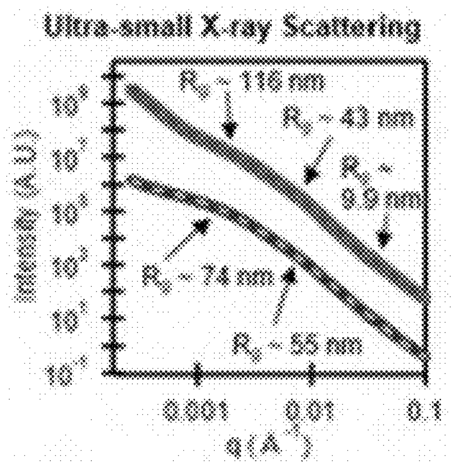
FIG. 31C shows USAXS.
Figure 31D:
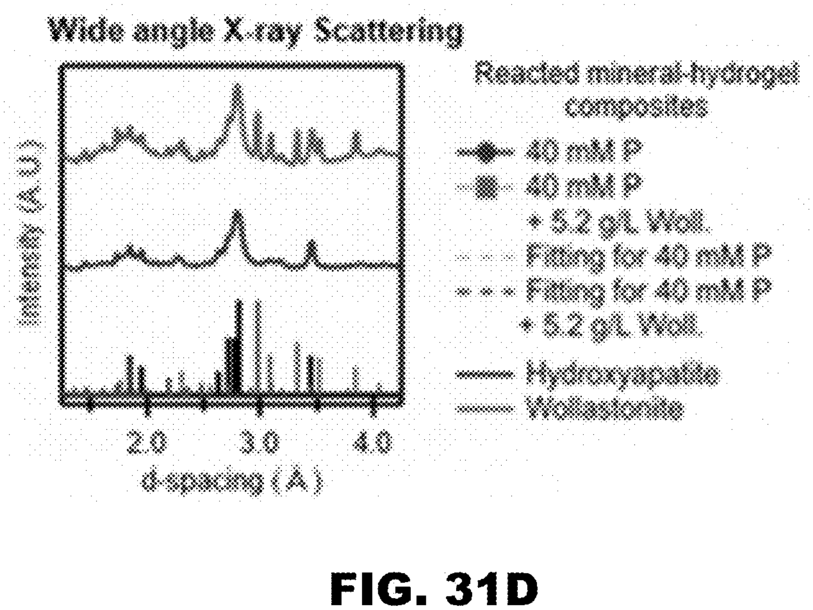
FIG. 31D shows WAXS scans of reacted mineral-hydrogel composites.

The solubility and Ca/P ratio of the CaP mineral seeds were also determined before and after the reaction (FIG. 31D). We found that the solubility of the CaP mineral seed does not change significantly before and after the reaction. This suggests that the mineral seed's solubility does not limit the overall P removal capacity (i.e. the CaP mineral seed slowly transforms into a CaP form with a higher solubility compared to before 4 cycles of reaction). However, the Ca/P ratio changes significantly, dropping from more than two to a value of 1.70. This suggests that the calcium present within the CaP mineral seed limits the P-removal capacity. This also is supported by the fact that the silicate release is lowered in later cycles for the wollastonite containing mineral-hydrogel composites. (FIG. 27) The lower silicate release suggests that wollastonite dissolution is slowed after two cycles of P removal, lowering the amount of calcium available from within the mineral-hydrogel composite. Overall, this suggests that, to regenerate the P removal ability of the mineral-hydrogel composite, replenishing the calcium contained within the mineral-hydrogel composite may restore the P removal activity. This also suggests that the longevity of the mineral-hydrogel composites can be further optimized for by including more wollastonite mineral seeds or engineering the dissolution rate and the Ca/Si ratio.

Environmental Impacts: Through the synergy obtained in mineral-hydrogel composites containing CaP mineral seeds and wollastonite mineral seeds, P removal from 6.2 mg-P/L to 0.067 mg-P/L was achieved, with a final pH under 9. The P-loading of the optimized mineral-hydrogel composite of 40 mM P+5.2 461 g/L Woll. at concentrations of 0.15 mg-P/L and 0.067 mg-P/L was 30.25 mg-P/g-CaP mineral seed and 15.3 mg-P/L respectively, showing excellent P-affinity compared to other reported adsorbents. The addition of wollastonite also improved the P removal performance and overall P removal capacity for multiple cycles of reaction. Furthermore, the influence of competing cations and anions did not significantly inhibit P removal, and any negative effects could be compensated for by increased mineral-hydrogel composite dosage.

The CaAlg hydrogel was determined to play a role by enabling the synthesis of a reactive CaP mineral seed, and by entrapping the two mineral seeds together in the same matrix, maintaining a locally high pH and lowering transport barriers to encourage heterogeneous CaP nucleation and growth. Through careful characterization of the mineral-hydrogel composites before and after 4 cycles of reaction, we determined using SEM-EDS combined with USAXS fitting that potential CaP mineral morphology prevalence changes may limit P removal by the mineral-hydrogel composites. Another limiting factor, determined by evaluated the Ca/P ratio of the CaP mineral seed before and after reaction, is the amount of available calcium within the mineral-hydrogel composite. Overall, this understanding will assist in further improving the mineral-hydrogel composites, either by suggesting a potential regeneration or conditioning treatment or by helping determine metrics to optimize the performance of the mineral-hydrogel composites in flow-through configurations or in scaled-up configurations. Overall, the mineral-hydrogel composite has demonstrated promising P removal performance to low levels of phosphate, which make the mineral-hydrogel composites a potential technology for phosphate pollution control and eutrophication mitigation.

Materials. Wollastonite (NYAD 5000) was purchased from NYCO (803 Mountain View Drive, Willsboro, N.Y.)). Sodium alginate (FCC grade) was purchased from Spectrum chemicals. Hydroxyapatite powder was purchased from Sigma Aldrich (St. Louis, Mo.). Suwanee River Natural Organic Matter (2R101N) was purchased from the International Humic Substance Society (IHSS). The DOM concentration from SRNOM stock solution was confirmed using a non-purgeable total organic carbon measurement (NPOC, Shimadzu TOC Analyzer, TOC-L CPH). All other chemicals used were at least ACS grade. Deionized (DI) water (≥18.1 MΩ·cm) was obtained using a NANOpure® Diamond™ Ultrapure water system.

Fabrication of mineral-hydrogel composites. A precursor solution was prepared using 0.6% w/w sodium alginate with 20 mM or 40 mM of $Na_2HPO_4$ and 2.6 g/L or 5.2 g/L of wollastonite. The wollastonite had a median particle size of 3 μm. Before introduction into the alginate precursor solution, the wollastonite was gently ground in a mortar and pestle to break up any aggregated particles. The wollastonite powder was then suspended in water and shaken vigorously before addition to the sodium alginate precursor solution. The precursor solution was well-mixed and then dripped into a gelation solution containing 100 mM $CaCl_2$ and 20 mM NaOH (pH=12) using a syringe (gauge size of 21 mm (HenkeSassWolf, Tuttlingen, Germany) with a needle (internal diameter=0.514 mm, (Benton, Dickenson and Company, Franklin Lakes, N.H., USA). The syringe pump (KD scientific, MA, USA) rate was set to 4 mL/minute and the needle outlet was positioned 5 cm above the gelation solution. The volume ratio (precursor to gelation bath) was set at 1:10, based on our previous work. After the hydrogel beads were formed, they were allowed to mature under stirring in the gelation solution for 4 hours. Then they were rinsed in DI (deionized) water (≥18.1 MΩ·cm, obtained using a NANOpure® Diamond™ system) for 3 times to remove unreacted precursors. To determine the role of the calcium alginate hydrogel, mineral-hydrogel composites with 8 g/L hydroxyapatite (HAP) powder, 8 g/L HAP+5.2 g/L Woll., or 5.2 g/L Woll. were also synthesized and tested in various configurations (FIG. 30).

Phosphate removal experiments. To test P removal performance, a P-rich solution containing the main ionic precursors involved in CaP precipitation with an adjusted ionic strength (2 mM $CaCl_2$, 0.2 mM $Na_2HPO_4$, and 30 mM NaCl, at initial pH 7.0, Supersaturated) was used (saturation index with respect to hydroxyapatite=6.947). pH was measured using a sympHony SP70P handheld pH meter with a red rod combination pH probe (sympHony 89231-580). Solutions undersaturated with respect to hydroxyapatite (0.2 mM $Na_2HPO_4$ and 30 mM NaCl with initial pH=7) were also used to determine the performance of the mineral-hydrogel composites in undersaturated conditions. These are typical values for dissolved calcium, phosphate and ionic strength in secondary effluents. The saturation index is defined as $\log_{10}(IAP/K_{sp})$ where IAP is the ion activity product with respect to hydroxyapatite ($Ca_5(PO_4)_3(OH)_1$) and $K_{sp}$ is the solubility product of hydroxyapatite ($10^{-44.33}$ in the thermo.vdb database file). The saturation index was calculated by Visual MINTEQ (Version 3.1) using the thermo.vdb database. After mineral-hydrogel composites were added to the solution, the batch reaction was allowed to proceed for 24 to 72 hours under stirring. The mineral-hydrogel composite amount was fixed at 5 mL of precursor solution, and the P-rich solution volume was set at 200 mL (dosage=0.15 g-dry Calcium alginate (CaAlg)/L). Afterwards, filtered (0.2 μm pore size) samples were taken and the P concentration was measured using an inductively coupled plasma optical emission spectrometer (Optima 7300DV) (ICP-OES) or the molybdenum blue method, wherein 880 nm absorbances were measured using a UV-Visible spectrometer (Thermo Scientific Evolution 60S UV-Visible Spectrophotometer). No homogeneous nucleation was detected at t=24 hours for 40 mM P+5.2 g/L Woll. mineral-hydrogel composites in the supersaturated P-rich solution, the solution with the highest supersaturation for CaP in solution. Therefore, homogeneous nucleation was determined to not occur in the other conditions and filtered samples were used to determine how much P was removed by the mineral-hydrogel composites.

To determine the mineral-hydrogel composite's P removal performance over multiple cycles, mineral-hydrogel composites were placed in the supersaturated P-rich solution at a dosage of 0.15 g-dry CaAlg/L and reacted for 24 hours (Cycle 1). Afterwards, the solution was replaced with a fresh supersaturated P-rich solution. This was repeated for a total of 4 cycles. All experiments were performed in triplicate.

Figure 30A:
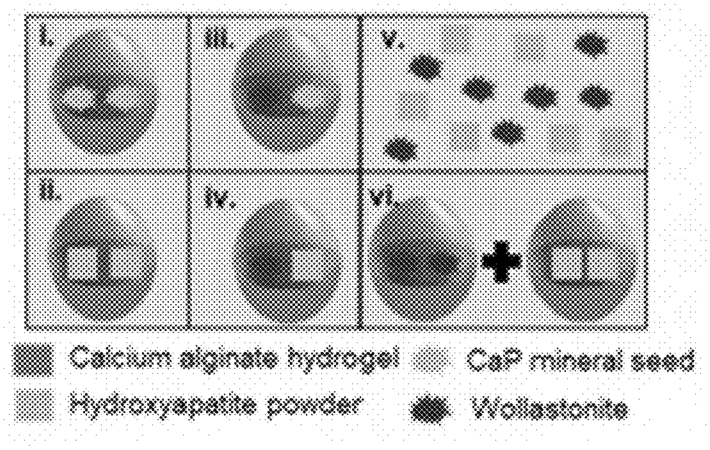
FIG. 30A shows schematic showing different mineral-hydrogel composite seed compositions and configurations tested.
Figure 30B:
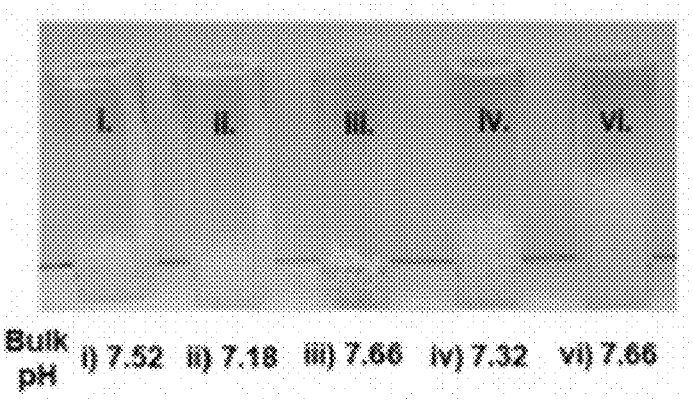
FIG. 30B shows digital micrographs showing the measured bulk pH and the color change at the surface of different mineral-hydrogel composites after 3 hours of reaction in the supersaturated P-rich solution when dosed with phenolphthalein, a pH indicator dye that has a color shift from colorless to pink above pH 8.5.
Figure 30C:
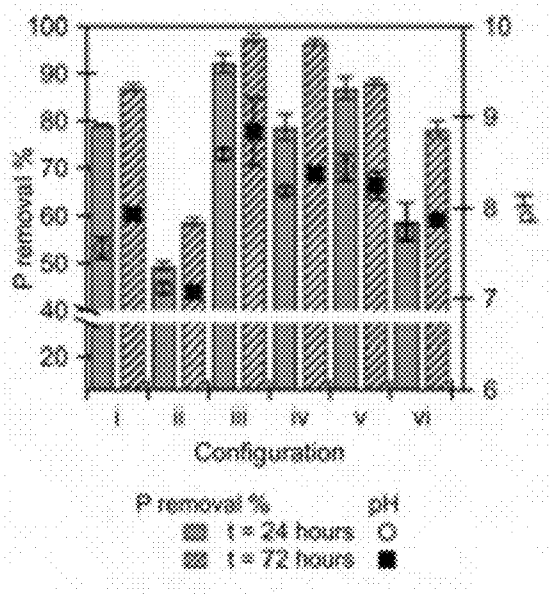
FIG. 30C shows P removal percentages for the different configurations and compositions of the mineral-hydrogel composites.
Figure 32:
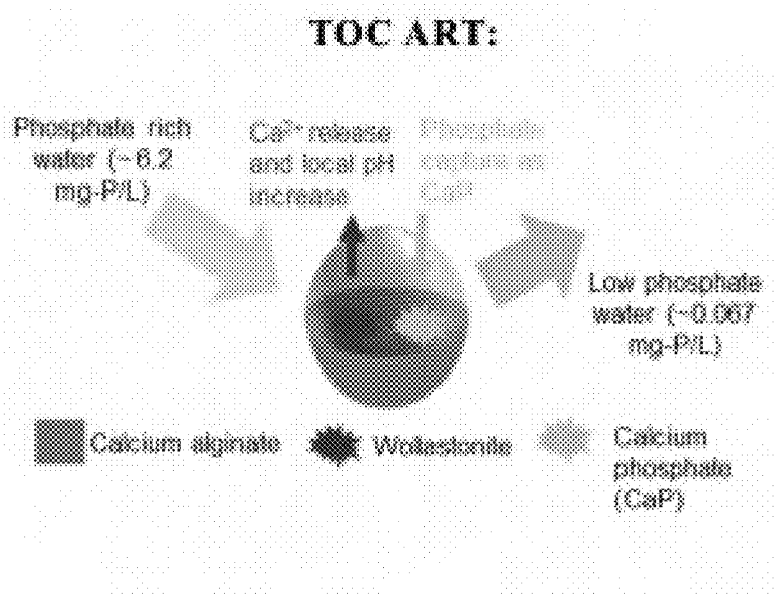
FIG. 32 shows a schematic of TOC ART.

To determine the role of the hydrogel, six distinct mineral-hydrogel configurations were studied: 1) 40 mM P mineral-hydrogel composite (FIG. 30Ai), 2) 8 g/L hydroxyapatite powder (HAP) seeded mineral-hydrogel composites (FIG. 30Aii), 3) 40 mM P+5.2 g/L Woll. mineral-hydrogel composites (FIG. 30Aiii), 4) 8 g/L+5.2 g/L Woll. mineral-hydrogel composites (FIG. 30Aiv), 5) HAP and Woll. directly placed in solution (at the same dose as when they are in mineral-hydrogel composites) (FIG. 30Av), and FIG. 32) HAP and Woll. placed in separate mineral-hydrogel composites in the same solution (FIG. 30Avi). To determine the internal pH reached in these configurations in the supersaturated P-rich solution, phenolphthalein dye (dissolved in 200 proof ethanol, 100 mM) was dosed to a concentration of 0.2 mM after three hours of reaction. The mineral-hydrogel composites were then imaged. Phenolphthalein dye is a pH sensitive indicator with a color transition from colorless to pink at pH 8.5.

Characterization of mineral-hydrogel composites: After washing, mineral-hydrogel composites were patted to remove extra water and weighed to determine their wet weight. They were then dried for 24 hours in a 40° C. incubator and weighed again to determine their dry weight. To image the mineral seeds, mineral-hydrogel composites (either fresh, right after synthesis or after 4 cycles of reaction) were dehydrated in pure ethanol and then, while still swollen with ethanol, ground in a mortar and pestle to fragment the hydrogel structure and allow clear imaging of the mineral seed. Afterwards, the sample was allowed to air-dry at room temperature, and the resulting powder was imaged with a scanning electron microscope (Thermofisher Quattro S E-SEM, SEM). Energy dispersive X-ray (EDS) spectroscopy measurements of composites were simultaneously collected (Oxford Instruments EDS detector). ImageJ 1.8 was used to measure the mineral-hydrogel composite sizes and the mineral seed sizes from the SEM images. Multiple sites (~10) of the powders were imaged, and representative images are presented in FIG. 29 and FIG. 31.

To characterize the mineral seeds' sizes and mineral phases, synchrotron-based ultra-small angle X-ray scattering (USAXS) (q=0.0001-0.3 Å-1), small-angle X-ray scattering (SAXS) (q=0.05-1.2 Å-1), and wide angle X-ray scattering (WAXS) (q=1.0-6.0 Å-1) patterns were collected at beamline 9-ID-C26-at the Advanced Photon Source (APS) in Argonne National Laboratory, IL. Scattering data was processed with various macros in Nika and Irena packages written for Igor Pro (Wavemetrics, Lake Oswego, Oreg., USA) developed by Dr. Jan Ilavsky. The USAXS measurements were done with a photodiode detector, and the SAXS and WAXS measurements were conducted with a Pilatus 100K detector and a modified Pilatus 300K-W detector. Duplicate samples were measured and used for the sample analysis.

To determine the solubility of the CaP mineral seeds, mineral-hydrogel composites (either fresh or after 4 cycles of reaction) were placed into DI water (dosage of 0.15 g-dry CaAlg/L) for 14 days, before the calcium, phosphate, and final pH was measured. To determine the Ca/P ratio of the CaP mineral seeds, mineral hydrogel composites synthesized from 5 mL of ionic precursor were digested in 50 mL of 35% (w/v) nitric acid and 17.5% (v/v) $H_2O_2$ and then placed in a water bath at 80° C. for 12 hours. Calcium alginate hydrogels and calcium alginate hydrogels with 5.2 g/L wollastonite mineral seeds (fresh or reacted for 4 cycles) were also digested to subtract calcium that is not associated with the calcium phosphate.

What is claimed is:

1. A composition comprising one or more calcium alginate hydrogel beads each bead seeded with calcium phosphate and wollastonite.

2. The calcium alginate hydrogel bead composition of claim 1, wherein the calcium phosphate mineral seed is about 50% to about 30% w/w and the wollastonite is about 37% to about 17% w/w of the dry weight of the composition, with the hydrogel comprising the remainder dry weight w/w.

* * * * *